United States Patent [19]
Furukawa et al.

[11] Patent Number: 5,237,508
[45] Date of Patent: Aug. 17, 1993

[54] PRODUCTION CONTROL SYSTEM

[75] Inventors: Satomi Furukawa, Oyama; Shozo Suzuki, Yuuki; Yuuji Seki, Shimodate; Hiroshi Ohide, Utsunomiya, all of Japan

[73] Assignee: Fujitsu Limited, Kawasaki, Japan

[21] Appl. No.: 401,033

[22] PCT Filed: Aug. 10, 1990

[86] PCT No.: PCT/JP90/01025
§ 371 Date: Apr. 10, 1991
§ 102(e) Date: Apr. 10, 1991

[87] PCT Pub. No.: WO91/01850
PCT Pub. Date: Feb. 21, 1991

[30] Foreign Application Priority Data

Aug. 10, 1989 [JP] Japan ................... 1-207158
Dec. 5, 1989 [JP] Japan ................... 1-314347
Jan. 23, 1990 [JP] Japan ................... 2-12810
Jan. 30, 1990 [JP] Japan ................... 2-18055

[51] Int. Cl.$^5$ ............. G06F 15/21; G05B 15/02; B23Q 41/08; B23P 21/00
[52] U.S. Cl. .................... 364/468; 364/469; 364/478; 364/131; 364/138
[58] Field of Search .......... 364/468, 469, 138, 474.11, 364/140, 401, 131, 550, 478

[56] References Cited

U.S. PATENT DOCUMENTS

| | | | |
|---|---|---|---|
| 4,628,435 | 12/1986 | Tashiro et al. | 364/130 |
| 4,802,094 | 1/1989 | Nakamura et al. | 364/468 |
| 4,901,218 | 2/1990 | Cornwell | 364/131 |
| 4,958,292 | 9/1990 | Kaneko et al. | 364/468 |
| 5,014,208 | 5/1991 | Wolfson | 364/468 |
| 5,056,028 | 10/1991 | Ohta et al. | 364/468 |
| 5,084,829 | 1/1992 | Kato | 395/80 |
| 5,126,932 | 6/1992 | Wolfson et al. | 364/131 |

FOREIGN PATENT DOCUMENTS

| | | |
|---|---|---|
| 300456 | 1/1989 | European Pat. Off. |
| 2-53553 | 2/1990 | Japan |
| 2208553 | 5/1989 | United Kingdom |
| WO8902341 | 3/1989 | World Int. Prop. O. |

OTHER PUBLICATIONS

European Search Report, The Hague, Search Completed Jan. 3, 1992.

*Primary Examiner*—Jerry Smith
*Assistant Examiner*—Paul Gordon
*Attorney, Agent, or Firm*—Staas & Halsey

[57] ABSTRACT

What is disclosed is a production control system for dealing with the demand of producing many kinds of products in small quantities within a short delivery period by improving productivity of production lines and unmanned operation of the lines. The production control system has a plurality of facilities (1) including parts mounters (14) for processing products through processes, cell controllers (2) for controlling the facilities, a line control system (3) for centrally controlling all the cell controllers, and a transporting unit (4) controlled by the line control system to transport the products between the facilities. The line control system (3) comprises a unit (401) for preparing a detailed execution schedule by considering, in real time, a schedule of a relatively short period extracted from a schedule of a relatively long period, half-finished conditions of the products in a line, and actual events. The line control system controls the cell controllers, parts mounters, and transporting unit according to the prepared execution schedule.

19 Claims, 80 Drawing Sheets

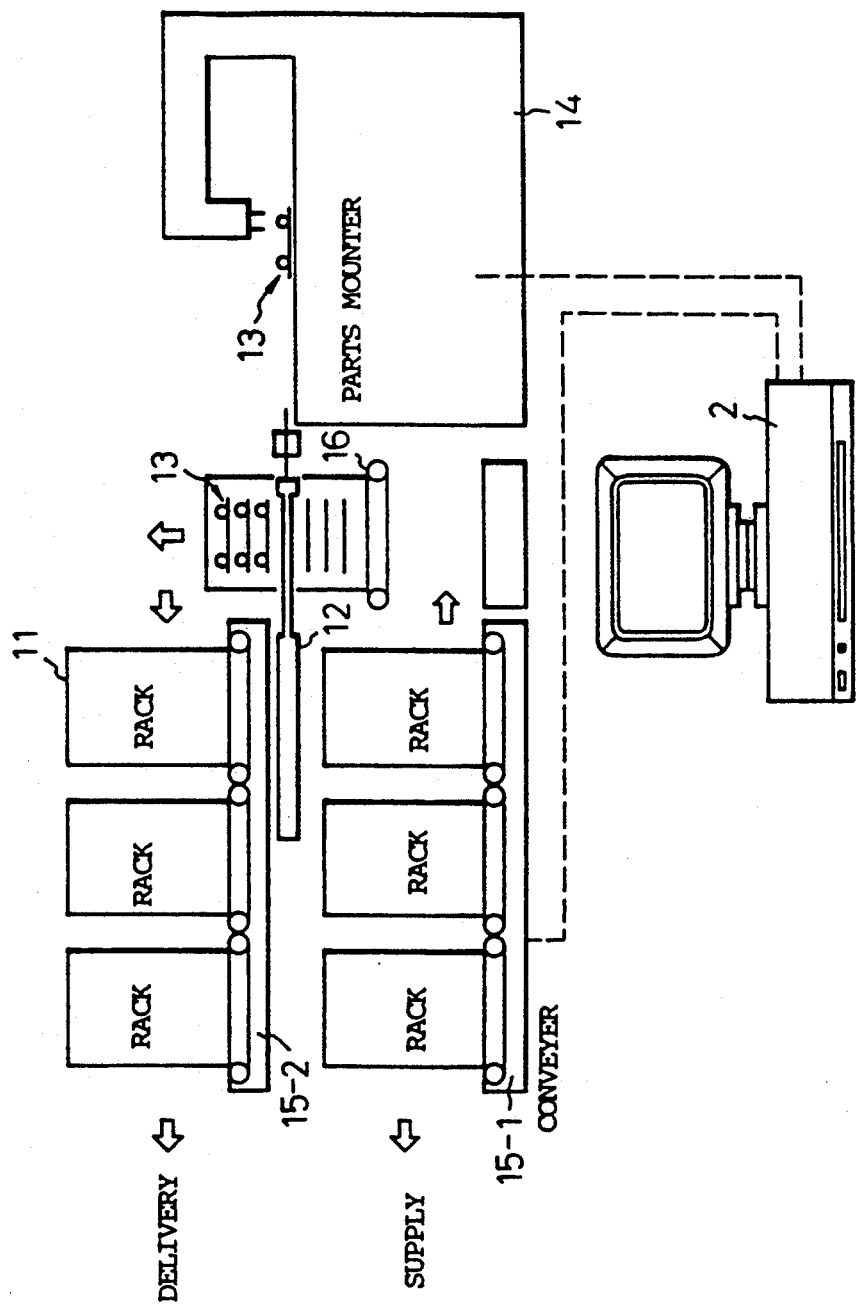

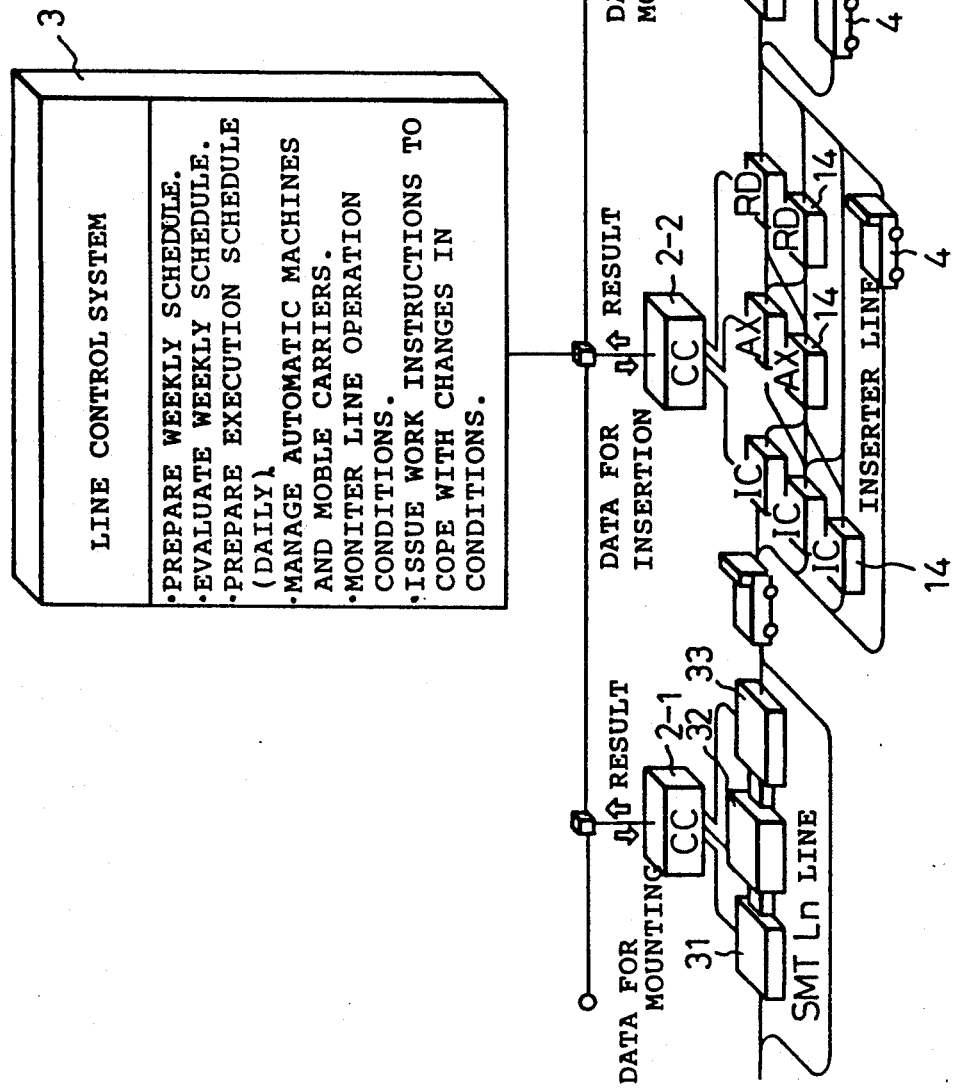

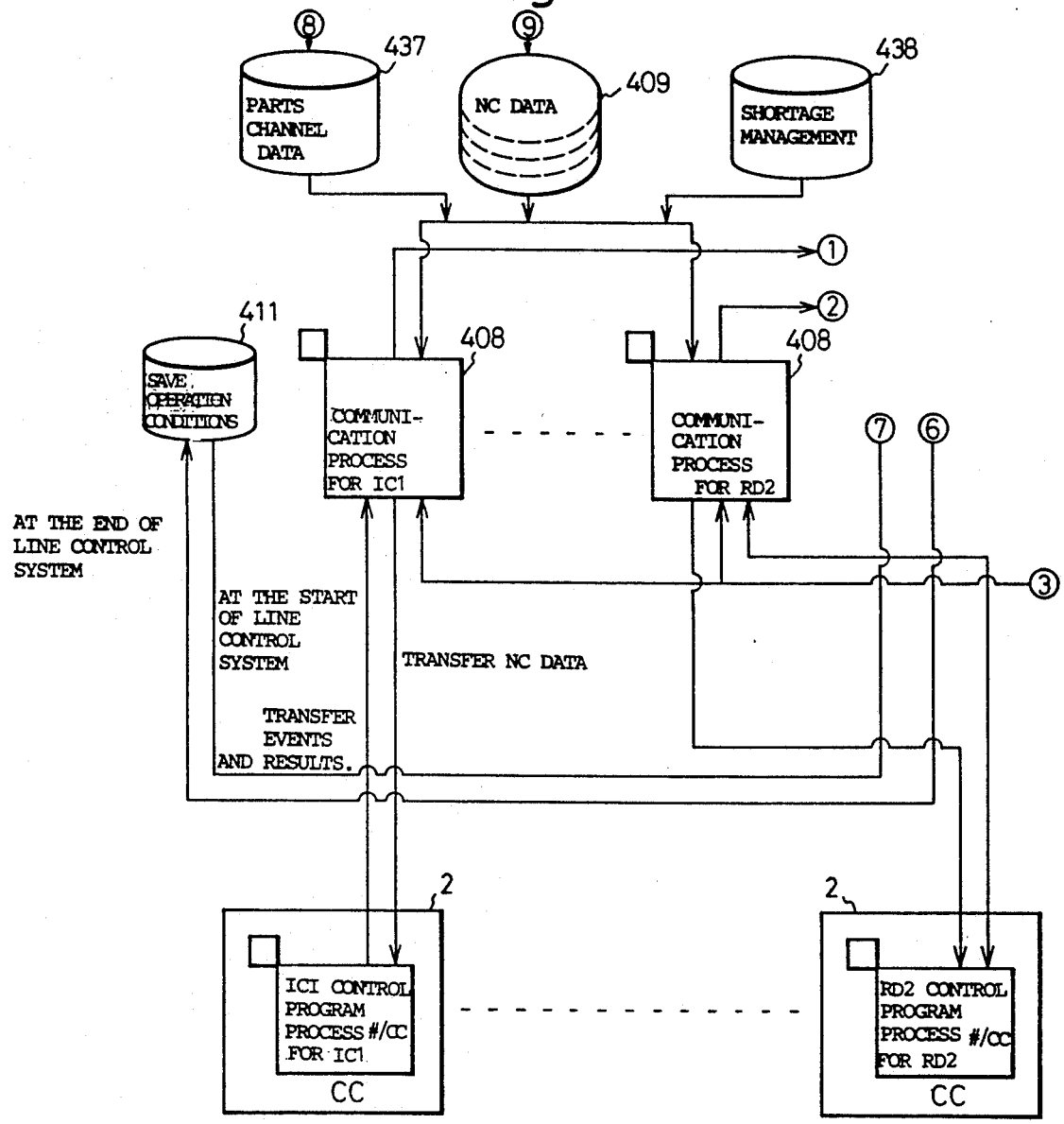

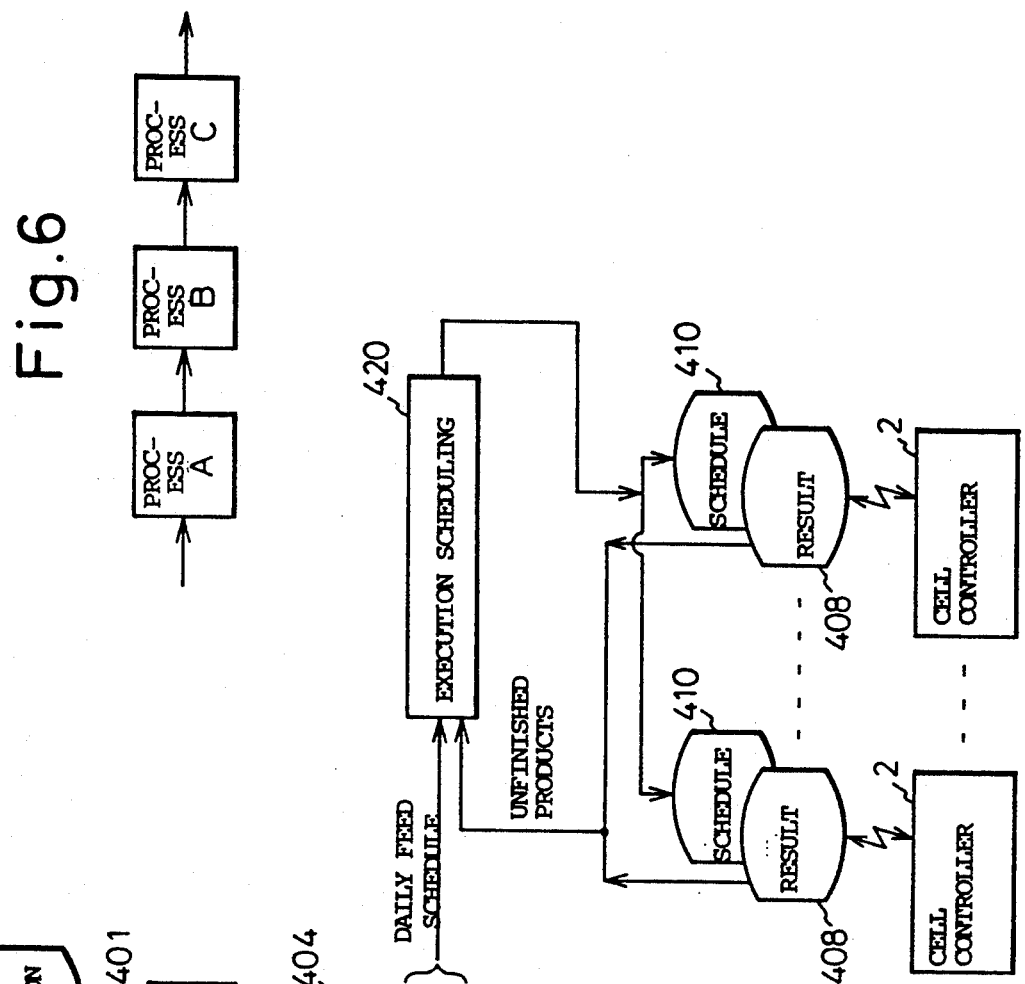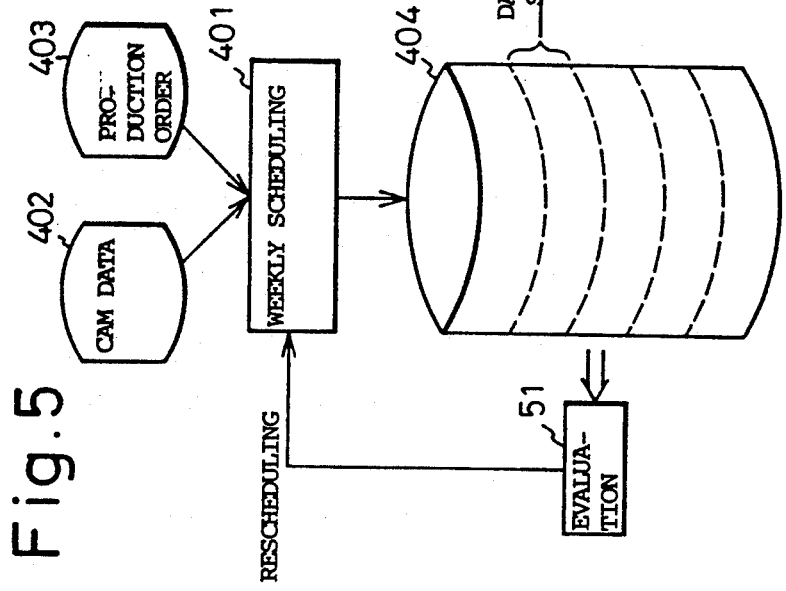

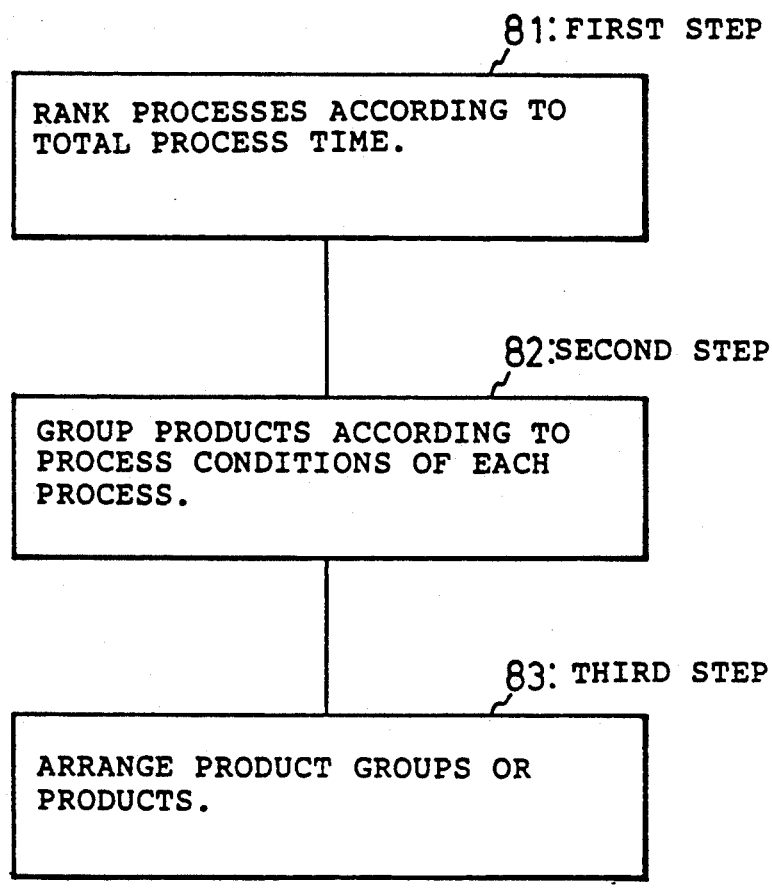

| TIME / PROCESS | 5 10 15 20 25 30 |
|---|---|
| PROCESS A | ▨⑦▨③ ④ ▨①  ⑤ ②▨⑥ |
| PROCESS B | ▨ ⑦ ③ ④ ① ▨⑤ ② ⑥ |
| PROCESS C | ▨⑦ ③▨④ ① ⑤▨②⑥ |

| JOB TO BE FED | MAN-HOURS IN A | MAN-HOURS IN B |
|---|---|---|
| JOB 1 | 5 | 10 |
| JOB 2 | 3 | 5 |
| JOB 3 | 10 | 3 |
| JOB 4 | — | 4 |

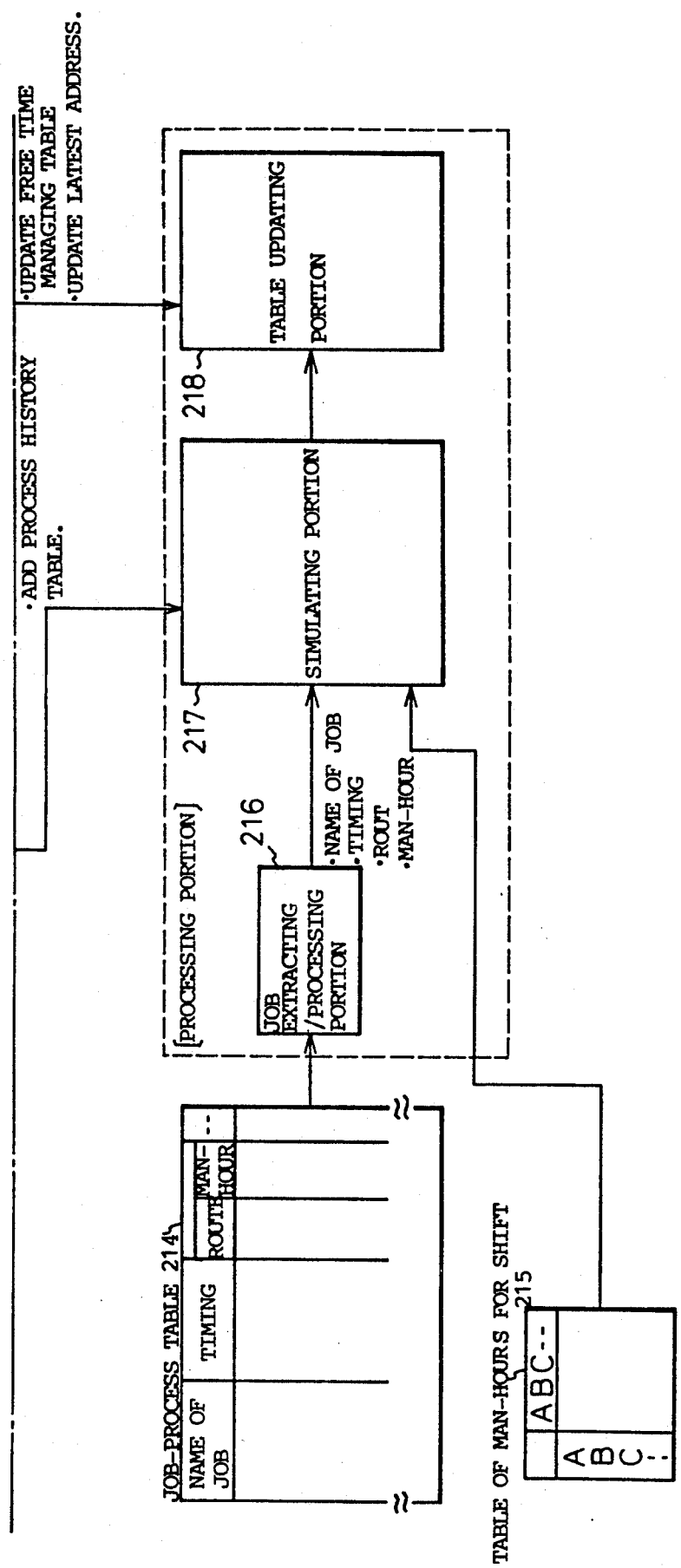

Fig.22

| NAME OF JOB | START TIME | END TIME | DELIVERY TIME |
|---|---|---|---|
| | | | |

| START TIME | END TIME |
|---|---|
| 0 | ∞ |

| No | NAME OF JOB | TIMING | ROUTE AND MAN-HOUR | | | | | |
|---|---|---|---|---|---|---|---|---|
| | | | PROCESS | PROCESS | PROCESS | PROCESS | PROCESS | PROCESS |
| 1 | JOB1 | 0 | A | 10 | B | 5 | C | 10 |
| 2 | JOB2 | 0 | A | 20 | C | 15 | D | 10 |
| 3 | JOB3 | 0 | B | 10 | A | 5 | | |
| 4 | JOB4 | 0 | C | 10 | | | | |
| 5 | JOB4 | 0 | D | 5 | A | 5 | B | 15 |

| | A | B | C | D |
|---|---|---|---|---|
| A | – | – | – | – |
| B | | – | – | – |
| C | 1 | 2 | – | – |
| D | 2 | 3 | 1 | – |

~215

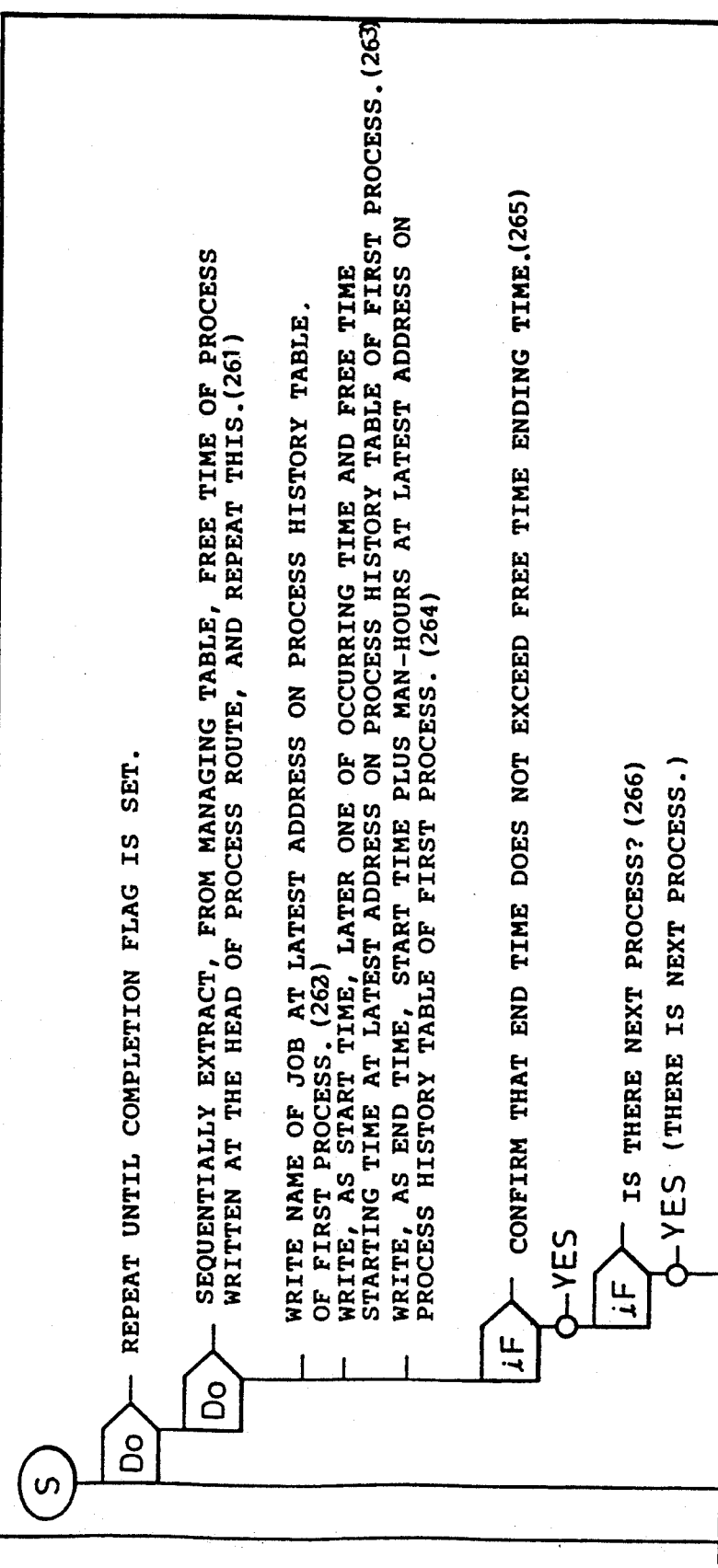

| Fig. 30A | Fig. 30B |

Fig. 30A

PREVIOUS SCHEDULE AND RESULTS

| PRODUCT | QUANTITY | PROCESS | QUANTITY OF REMNANTS | START TIME SCHEDULE | START TIME RESULT | END TIME SCHEDULE | END TIME RESULT |
|---|---|---|---|---|---|---|---|
| a | 25 | A | 0 | 8:00 | 8:00 | 9:00 | 9:00 |
|   |    | B | 0 | 9:00 | 9:00 | 10:00 | 10:00 |
|   |    | C | 0 | 10:00 | 10:00 | 11:00 | 11:00 |
| b | 20 | A | 0 | 9:00 | 9:00 | 9:50 | 9:50 |
|   |    | B | 10 | 9:50 | 9:50 | 10:30 |  |
|   |    | C | 20 | 10:30 |  | 11:00 |  |
| c | 25 | A | 25 | 9:50 |  | 10:40 |  |
|   |    | C | 25 | 10:40 |  | 11:20 |  |

NEW PRODUCTS TO BE FED

| PRODUCT | QUANTITY | PROCESS | QUANTITY |  |  |  |  |
|---|---|---|---|---|---|---|---|
| d | 10 | A | 10 |  |  |  |  |
|   |    | B | 10 |  |  |  |  |
|   |    | C | 10 |  |  |  |  |
| e | 15 | A | 15 |  |  |  |  |
|   |    | B | 15 |  |  |  |  |
|   |    | C | 15 |  |  |  |  |

Fig. 30B

RESCHEDULING →

| PRODUCT | NEW SCHEDULE QUANTITY | PROCESS | QUANTITY OF REMNANTS | START TIME SCHE-DULE | START TIME PROCESS | END TIME SCHE-DULE | END TIME PROCESS |
|---|---|---|---|---|---|---|---|
| b | 20 | B | 10 | 10:10 | | 10:30 | |
|   |    | C | 20 | 10:30 | | 11:00 | |
| c | 25 | A | 25 | 10:00 | | 10:30 | |
|   |    | C | 25 | 10:30 | | 11:10 | |
| d | 10 | A | 10 | 10:30 | | 11:00 | |
|   |    | B | 10 | 11:00 | | 11:20 | |
|   |    | C | 10 | 11:20 | | 11:30 | |
| e | 15 | A | 15 | 11:00 | | 11:20 | |
|   |    | B | 15 | 11:20 | | 11:40 | |
|   |    | C | 15 | 11:40 | | 12:00 | |

Fig. 32

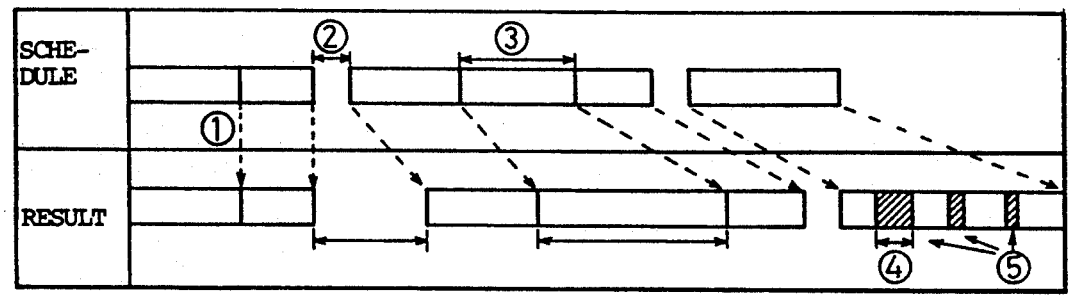

Fig. 33

| | PHENOMENON | CAUSE |
|---|---|---|
| ① | DELAY IN START TIME OR IN END TIME | AFTEREFFECT OF CERTAIN PREVIOUS DELAY DECREASE IN WORK EFFICIENCY etc |
| ② | INCREASE IN WAIT TIME | FAILURE OF CARRIER, SHORTAGE OF TRANSPORTATION CAPACITY, INFLUENCE OF DELAY IN OTHER PROCESSES. |
| ②' | INCREASE IN PREPARATION TIME | DECREASE IN EFFICIENCY OF WORK SUCH AS PREPARATION WORK etc |
| ③ | INCREASE IN OPERATION TIME | OCCURRENCE OF ERROR, DECREASE IN WORK EFFICIENCY; etc |
| ④ | INCREASE IN ERROR RESTORATION TIME | DECREASE IN WORK EFFICIENCY, etc |
| ⑤ | INCREASE IN THE NUMBER OF ERRORS | ABNORMALITY IN FACILITIES etc |

| No. | TRANSPORTATION SCHEDULE | | | |
|---|---|---|---|---|
| | TIME | PRODUCT | FROM | TO |
| 1 | 8:00 | a | St | A |
| 2 | 8:00 | b | St | C |
| 3 | 8:00 | c | St | B |
| 4 | 8:00 | e | St | D |
| 5 | 8:30 | c | B | C |
| 6 | 8:40 | b | C | A |
| 7 | 8:40 | a | A | B |
| 8 | 8:50 | e | D | ST |

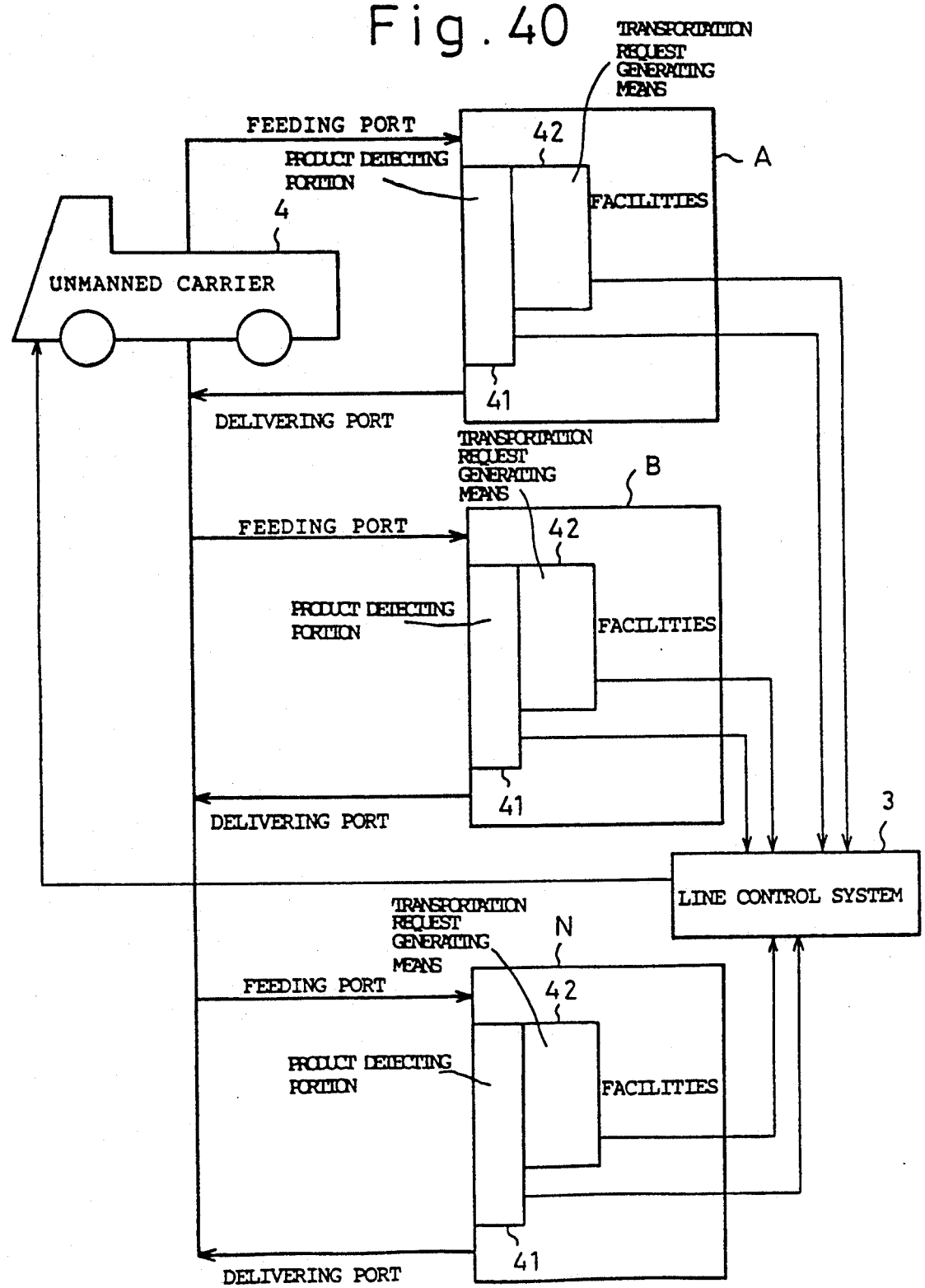

Fig. 42

FACILITIES A 41A

| | PRODUCT | SCHEDULED START TIME | SCHEDULED END TIME |
|---|---|---|---|
| 1 | a | 8:00 | 8:40 |
| 2 | b | 8:40 | 8:50 |
| 3 | d | 8:50 | 9:00 |
| 4 | : | : | : |
| 5 | : | : | : |
| 6 | : | : | : |
| 7 | : | : | : |

POINTER →

| PRODUCT | RPOCESS ROUTE | | | | | PRESENT LOCATION |
|---|---|---|---|---|---|---|
| | (1) | (2) | (3) | (4) | (5) | |
| a | A | B | C | | | 1 |
| b | C | A | | | | 1 |
| c | B | C | D | | | 2 |
| d | A | C | B | | | 0 |
| e | D | | | | | 1 |

Fig. 46

| FACILITIES | 8:00　　9:00　　10:00　　11:00 |
|---|---|
| A | a \| b \| d |
| B | c　　a　　　　d |
| C | b　　c　　a　　d |
| D | e　　　c |

Fig. 47B

[SCHEDULE TABLE FOR FACILITIES A]

| No | PRO-DUCT | START TIME | END TIME |
|----|----------|------------|----------|
| 1  | a        | 8:00       | 8:40     |
| 2  | b        | 8:40       | 8:50     |
| 3  | d        | 8:50       | 9:00     |

▲ POINTER

[SCHEDULE TABLE FOR FACILITIES B]

| No | PRO-DUCT | START TIME | END TIME |
|----|----------|------------|----------|
| 1  | c        | 8:00       | 8:30     |
| 2  | a        | 8:40       | 9:10     |
| 3  | d        | 10:10      | 10:30    |

▲ POINTER

[SCHEDULE TABLE FOR FACILITIES C]

| No | PRO-DUCT | START TIME | END TIME |
|----|----------|------------|----------|
| 1  | b        | 8:00       | 8:20     |
| 2  | c        | 8:30       | 9:20     |
| 3  | a        | 9:20       | 9:50     |
| 4  | d        | 9:50       | 10:10    |

▲ POINTER

[SCHEDULE TABLE FOR FACILITIES D]

| No | PRO-DUCT | START TIME | END TIME |
|----|----------|------------|----------|
| 1  | e        | 8:00       | 8:50     |
| 2  | c        | 9:20       | 9:40     |

▲ POINTER

[PROCESS ROUTE TABLE]

| PRO-DUCT | PROCESS ROUTE (1)(2)(3)(4) | PRE-SENT LOCA-TION |
|----------|----------------------------|---------------------|
| a | A B C    | 1 |
| b | C A      | 1 |
| c | B C D    | 1 |
| d | A C D B  | 0 |
| e | D        | 1 |

- LOADER OF C IS EMPTY.
- UNLOADER OF B HAS PRODUCT c c : B ⟶ C

Fig. 47D

[SCHEDULE TABLE FOR FACILITIES A]

| No | PRO-DUCT | START TIME | END TIME |
|---|---|---|---|
| 1 | a | 8:00 | 8:40 |
| 2 | b | 8:40 | 8:50 |
| 3 | d | 8:50 | 9:00 |

▲ POINTER

[SCHEDULE TABLE FOR FACILITIES B]

| No | PRO-DUCT | START TIME | END TIME |
|---|---|---|---|
| 1 | c | 8:00 | 8:30 |
| 2 | a | 8:40 | 9:10 |
| 3 | d | 10:10 | 10:30 |

▲ POINTER

[SCHEDULE TABLE FOR FACILITIES C]

| No | PRO-DUCT | START TIME | END TIME |
|---|---|---|---|
| 1 | b | 8:00 | 8:20 |
| 2 | c | 8:30 | 9:20 |
| 3 | a | 9:20 | 9:50 |
| 4 | d | 9:50 | 10:10 |

▲ POINTER

[SCHEDULE TABLE FOR FACILITIES D]

| No | PRO-DUCT | START TIME | END TIME |
|---|---|---|---|
| 1 | e | 8:00 | 8:50 |
| 2 | c | 9:20 | 9:40 |

▲ POINTER

PROCESS ROUTE TABLE

| PRO-DUCT | PROCESS ROUTE (1)(2)(3)(4) | PRESENT LOCATION |
|---|---|---|
| a | A B C | 2 |
| b | C A | 1 |
| c | B C D | 2 |
| d | A C B | 0 |
| e | D | 1 |

- LOADER OF A IS EMPTY.
- UNLOADER OF C HAS PRODUCT b.

[SCHEDULE TABLE FOR FACILITIES A]

| No | PRO-DUCT | START TIME | END TIME |
|---|---|---|---|
| 1 | a | 8:00 | 8:40 |
| 2 | b | 8:40 | 8:50 |
| 3 | d | 8:50 | 9:00 |

▲ POINTER

[SCHEDULE TABLE FOR FACILITIES B]

| No | PRO-DUCT | START TIME | END TIME |
|---|---|---|---|
| 1 | c | 8:00 | 8:30 |
| 2 | a | 8:40 | 9:10 |
| 3 | d | 10:10 | 10:30 |

△ POINTER

[SCHEDULE TABLE FOR FACILITIES C]

| No | PRO-DUCT | START TIME | END TIME |
|---|---|---|---|
| 1 | b | 8:00 | 8:20 |
| 2 | c | 8:30 | 9:20 |
| 3 | a | 9:20 | 9:50 |
| 4 | d | 9:50 | 10:10 |

△ POINTER

[SCHEDULE TABLE FOR FACILITIES D]

| No | PRO-DUCT | START TIME | END TIME |
|---|---|---|---|
| 1 | e | 8:00 | 8:50 |
| 2 | c | 9:20 | 9:40 |

△ POINTER

PROCESS ROUTE TABLE

| PRO-DUCT | PROCESS ROUTE | | | | PRE-SENT LOCA-TION |
|---|---|---|---|---|---|
| | (1) | (2) | (3) | (4) | |
| a | A | B | C | | 2 |
| b | C | A | | | 2 |
| c | B | C | D | | 2 |
| d | A | C | B | | 0 |
| e | D | | | | 1 |

· UNLOADER OF D HAS PRODUCT e.
· NO PROCESS AFTER e.

[SCHEDULE TABLE FOR FACILITIES A]

| No | PRO-DUCT | START TIME | END TIME |
|---|---|---|---|
| 1 | a | 8:00 | 8:40 |
| 2 | b | 8:40 | 8:50 |
| 3 | d | 8:50 | 9:00 |

▲ POINTER

[SCHEDULE TABLE FOR FACILITIES B]

| No | PRO-DUCT | START TIME | END TIME |
|---|---|---|---|
| 1 | c | 8:00 | 8:30 |
| 2 | a | 8:40 | 9:10 |
| 3 | d | 10:10 | 10:30 |

▲ POINTER

[SCHEDULE TABLE FOR FACILITIES C]

| No | PRO-DUCT | START TIME | END TIME |
|---|---|---|---|
| 1 | b | 8:00 | 8:20 |
| 2 | c | 8:30 | 9:20 |
| 3 | a | 9:20 | 9:50 |
| 4 | d | 9:50 | 10:10 |

▲ POINTER

[SCHEDULE TABLE FOR FACILITIES D]

| No | PRO-DUCT | START TIME | END TIME |
|---|---|---|---|
| 1 | e | 8:00 | 8:50 |
| 2 | c | 9:20 | 9:40 |

▲ POINTER

PROCESS ROUTE TABLE

| PRO-DUCT | PROCESS ROUTE | | | | PRESENT LOCATION |
|---|---|---|---|---|---|
| | (1) | (2) | (3) | (4) | |
| a | A | B | C | | 2 |
| b | C | A | | | 2 |
| c | B | C | D | | 2 |
| d | A | C | B | | 0 |
| e | D | | | | x |

- LOADER OF A IS EMPTY.
- PRODUCT d IS PRESENTLY LOCATED AT st.

[SCHEDULE TABLE FOR FACILITIES A]

| No | PRO-DUCT | START TIME | END TIME |
|---|---|---|---|
| 1 | a | 8:00 | 8:40 |
| 2 | b | 8:40 | 8:50 |
| 3 | d | 8:50 | 9:00 |

[SCHEDULE TABLE FOR FACILITIES B]

| No | PRO-DUCT | START TIME | END TIME |
|---|---|---|---|
| 1 | c | 8:00 | 8:30 |
| 2 | a | 8:40 | 9:10 |
| 3 | d | 10:10 | 10:30 |

[SCHEDULE TABLE FOR FACILITIES C]

| No | PRO-DUCT | START TIME | END TIME |
|---|---|---|---|
| 1 | b | 8:00 | 8:20 |
| 2 | c | 8:30 | 9:20 |
| 3 | a | 9:20 | 9:50 |
| 4 | d | 9:50 | 10:10 |

[SCHEDULE TABLE FOR FACILITIES D]

| No | PRO-DUCT | START TIME | END TIME |
|---|---|---|---|
| 1 | e | 8:00 | 8:50 |
| 2 | c | 9:20 | 9:40 |

PROCESS ROUTE TABLE

| PRO-DUCT | PROCESS ROUTE | | | | PRESENT LOCATION |
|---|---|---|---|---|---|
| | (1) | (2) | (3) | (4) | |
| a | A | B | C | | 2 |
| b | C | A | | | 2 |
| c | B | C | D | | 2 |
| d | A | C | B | | 1 |
| e | D | | | | x |

· UNLOADER OF A HAS PRODUCT b.
· NO PROCESS AFTER b.

[SCHEDULE TABLE FOR FACILITIES A]

| No | PRO-DUCT | START TIME | END TIME |
|----|----------|------------|----------|
| 1  | a        | 8:00       | 8:40     |
| 2  | b        | 8:40       | 8:50     |
| 3  | d        | 8:50       | 9:00     |

[SCHEDULE TABLE FOR FACILITIES B]

| No | PRO-DUCT | START TIME | END TIME |
|----|----------|------------|----------|
| 1  | c        | 8:00       | 8:30     |
| 2  | a        | 8:40       | 9:10     |
| 3  | d        | 10:10      | 10:30    |

[SCHEDULE TABLE FOR FACILITIES C]

| No | PRO-DUCT | START TIME | END TIME |
|----|----------|------------|----------|
| 1  | b        | 8:00       | 8:20     |
| 2  | c        | 8:30       | 9:20     |
| 3  | a        | 9:20       | 9:50     |
| 4  | d        | 9:50       | 10:10    |

[SCHEDULE TABLE FOR FACILITIES D]

| No | PRO-DUCT | START TIME | END TIME |
|----|----------|------------|----------|
| 1  | e        | 8:00       | 8:50     |
| 2  | c        | 9:20       | 9:40     |

PROCESS ROUTE TABLE

| PRO-DUCT | PROCESS ROUTE (1) | (2) | (3) | (4) | PRE-SENT LOCA-TION |
|----------|-----|-----|-----|-----|--------------------|
| a | A | B | C |   | 2 |
| b | C | A |   |   | x |
| c | B | C | D |   | 2 |
| d | A | C | B |   | 1 |
| e | D |   |   |   | x |

· LOADER OF C IS EMPTY.
· UNLOADER OF B HAS PRODUCT a.

[SCHEDULE TABLE FOR FACILITIES A]

| No | PRO-DUCT | START TIME | END TIME |
|---|---|---|---|
| 1 | a | 8:00 | 8:40 |
| 2 | b | 8:40 | 8:50 |
| 3 | d | 8:50 | 9:00 |

[SCHEDULE TABLE FOR FACILITIES B]

| No | PRO-DUCT | START TIME | END TIME |
|---|---|---|---|
| 1 | c | 8:00 | 8:30 |
| 2 | a | 8:40 | 9:10 |
| 3 | d | 10:10 | 10:30 |

[SCHEDULE TABLE FOR FACILITIES C]

| No | PRO-DUCT | START TIME | END TIME |
|---|---|---|---|
| 1 | b | 8:00 | 8:20 |
| 2 | c | 8:30 | 9:20 |
| 3 | a | 9:20 | 9:50 |
| 4 | d | 9:50 | 10:10 |

[SCHEDULE TABLE FOR FACILITIES D]

| No | PRO-DUCT | START TIME | END TIME |
|---|---|---|---|
| 1 | e | 8:00 | 8:50 |
| 2 | c | 9:20 | 9:40 |

PROCESS ROUTE TABLE

| PRO-DUCT | PROCESS ROUTE | | | | PRE-SENT LOCA-TION |
|---|---|---|---|---|---|
| | (1) | (2) | (3) | (4) | |
| a | A | B | C | | 3 |
| b | C | A | | | x |
| c | B | A | D | | 2 |
| d | A | C | D | B | 1 |
| e | D | | | | x |

- LOADER OF C IS EMPTY.
- UNLOADER OF A HAS PRODUCT d.

[SCHEDULE TABLE FOR FACILITIES A]

| No | PRO-DUCT | START TIME | END TIME |
|---|---|---|---|
| 1 | a | 8:00 | 8:40 |
| 2 | b | 8:40 | 8:50 |
| 3 | d | 8:50 | 9:00 |

[SCHEDULE TABLE FOR FACILITIES B]

| No | PRO-DUCT | START TIME | END TIME |
|---|---|---|---|
| 1 | c | 8:00 | 8:30 |
| 2 | a | 8:40 | 9:10 |
| 3 | d | 10:10 | 10:30 |

[SCHEDULE TABLE FOR FACILITIES C]

| No | PRO-DUCT | START TIME | END TIME |
|---|---|---|---|
| 1 | b | 8:00 | 8:20 |
| 2 | c | 8:30 | 9:20 |
| 3 | a | 9:20 | 9:50 |
| 4 | d | 9:50 | 10:10 |

[SCHEDULE TABLE FOR FACILITIES D]

| No | PRO-DUCT | START TIME | END TIME |
|---|---|---|---|
| 1 | e | 8:00 | 8:50 |
| 2 | c | 9:20 | 9:40 |

PROCESS ROUTE TABLE

| PRO-DUCT | PROCESS ROUTE (1)(2)(3)(4) | | | | PRE-SENT LOCA-TION |
|---|---|---|---|---|---|
| a | A | B | C | | 3 |
| b | C | A | | | x |
| c | B | C | D | | 2 |
| d | A | C | B | | 2 |
| e | D | | | | x |

- LOADER OF D IS EMPTY.
- UNLOADER OF C HAS PRODUCT c.

[SCHEDULE TABLE FOR FACILITIES A]

| No | PRO-DUCT | START TIME | END TIME |
|----|------|------|------|
| 1 | a | 8:00 | 8:40 |
| 2 | b | 8:40 | 8:50 |
| 3 | d | 8:50 | 9:00 |

[SCHEDULE TABLE FOR FACILITIES B]

| No | PRO-DUCT | START TIME | END TIME |
|----|------|------|------|
| 1 | c | 8:00 | 8:30 |
| 2 | a | 8:40 | 9:10 |
| 3 | d | 10:10 | 10:30 |

[SCHEDULE TABLE FOR FACILITIES C]

| No | PRO-DUCT | START TIME | END TIME |
|----|------|------|------|
| 1 | b | 8:00 | 8:20 |
| 2 | c | 8:30 | 9:20 |
| 3 | a | 9:20 | 9:50 |
| 4 | d | 9:50 | 10:10 |

[SCHEDULE TABLE FOR FACILITIES D]

| No | PRO-DUCT | START TIME | END TIME |
|----|------|------|------|
| 1 | e | 8:00 | 8:50 |
| 2 | c | 9:20 | 9:40 |

PROCESS ROUTE TABLE

| PRO-DUCT | PROCESS ROUTE | | | | PRE-SENT LOCA-TION |
|------|-----|-----|-----|-----|------|
| | (1) | (2) | (3) | (4) | |
| a | A | B | C | | 3 |
| b | C | A | | | x |
| c | B | C | D | | 3 |
| d | A | C | B | | 2' |
| e | D | | | | x |

- UNLOADER OF D HAS PRODUCT c.
- NO PROCESS AFTER c.

[SCHEDULE TABLE FOR FACILITIES A]

| No | PRO-DUCT | START TIME | END TIME |
|---|---|---|---|
| 1 | a | 8:00 | 8:40 |
| 2 | b | 8:40 | 8:50 |
| 3 | d | 8:50 | 9:00 |

[SCHEDULE TABLE FOR FACILITIES B]

| No | PRO-DUCT | START TIME | END TIME |
|---|---|---|---|
| 1 | c | 8:00 | 8:30 |
| 2 | a | 8:40 | 9:10 |
| 3 | d | 10:10 | 10:30 |

[SCHEDULE TABLE FOR FACILITIES C]

| No | PRO-DUCT | START TIME | END TIME |
|---|---|---|---|
| 1 | b | 8:00 | 8:20 |
| 2 | c | 8:30 | 9:20 |
| 3 | a | 9:20 | 9:50 |
| 4 | d | 9:50 | 10:10 |

[SCHEDULE TABLE FOR FACILITIES D]

| No | PRO-DUCT | START TIME | END TIME |
|---|---|---|---|
| 1 | e | 8:00 | 8:50 |
| 2 | c | 9:20 | 9:40 |

PROCESS ROUTE TABLE

| PRO-DUCT | PROCESS ROUTE | | | | PRESENT LOCATION |
|---|---|---|---|---|---|
| | (1) | (2) | (3) | (4) | |
| a | A | B | C | | 3 |
| b | C | A | | | × |
| c | B | C | D | | × |
| d | A | C | B | | 2 |
| e | D | | | | × |

- UNLOADER OF C HAS PRODUCT a.
- NO PROCESS AFTER a a : C  ——→ st

Fig. 47M

[SCHEDULE TABLE FOR FACILITIES A]

| No | PRO-DUCT | START TIME | END TIME |
|---|---|---|---|
| 1 | a | 8:00 | 8:40 |
| 2 | b | 8:40 | 8:50 |
| 3 | d | 8:50 | 9:00 |

[SCHEDULE TABLE FOR FACILITIES B]

| No | PRO-DUCT | START TIME | END TIME |
|---|---|---|---|
| 1 | c | 8:00 | 8:30 |
| 2 | a | 8:40 | 9:10 |
| 3 | d | 10:10 | 10:30 |

[SCHEDULE TABLE FOR FACILITIES C]

| No | PRO-DUCT | START TIME | END TIME |
|---|---|---|---|
| 1 | b | 8:00 | 8:20 |
| 2 | c | 8:30 | 9:20 |
| 3 | a | 9:20 | 9:50 |
| 4 | d | 9:50 | 10:10 |

[SCHEDULE TABLE FOR FACILITIES D]

| No | PRO-DUCT | START TIME | END TIME |
|---|---|---|---|
| 1 | e | 8:00 | 8:50 |
| 2 | c | 9:20 | 9:40 |

PROCESS ROUTE TABLE

| PRO-DUCT | PROCESS ROUTE | | | | PRE-SENT LOCA-TION |
|---|---|---|---|---|---|
| | (1) | (2) | (3) | (4) | |
| a | A | B | C | | x |
| b | C | A | | | x |
| c | B | C | D | | 2 |
| d | A | C | B | | x |
| e | D | | | | |

· LOADER OF B IS EMPTY.
· UNLOADER OF C HAS PRODUCT d.

[SCHEDULE TABLE FOR FACILITIES A]

| No | PRODUCT | START TIME | END TIME |
|---|---|---|---|
| 1 | a | 8:00 | 8:40 |
| 2 | b | 8:40 | 8:50 |
| 3 | d | 8:50 | 9:00 |

[SCHEDULE TABLE FOR FACILITIES B]

| No | PRODUCT | START TIME | END TIME |
|---|---|---|---|
| 1 | c | 8:00 | 8:30 |
| 2 | a | 8:40 | 9:10 |
| 3 | d | 10:10 | 10:30 |

[SCHEDULE TABLE FOR FACILITIES C]

| No | PRODUCT | START TIME | END TIME |
|---|---|---|---|
| 1 | b | 8:00 | 8:20 |
| 2 | c | 8:30 | 9:20 |
| 3 | a | 9:20 | 9:50 |
| 4 | d | 9:50 | 10:10 |

[SCHEDULE TABLE FOR FACILITIES D]

| No | PRODUCT | START TIME | END TIME |
|---|---|---|---|
| 1 | e | 8:00 | 8:50 |
| 2 | c | 9:20 | 9:40 |

PROCESS ROUTE TABLE

| PRODUCT | PROCESS ROUTE (1) | (2) | (3) | (4) | PRESENT LOCATION |
|---|---|---|---|---|---|
| a | A | B | C | | × |
| b | C | A | | | × |
| c | B | C | D | | × |
| d | A | C | B | | 3 |
| e | D | | | | × |

- UNLOADER OF B HAS PRODUCT d.
- NO PROCESS AFTER d d : B d ⟶ st

Fig. 470

[SCHEDULE TABLE FOR FACILITIES A]

| No | PRO-DUCT | START TIME | END TIME |
|---|---|---|---|
| 1 | a | 8:00 | 8:40 |
| 2 | b | 8:40 | 8:50 |
| 3 | d | 8:50 | 9:00 |

[SCHEDULE TABLE FOR FACILITIES B]

| No | PRO-DUCT | START TIME | END TIME |
|---|---|---|---|
| 1 | c | 8:00 | 8:30 |
| 2 | a | 8:40 | 9:10 |
| 3 | d | 10:10 | 10:30 |

[SCHEDULE TABLE FOR FACILITIES C]

| No | PRO-DUCT | START TIME | END TIME |
|---|---|---|---|
| 1 | b | 8:00 | 8:20 |
| 2 | c | 8:30 | 9:20 |
| 3 | a | 9:20 | 9:50 |
| 4 | d | 9:50 | 10:10 |

[SCHEDULE TABLE FOR FACILITIES D]

| No | PRO-DUCT | START TIME | END TIME |
|---|---|---|---|
| 1 | e | 8:00 | 8:50 |
| 2 | c | 9:20 | 9:40 |

PROCESS ROUTE TABLE

| PRO-DUCT | PROCESS ROUTE | | | | PRE-SENT LOCA-TION |
|---|---|---|---|---|---|
| | (1) | (2) | (3) | (4) | |
| a | A | B | C | | × |
| b | C | A | | | × |
| c | B | C | D | | × |
| d | A | C | D | B | × |
| e | D | | | | × |

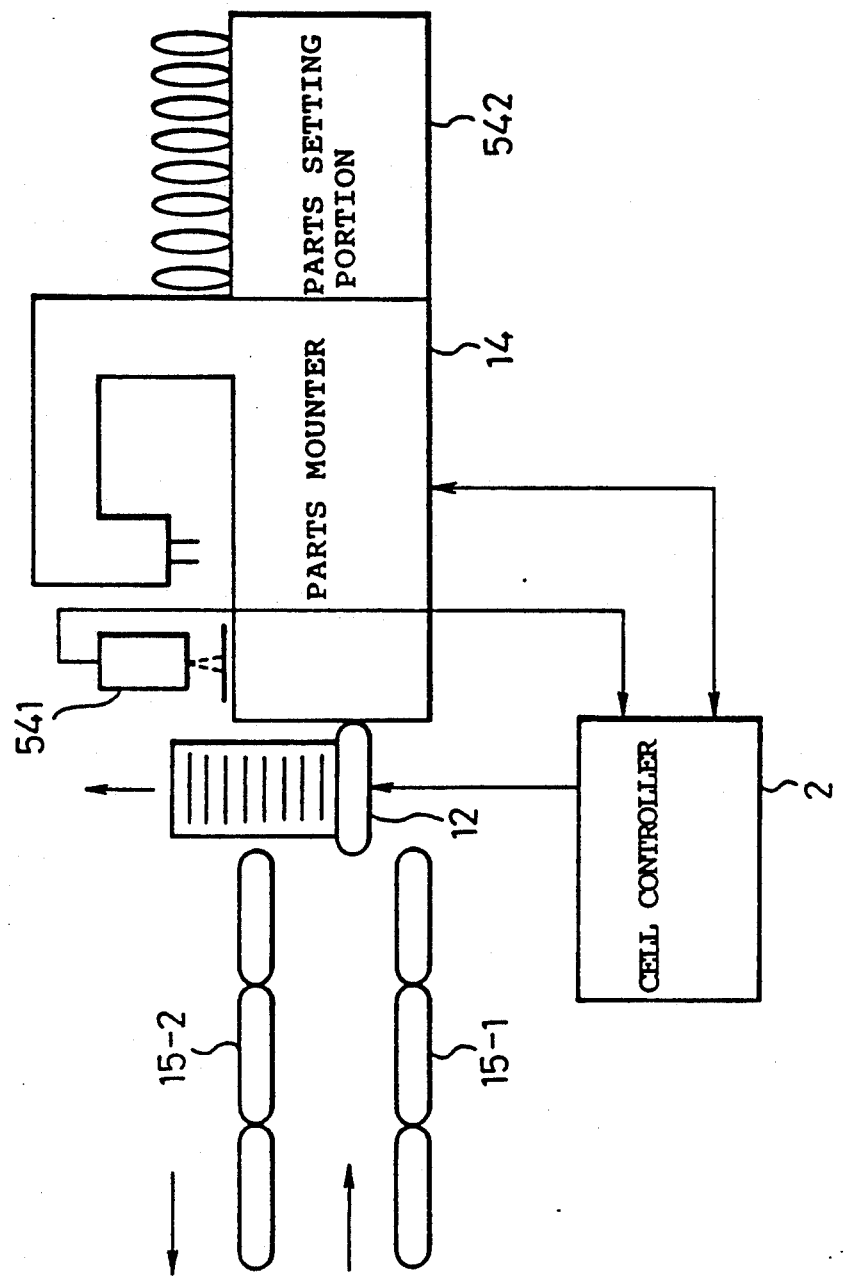

Fig. 51A (PRIOR ART)

| CHANNEL NO. | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| PARTS SPECIFICATIONS | a | b | c | d | e | f | g | h | i | j | | | | | |

Fig. 51B (PRESENT INVENTION)

| CHANNEL NO. | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| PARTS SPECIFICATIONS | a | a | a | b | b | c | d | e | f | g | g | g | g | i | j |

Fig.52

PARTS SPECIFICATIONS MANAGING TABLE

| No | PARTS | QUANTITY |
|---|---|---|
| 1 | a | 30 |
| 2 | b | 20 |
| 3 | c | 15 |
| 4 | d | 10 |
| 5 | e | 20 |
| 6 | f | 15 |
| 7 | g | 10 |
| 8 | h | 25 |
| ⋮ | ⋮ | ⋮ |

Fig.53

CHANNEL MANAGING TABLE

| PARTS | CH | QUANTITY | CHANNEL IN USE CH |
|---|---|---|---|
| a | 1 | 14 | 1 |
| a | 7 | 9 | 0 |
| a | 8 | 7 | 0 |
| b | 3 | 20 | 1 |
| c | 2 | 15 | 1 |
| d | 4 | 3 | 1 |
| d | 5 | 4 | 0 |
| e | 6 | 10 | 1 |
| e | 9 | 12 | 0 |
| e | 10 | 15 | 0 |
| ⋮ | ⋮ | ⋮ | ⋮ |

Fig. 54

NC DATA MANAGING TABLE

| No | PARTS | CH | X | Y | θ |
|----|-------|----|----|----|-----|
| 1  | a     | 1  | 10 | 50 | 0  |
| 2  | a     | 1  | 10 | 20 | 0  |
| 3  | a     | 1  | 20 | 30 | 0  |
| 4  | a     | 1  | 10 | 20 | 90 |
| 5  | a     | 1  | 30 | 50 | 0  |
| 6  | a     | 1  | 10 | 15 | 90 |
| 7  | a     | 7  | 70 | 20 | 0  |
| 8  | b     | 3  | 30 | 20 | 0  |
| 9  | b     | 3  | 90 | 10 | 0  |
| 10 | c     | 2  | 20 | 40 | 0  |
| 11 | d     | 4  | 10 | 20 | 0  |

Fig. 55

TABLE OF CHANNELS OF PREVIOUSLY SENT NC DATA

| No | PARTS | CH |
|----|-------|----|
| 1  | a     | 1  |
| 2  | a     | 1  |
| 3  | a     | 1  |
| 4  | a     | 1  |
| 5  | a     | 1  |
| 6  | a     | 1  |
| 7  | a     | 1  |
| 8  | b     | 3  |
| 9  | b     | 3  |
| 10 | c     | 2  |
| 11 | d     | 4  |

Fig. 58

| Fig. 58A |
|---|
| Fig. 58B |
| Fig. 58C |

Fig. 58A

PARTS SPECIFICATIONS MANAGING TABLE

| PARTS | QUAN-TITY |
|---|---|
| a | 2 |
| b | 4 |
| c | 2 |
| d | 1 |

①

CHANNEL MANAGING TABLE

| PARTS | CH. | QUAN-TITY | IN USE |
|---|---|---|---|
| a | 2 | 10 | 1 |
| b | 1 | 11 | 1 |
| b | 3 | 10 | 0 |
| c | 4 | 10 | 1 |
| d | 5 | 8 | 1 |

NC DATA MANAGING TABLE

| PARTS | CH. | X | Y | Q |
|---|---|---|---|---|
| 1 | a | 2 | 10 | 50 | 0 |
| 2 | a | 2 | 10 | 20 | 0 |
| 3 | b | 1 | 20 | 30 | 0 |
| 4 | b | 1 | 10 | 20 | 90 |
| 5 | b | 1 | 30 | 50 | 0 |
| 6 | b | 1 | 10 | 15 | 90 |
| 7 | c | 4 | 70 | 20 | 0 |
| 8 | c | 4 | 30 | 20 | 0 |
| 9 | d | 5 | 90 | 10 | 0 |

TABLE OF CHANNELS OF PREVIOUSLY SENT NC DATA

| PARTS | CH. |
|---|---|
| 1 | a |
| 2 | a |
| 3 | b |
| 4 | b |
| 5 | b |
| 6 | b |
| 7 | c |
| 8 | c |
| 9 | d |

TRANSMIT NC DATA

②

| PARTS | CH. | QUAN-TITY | IN USE |
|---|---|---|---|
| a | 2 | 8 | 1 |
| b | 1 | 7 | 1 |
| b | 3 | 10 | 0 |
| c | 4 | 8 | 1 |
| d | 5 | 7 | 1 |

| PARTS | CH. | X | Y | Q |
|---|---|---|---|---|
| 1 | a | 2 | | | |
| 2 | a | 2 | | | |
| 3 | b | 1 | | | |
| 4 | b | 1 | | | |
| 5 | b | 1 | | | |
| 6 | b | 1 | | | |
| 7 | c | 4 | | | |
| 8 | c | 4 | | | |
| 9 | d | 5 | | | |

PT COMPLE-TION

| PARTS | CH. |
|---|---|
| 1 | a | 2 |
| 2 | a | 2 |
| 3 | b | 1 |
| 4 | b | 1 |
| 5 | b | 1 |
| 6 | b | 1 |
| 7 | c | 4 |
| 8 | c | 4 |
| 9 | d | 5 |

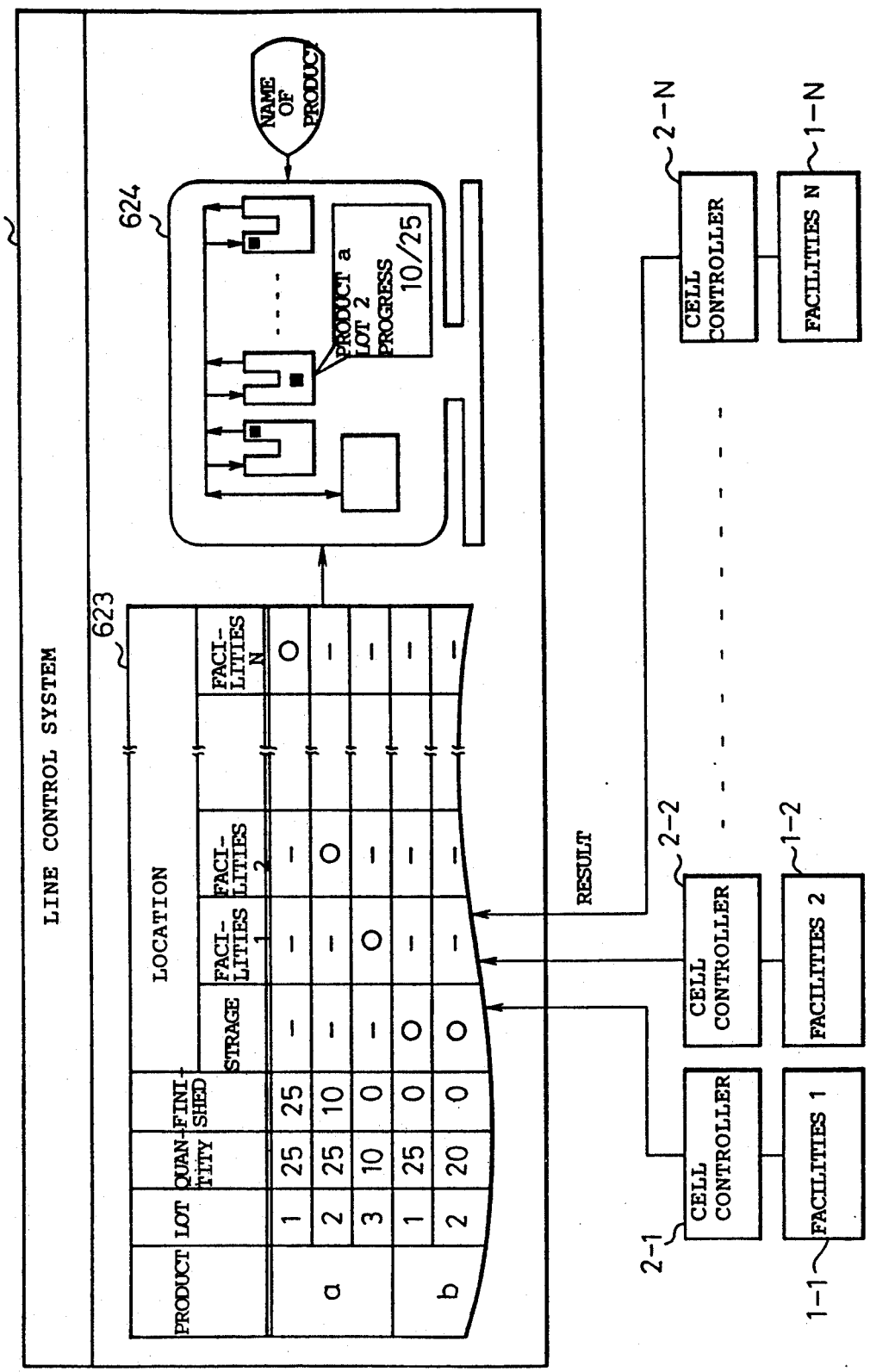

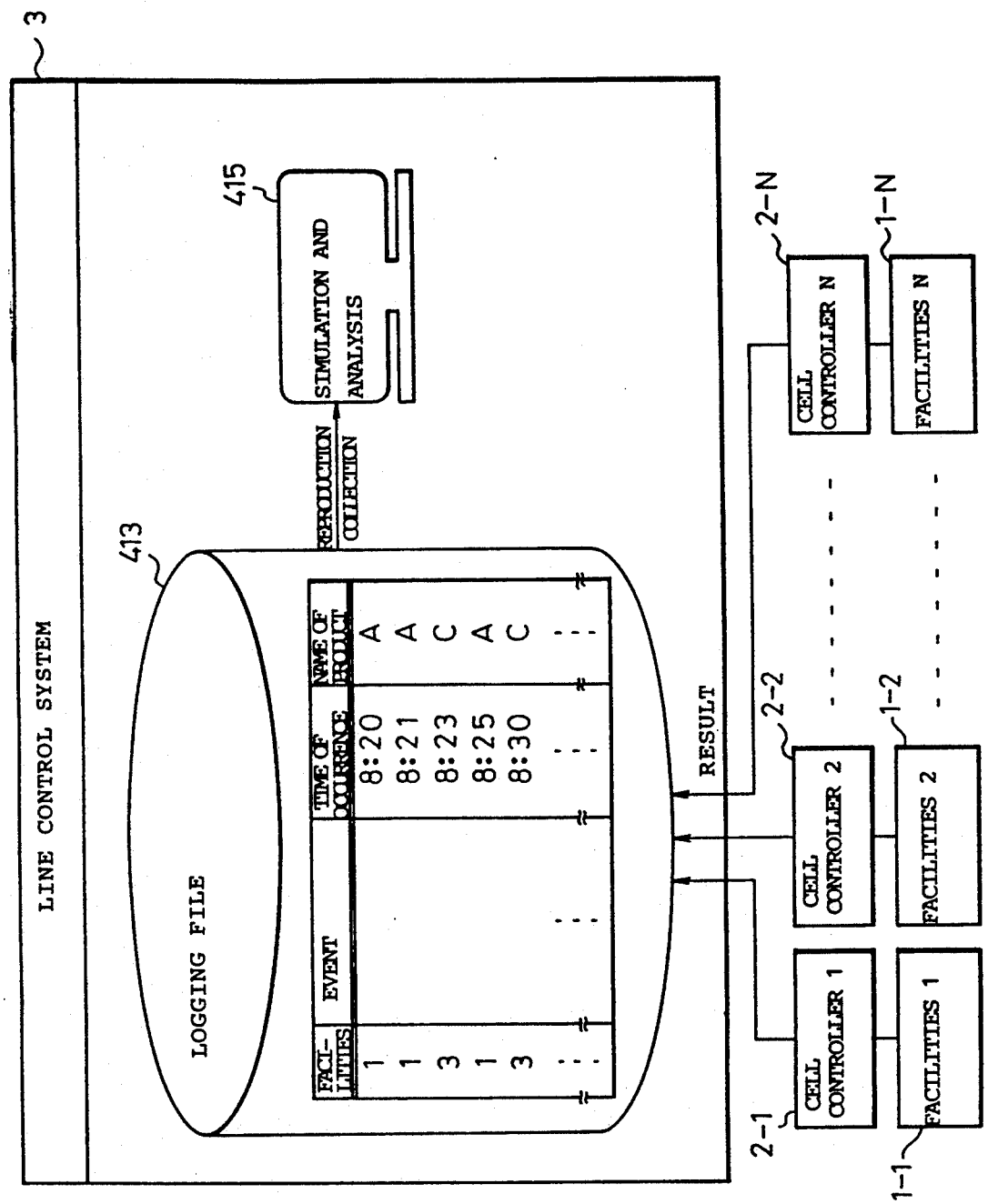

PRODUCTION CONTROL SYSTEM

TECHNICAL FIELD

The present invention relates to a production control system comprising production facilities and physical distribution facilities, and particularly to a control and management system of a unit assembling line.

BACKGROUND ART

In recent years, in the field of electronic devices, products have become compact, light weight, and multifunction. Printed board units for forming the electronic devices have also become highly integrated. These facts have increased the number of parts to be mounted, reduced the size of each part, and complicated the entire process. It is difficult, therefore, to manually assemble the parts. To cope with this, factories have been introducing many automatic parts inserters and mounters. Due to increasing personnel expenses in the factories, there is a need of efficiently operating the introduced expensive equipment with as little manual intervention as possible. Since the needs of customers are diverse and since life cycles of some goods are short, the factories are required to produce many kinds of articles in small quantities within short delivery periods. These factors prevents the unmanned and efficient operation of the factories.

Conventionally, various attempts have been made to provide various apparatus disposed in a production line for each kind of product to realize unmanned and efficient operation. No system, however, has yet been realized that provides unmanned and efficient operation or the line as a whole and for many kinds of products.

DISCLOSURE OF THE INVENTION

In view of the above-mentioned problems, an object of the present invention is to realize a line controlling and managing system that can meet the requirements of producing many kinds of products in small quantities within a short delivery period, improving the productivity of a product control system, and realizing unmanned operation of a line.

To achieve the object, the present invention provides a production control system comprising a plurality of facilities including parts mounters for processing a plurality of products through a plurality of processes, a plurality of cell controllers for controlling the facilities, a line control system for centrally controlling all the cell controllers, and a transporting means for transporting the products between the facilities under the control of the line control system. The line control system prepares a schedule of a relatively short period out of a schedule of a relatively long period, and, considering in real time processing conditions of the products on a line and actually occurring events, prepares a detailed execution schedule, and according to the prepared execution schedule, controls the cell controllers, parts mounters, and transporting means.

It is preferable that the line control system be able to analyze alarms from the facilities detected by the cell controller as actually occurring events. If the result of analysis of the alarm indicates that restoration is impossible or will take a long time, the line control system exclude the troubled facilities to automatically reschedule and prepare an execution schedule. If the analysis of the alarm cannot indicate the cause of the trouble, the line control system provides an indication asking an operator to reschedule.

It is preferable that, when preparation for changing process conditions between processes takes a predetermined time, the line control system comprises a priority ranking table and a sorting table. The line control system determines a total working time of products fed for each process, ranks the processes with priorities in order of the total working time, and stores the priorities in the priority ranking table. Also, the line control system groups the products according to process conditions in each of the ranked processes, and stores the grouped products in the sorting table. The products groups or the products grouped in the sorting table are arranged in such a way that adjacent ones of the groups or the products may have as nearly identical process condition as possible. The product are grouped in order of the total work time to minimize the number of preparations, and a feeding sequence and an execution schedule are prepared.

One of actually occurring events in an urgent article handling request. When the urgent article handling request occurs, it is preferable to prepare the execution schedule in such a way as to feed the urgent article first, or minimize or zero the delivery period of the urgent article.

It is preferable to provide a free time managing table for managing a free time of each process, a process history table for storing the history of jobs to be processed in each process, and a table of shift times for storing shift times between processes. A fed job has a process route and man-hours needed for each process. The execution schedule is preferably made by recursively simulating the start time, end time, and delivery time to the next process of each process according to the process route of each job.

The line control system preferably has a schedule result comparing portion for always comparing an execution schedule with a result derived from a parts mounter, and an alarm generating portion for detecting a deviation based on the comparison and generating an alarm.

The alarm generating portion preferably generates an alarm in real time to notify an operator of a unit assembly line control system.

Each set of facilities preferably has a product detecting portion for detecting whether or not there is a product at a product feeding port. The line control system has a schedule managing table for managing a work schedule of the facilities, and a process route managing table for managing the process route and present location of each product. When the product detecting portion detects that the product feeding port of the facilities is empty, the line control system refers to the process route managing table to find where the product which must be fed to the facilities is in the schedule managing table, and provides a product transportation instruction to a transporting means.

It is preferable that each set of facilities has a product detecting portion for detecting whether or not a product exists at a product feeding port. If the product detecting portion detects that there are no products at the feeding ports of a plurality of facilities sets, the transport request generating means provides a request for transporting the next products. The product detecting portion confirms whether or not there are products at the feeding ports of a plurality of the facilities. If there are no products at the feeding ports, the transportation request means provides a request for transporting the next products. The line control system collates the contents of the transportation request generated by the transportation request portion with processed products, and if there is a product matching the result of collation, provides a transportation instruction to the transporting means.

It is preferable that the parts mounter has a portion for detecting parts that are not yet mounted. If there happens to be a shortage of parts during the processing of a product, shortage information from the portion for detecting parts that are not mounted yet is sent to the cell controller for controlling the parts mounter.

It is preferable that the cell controller receives, from the line control system, NC data indicating a relation between parts and channels in the parts mounter, updates the NC data upon receiving the shortage information to automatically generate new NC data from which the parts in shortage have been deleted, and resends the new NC data to the parts mounter.

It is preferable that the cell controller receives, from the line control system, NC data indicating a relation between parts and channels in the parts mounter, updates the NC data upon receiving the shortage information, automatically generates new NC data that relates the parts in shortage with another channel containing the same parts, and resends the new NC data to the parts mounter.

It is preferable that the facilities comprise a parts shelf for storing parts, and a parts setting portion for taking the parts from the parts shelf and setting the parts on a product. The parts shelf indicates the stored position of each part as and when required. The parts setting portion indicates a relation between channels for storing products and the parts. When it is necessary to change the relation between the parts to be fed and the channels in any of the facilities, the line control system preferably indicates the positions of parts which must be changed on the parts shelf, and the position of the channel in the parts setting portion.

It is preferable that the line control system comprises an NC data memory for storing NC data related to parts to be mounted for each set of facilities. At least two sets of the facilities have the same specifications and are controlled according to the same NC data. The line control system corrects NC data related to one of the two sets of facilities having the same specifications, and immediately reflects the correction onto the other of the two sets of facilities having the same specifications.

The line control system preferably has a dump file for dumping a state of work suspension when work is suspended in a lot to terminate operation of the system. When the system is restarted, the work can be started from the state stored in the dump file.

It is preferable that the line control system collects the state of each set of facilities through the corresponding cell controller, and informs each cell controller of the states of all facilities.

It is preferable that the line control system comprises a logging file for storing operation results collected in real time, and the contents of the logging file can be reproduced on a monitor screen later.

It is preferable that the line control system manages the progress of products to be processed, and displays the location of a product on a graphic screen upon inputting the name of the product.

BRIEF DESCRIPTION OF THE DRAWINGS

FIG. 2 is a construction view showing functions of a cell controller shown in FIG. 1;

FIGS. 3A to 3C are construction views showing a system according to an embodiment of the present invention;

FIGS. 4A to 4D are block diagrams showing functions of the line control system shown in FIG. 1;

FIG. 5 is a block diagram schematically showing scheduling according to an embodiment of the present invention;

FIG. 6 is a view showing an example of work processes;

FIG. 8 is a flowchart explaining a product feeding sequence determining method according to an embodiment of the present invention;

FIGS. 21A to 21C are views showing a system for executing the method of FIG. 20;

FIG. 22 is a view showing an example of a process history table of FIG. 20;

FIG. 23 is a view showing an example of a free time managing table of FIG. 20;

FIG. 24 is a view showing an example of a job table of FIG. 20;

FIG. 25 is a view showing an example of a table of shift time used for the system of FIG. 20;

FIGS. 26A and 26B are flowcharts showing an operation of a simulating portion of FIG. 21;

Figure 28B:
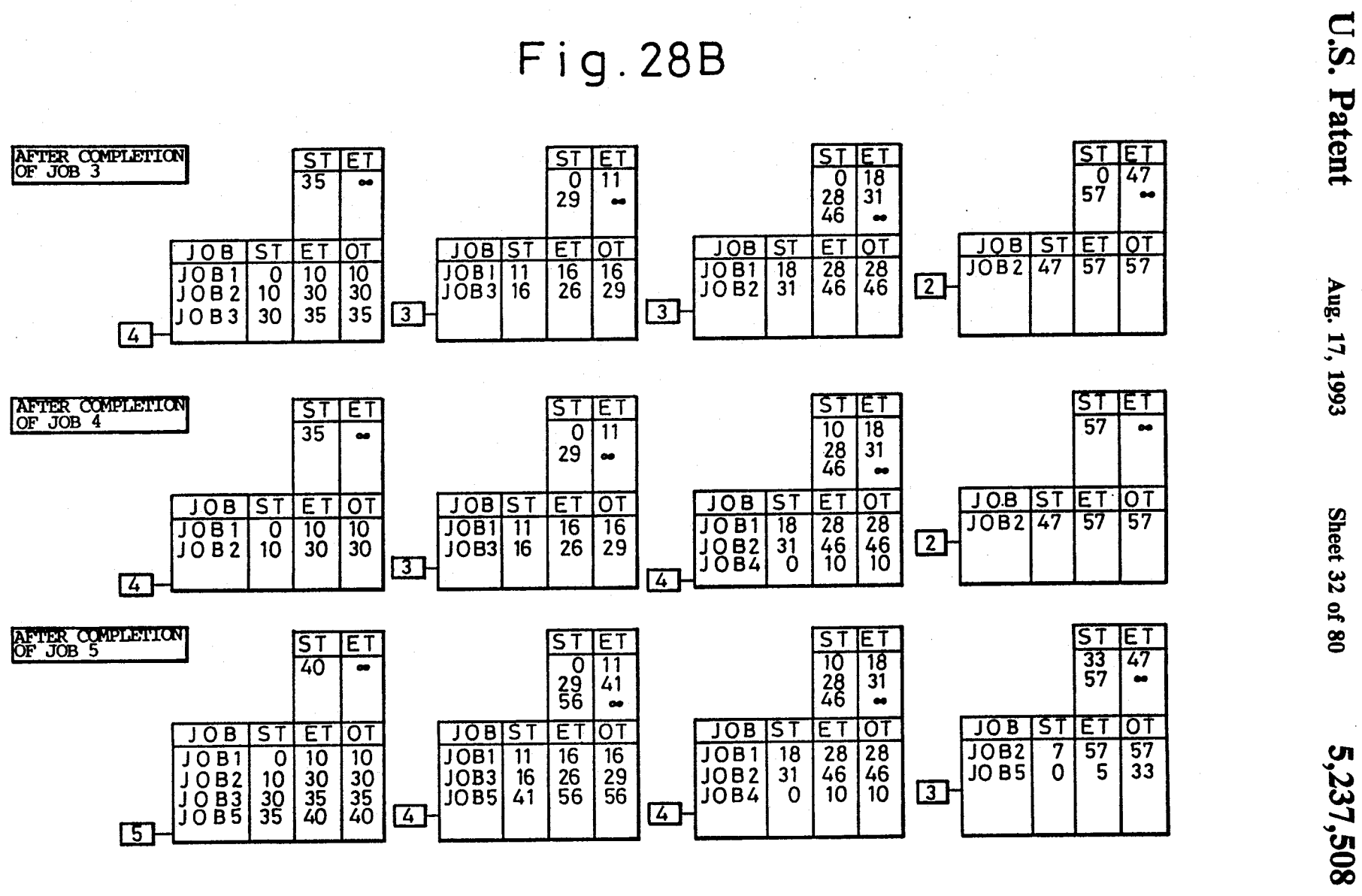

FIGS. 28A and 28B are views showing changes on the process history table and free time managing table shown in FIGS. 22 and 23;

FIGS. 30A and 30B are views explaining rescheduling with preparations being taken into consideration according to an embodiment of the invention;

FIG. 32 is a result of simulation showing schedules and results according to an embodiment of the present invention;

FIG. 33 is a view showing delays relative to the schedules of FIG. 32 and their causes;

FIG. 40 is a view explaining an unmanned carrier control system according to an embodiment of the present invention;

FIG. 42 is a view explaining a schedule managing table of FIG. 41;

FIG. 43 is a view explaining a process route managing table of FIG. 41;

FIG. 46 is a view explaining a work schedule according to the embodiment of FIG. 41;

FIG. 48 is a view showing a general arrangement of a parts mounter;

FIG. 51A is a view explaining the conventional parts mounting method;

FIG. 51B is a view explaining the parts mounting method according to the embodiment of the present invention;

FIG. 52 is a view showing a parts specifications managing FIG. 50;

FIG. 53 is a view showing a channel managing table of FIG. 50;

FIG. 54 is a view showing an NC data managing table of FIG. 50;

FIG. 55 is a view showing a table of channels of previously sent NC data of FIG. 50;

FIGS. 58A, 58B, and 58C and 58 are views showing temporal changes of the contents of the respective tables of FIG. 50;

FIG. 62 is an explanatory view showing a function of indicating the locations and progress conditions of products in the system of FIG. 56 according to an embodiment of the present invention; and FIG. 63 is a view explaining the logging of manufacturing results in the system of FIG. 56 according to an embodiment of the present invention.

BEST MODE FOR CARRYING OUT THE INVENTION

Figure 1:
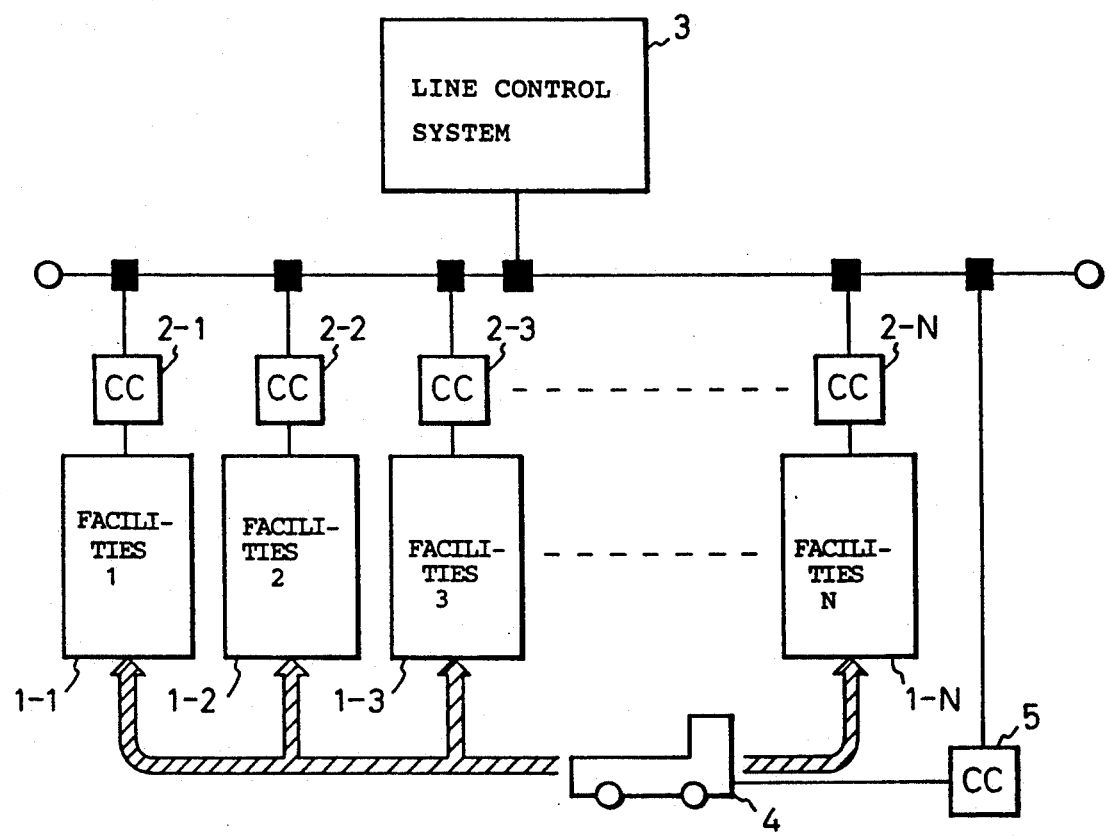
FIG. 1 is a system configuration diagram showing a unit assembling line controlling system applied to the present invention.

Through all the figures, the same reference numerals denote the same parts.

FIG. 1 is a schematic view showing a unit assembling line control system serving as a product control system applied to the present invention. In the figure, each set of facilities 1-1, 1-2, 1-3, ..., 1-N including parts mounters, rack storages, and transporting equipment has corresponding cell controllers 2-1, 2-2, 2-3, ..., 2-N. The cell controllers control the facilities, collect production results, and provide information for operators of the corresponding facilities. The cell controllers are not necessarily connected to the facilities in a one-to-one relationship. One cell controller may be provided for plurality of facilities sets. These cell controllers are connected to a line control system 3 through communication circuits such as a local area network (LAN). A transporting means 4 such as an unmanned carrier (hereinafter called an unmanned carrier or mobile carrier) is controlled by a cell controller 5 to transport articles fed to or delivered from the facilities.

FIG. 2 is a schematic view showing one of the functions of the cell controller shown in FIG. 1. As is apparent from the figure, the cell controller 2 controls racks 11 supplied by the unmanned carrier 4 and a parts mounter 14 in such a manner that necessary racks are transported on a conveyor 15 and loaded on a lifter 16, and a required printed board 13 is sent to the parts mounter 14 by a pusher 12. The parts mounter 14 mounts necessary parts on the printed board 12, and returns the printed board to the rack 11. The rack is then delivered through the conveyor 15. Each of the cell controllers has the following functions:

(1) Supplying and delivering the racks to an inserter and from a mounter in cooperation with the unmanned carrier.
(2) Recognizing the kinds of printed boards accommodated in the racks.
(3) Supplying and delivering the printed boards to the inserter and from the mounter.
(4) Transferring NC data managed by the line control system to the inserter and from the mounter.
(5) Transferring production results to the line control system.
(6) Controlling the unmanned carrier.
(7) Managing the racks in a storage, and controlling the storage.

FIG. 3A is a schematic view showing a printed board assembling line according to an embodiment of the present invention. With reference to FIG. 3A, a hardware arrangement and a main function will roughly be explained. The line comprises a plurality of inserter lines for automatically inserting ICs 14, axial lead parts (AX) 14, and radial lead parts (RD) 14, a plurality of mounters 32 for automatically mounting surface mounted parts (SMD), a rack storage 37, and unmanned carriers 4. These are managed and controlled by cell controllers 2-1 to 2-N. These cell controllers are connected to a line control system 3 through a LAN. The line control system 3 collectively manages transferred results. NC data is centrally controlled by a database in the line control system 3. The cell controllers 2-1 to 2-N refer to the database with a server function to correct or add the data, thereby reflecting the results to all automatic machines having the same specifications. In addition, the line control system 3 has a function of preparing a weekly schedule and evaluating the same, a function of preparing a daily execution schedule taking preparations, failure of the facilities, and so forth into consideration, a function of supporting scheduled production such as controlling the unmanned carrier according to the execution schedule, monitoring results, and so forth, and a function of collecting production results and analyzing them. As shown in the figure, the cell controller 2-1 controls a surface mounting technique (SMT) line Ln comprising a printing machine 31, a mounter 32, and a reflow 33. The cell controller 2-2 controls the inserter lines for inserting parts depending on the kinds of the parts such as ICs, axial lead parts AX, radial lead parts RD, and so forth. The cell controller 2-(N-1) controls a surface mounting technique (SMT) line L1 comprising a dispenser 34, a mounter 35, and a curing oven 36. The cell controller 2-N controls the rack storage 37 for storing completed printed boards.

Figure 3B:
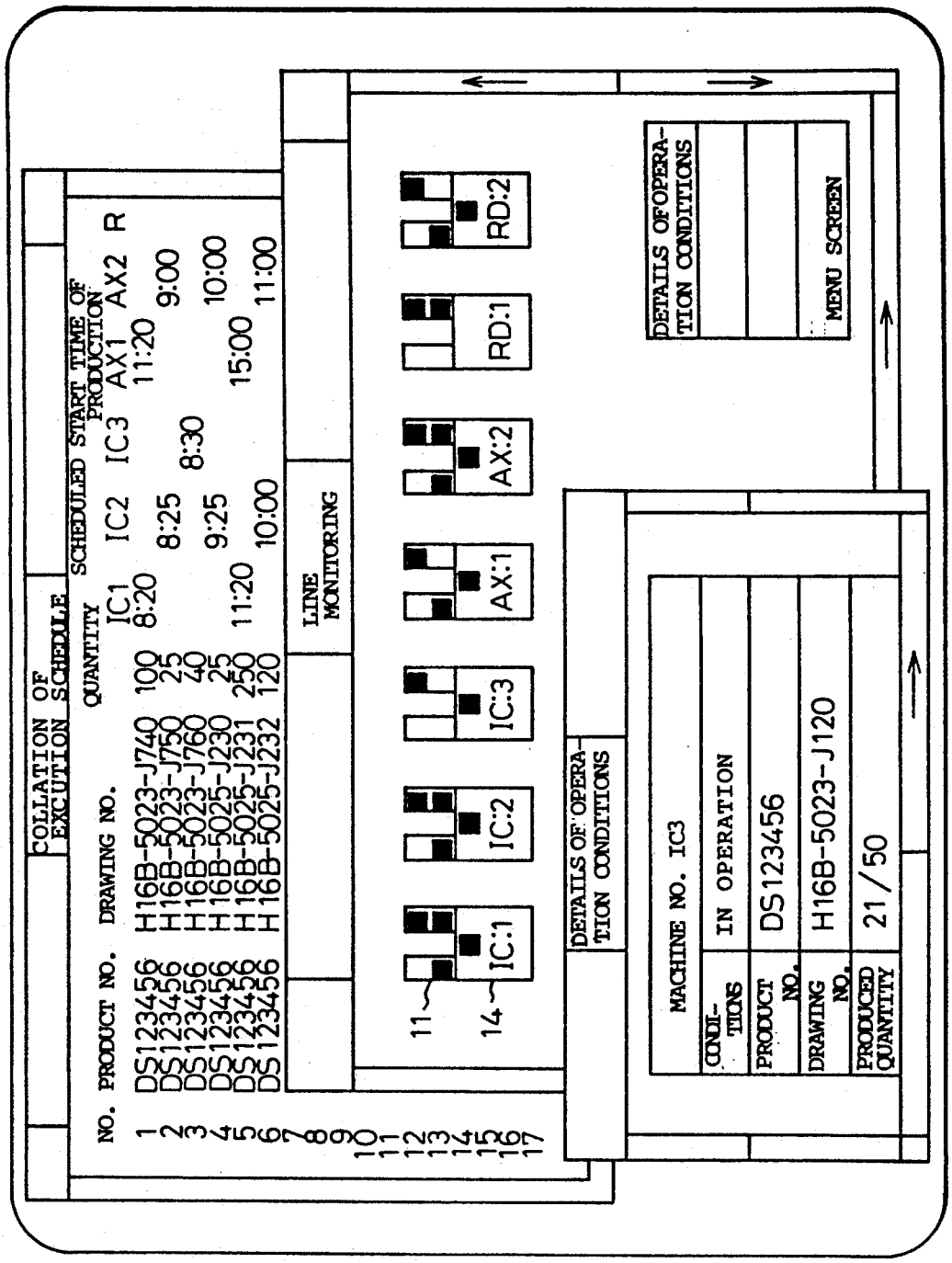
Figure 3C:
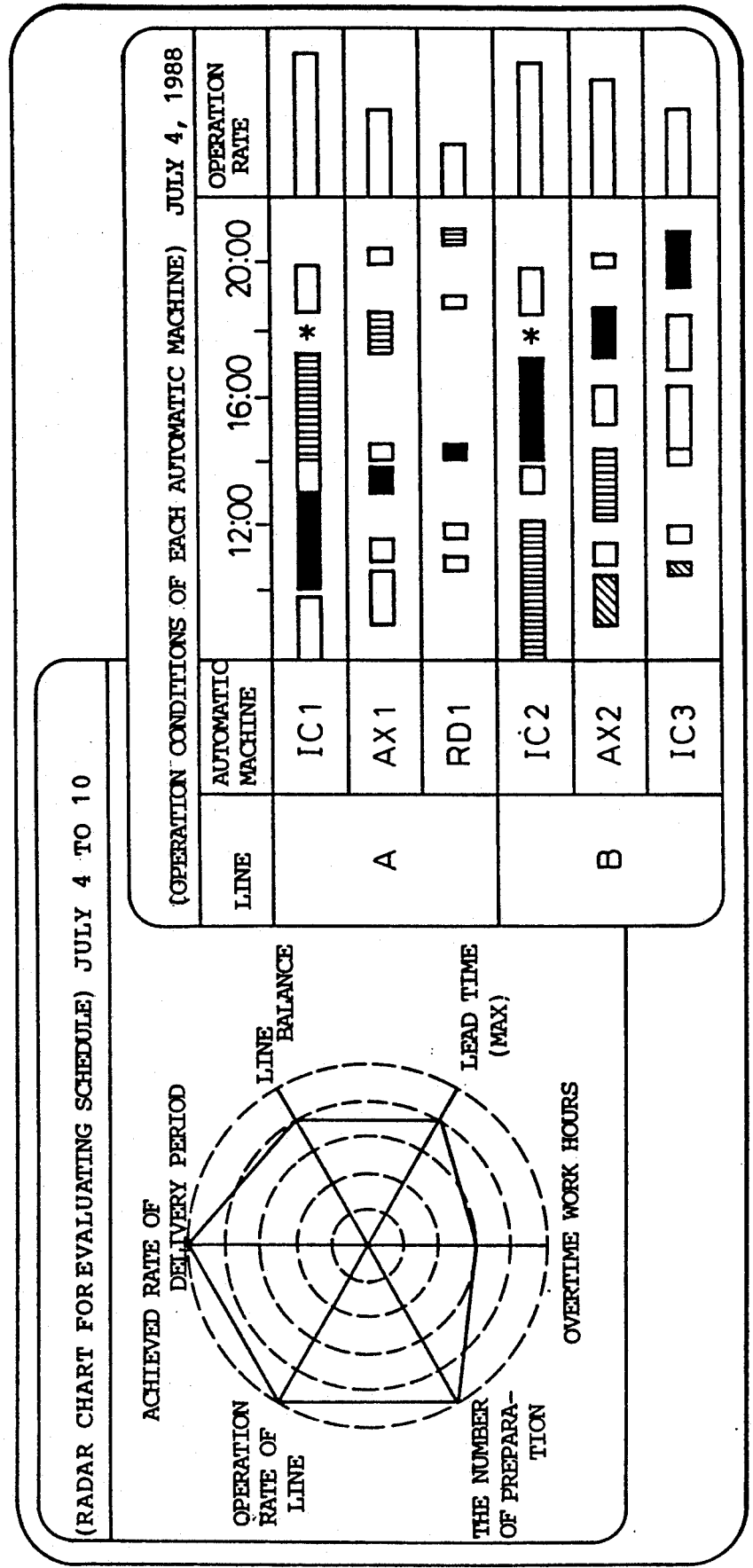

As shown in the figure, the line control system 3 controls the cell controllers 2-1 to 2-N as a whole, prepares a weekly schedule, evaluates the weekly schedule, prepares a daily execution schedule, controls the automatic machines and mobile carriers (unmanned carriers), monitors line operating conditions, issues work instructions to cope with changing situations, etc. These functions can be displayed on a display unit. In FIG. 3B, the daily execution schedule is displayed in response to an inquiry of the schedule, and it is possible to collectively monitor which product starts to be produced in which automatic machine at what time. Line operating conditions are monitored and displayed as the details of line monitoring and operating conditions. In monitoring the line, ICs1, ICs2, ICs3, AXs1, AXs2, RDs1, RDs2 denote monitored states of the parts mounters 14 shown in FIG. 2, which are arranged for the kinds of parts, respectively. By observing the positions of the racks 11 displayed on the monitor at each of the parts mounters 14, it is possible to collectively monitor the present positions of the racks. The details of operating conditions indicate in real time which automatic machine has processed which products in how many pieces so far. FIG. 3C shows a schedule evaluation radar chart and operating conditions of respective automatic machines. The schedule evaluation radar chart indicates the weekly evaluation of various factors such as an achieved delivery period, a line operation rate, the amount of preparation, overtime work hours, lead time, and line balance. The operating conditions of the respective automatic machines show job occupying time of each automatic machine in each line, thereby indicating the operation rate of the automatic machine.

FIGS. 4A to 4D are block diagrams explaining various functions provided by the line control system shown in FIGS. 1 and 3A.

Figure 4A:
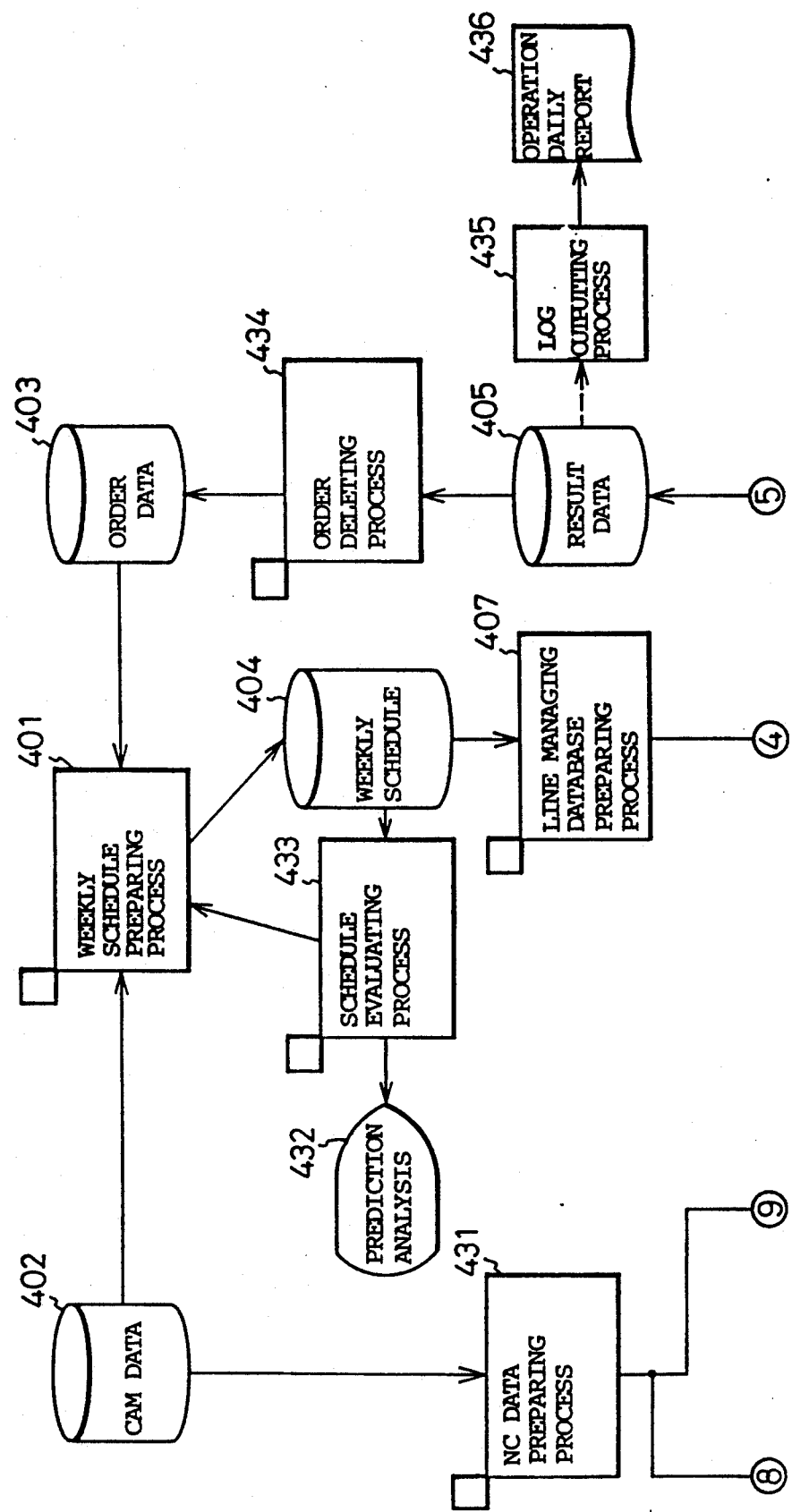

In FIG. 4A, a weekly schedule preparing process 401 prepares a weekly schedule according to CAM data 402 and order data 403, and stores the weekly schedule in a weekly schedule memory 404. Here, the weekly schedule is a prediction of load, operation rate, etc., of the line, and is not limited particularly to the schedule of the period of seven days. A schedule evaluating process 433 analyzes the prepared schedule, and displays the result of the analysis on a screen. If a line manager judges that the schedule is satisfactory, the line manager activates a line managing database preparing process 407. If the schedule is not satisfactory, the line manager changes parameters in a line dividing method, a lot dividing method, and so forth, and activates the weekly schedule preparing process again.

Figure 4C:
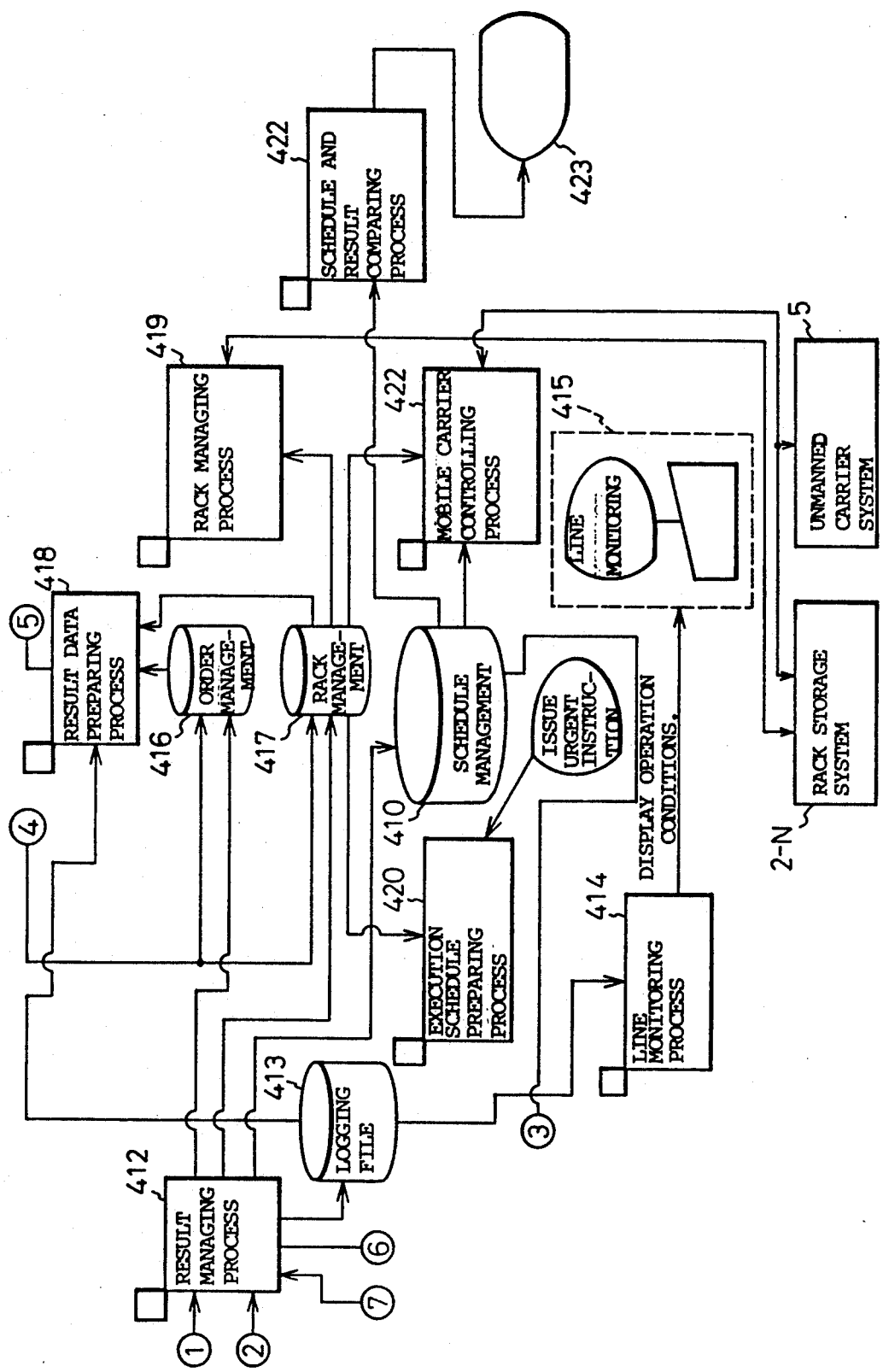

The data in the weekly schedule memory 404 is changed by the line managing database preparing process 407, and stored in an order managing memory 416 (FIG. 4C) and a rack managing memory 417 (FIG. 4C).

Data in a result data memory 405 is used by an order deleting process 434 to delete progress information of order data 403 as well as printing an operation daily report through a daily report output process 435.

According to data in the CAM data memory 402 which stores parts mounting information for printed boards, an NC data preparing process 431 prepares NC data specific for the respective parts mounters, stores the NC data in an NC data managing memory 409, prepares parts setting information for parts channels of the parts mounters 14 (FIG. 2), and stores the parts setting information in a parts channel data memory 437 (FIG. 4B).

In FIG. 4B, a communication process 408 for each of the parts mounters 14 communicates with the cell controllers 2 for the kinds of corresponding parts, delivery errors, error restoration, result data, and NC data, and sends these events and result data to a result managing process 412 (FIG. 4C).

In FIG. 4C, the result managing process 412 saves operating conditions in an operating condition saving memory 411 when the operation of the line control system ends, and fetches the data out of the memory 411 when the line control system is started. The data prepared by the result managing process 412 are used to update progress on orders, racks, and the schedules in the order managing memory 416, rack managing memory 417, and schedule managing memory 410, and storing the result in a logging file 413. The data of the logging file 413 is transferred to a line monitor process 414 to display operating conditions on a line monitor 415, and to the result data preparing process 418. According to this data, order progress information from the order managing memory 416, and rack progress information from the rack managing memory 417, the result data preparing process 418 prepares result data, which is stored in the result data memory 405. According to the rack managing data and an urgent instruction, an execution schedule preparing process 420 prepares an execution schedule. According to data from the result managing process 412 and data from the execution schedule preparing process 420, the schedule managing memory 410 stores execution schedule information.

Figure 4D:
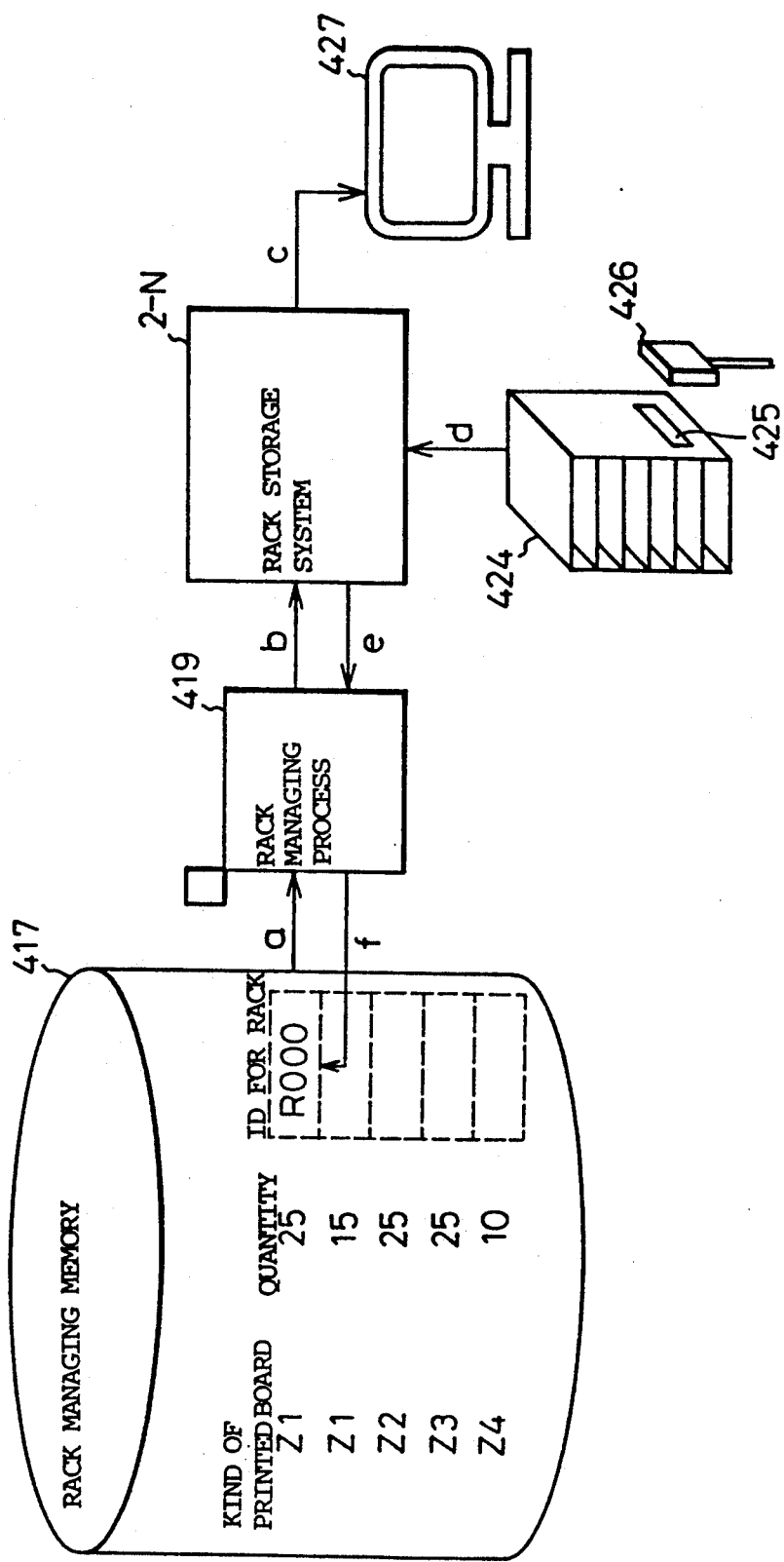

As shown in FIG. 4D, the rack managing process 419 receives information of the number of printed boards per rack and the kinds of the printed boards from the rack managing memory 417 (a), and communicates with the rack storage system (cell controller) 2-N (refer to FIG. 3A) (b) to display the information on a display 426 (c). When a rack with printed boards is actually stored in a storage 424, the rack managing process relates the contents of the rack and of a bar code 425 of the rack obtained through a bar code reader 426, and feeds the information to the rack managing memory 417 (d, e, f). In the figure, marks a, b, c, d, e, and f denote the flow of signals. According to the data from the rack managing memory 417 and schedule managing memory 410, an unmanned carrier control process 421 communicates with the unmanned carrier system (cell controller) 5 to control the unmanned carriers. A schedule result comparing process 422 receives data from the schedule managing memory 410, compares the schedule with the results, and displays a comparison result on the display 423.

Processes of the invention will be roughly explained according to the data flow shown in FIGS. 4A to 4D.

[1] Preparation of weekly schedule

On the weekend of a previous week, order information in the order data memory 403 and CAM information in the CAM data memory 402 are referred to form a weekly schedule for the next week according to the weekly schedule preparing process 401. An object of this scheduling is to maintain a delivery period and reduce the load and number of preparations between facilities and between lines by properly forming daily distributions, by distributing a load to a plurality of facilities having the same specifications, by evaluating the result of scheduling, and by carrying out preliminary measures. At first, articles are ranked depending on delivery periods into (1) urgent articles, (2) articles to be fed as early as possible, and (3) articles to be fed at any time. For the scheduling, the delivery periods are given first priority, and if there are urgent articles, the urgent articles are processed before the delivery periods of normal articles. The normal articles have a certain margin in their delivery periods. The urgent articles may have narrower margins or no margins. Articles in each group is further grouped according to preparation conditions, and their man-hours are calculated for distribution among the same facilities. According to the facility feeding sequence thus determined, a feeding simulation (the simulating method will be explained later in more detail) is carried out and evaluated in terms of achieved rates of delivery periods, line operation rates, preparation rates, line balance, average lead time, etc. The result of the simulation is expressed as a radar chart (FIG. 3C). Also, there are functions of providing parameters such as a method of distribution and a method of lot division, to the facilities. An operator may change these parameters to prepare a plurality of schedules, and may judge results of evaluations to select an optimum schedule. Since a deviation in load and a delay in delivery period can be predicted, it is possible to take necessary measures in purchasing parts, etc., in advance.

[2] Storing racks in storage

According to the weekly schedule, workers assemble printed boards of scheduled products, and store them in the rack storage 37 for each rack that is a unit for transportation. At this time, the cell controller 2-N of the rack storage 37 reads a bar code attached to the rack, and relates the contents of the rack to the bar code. The related information is informed to the rack managing process 419 of the line control system 3, and recorded in the rack managing memory 417.

[3] Preparation of execution schedule

According to feeding dates on the weekly schedule, the execution schedule preparing process 420 picks up articles to be fed for a day in question. If there are articles that will not be fed as scheduled due to urgent articles or a shortage of articles, the feeding schedule is changed. Newly fed articles are added to the reminder (including half-finished articles) of the execution schedule of the preceding day to prepare the execution schedule for the day in question (refer to FIGS. 30A and 30B). An aim of this execution schedule is to improve an operation rate and reduce the number of preparations. To achieve this, the number of preparations is minimized from a high load process, and an influence of the preparations on a work time is reduced according to a preparation time reducing method (to be explained later in more detail with reference to FIGS. 6 to 16). With the cooperation of the cell controllers 14, the result managing process 412 always monitors failure conditions of the facilities to prepare the schedule by avoiding the failed facilities. By recursively simulating processing conditions of jobs of the next and the following processes, and by employing a method of simulating job processing time with a correlation of processes being taken into account, a correct simulation can be achieved (to be explained later in detail with reference to FIGS. 17 to 29).

[4] The mobile carrier control process 421 controls the unmanned carriers according to the schedule (to be explained later in detail with reference to FIGS. 36 to 47O).

[5] Support of production in each cell

The unmanned carriers transport racks according to a scheduled feeding sequence. A bar code attached to each rack is read by the cell controller 2. The cell controller 14 refers to the rack managing memory 417 of the line control system 3 to find the contents of the rack, and obtains NC data of products from the NC data memory 409. The NC data is transferred to the automatic machine (parts mounter 14) to start assembling. The transportation and delivery of the racks, the transportation and delivery of printed boards, and the occurrence and restoration of errors are always reported from the cell controllers to the line control system and recorded therein. The line control system compares the schedule with results, and detects frequently occurring errors such as insertion errors and substantial delays. According to line manager's know-how, the respective cell controllers inform workers of countermeasures. Failure information from the automatic machines is detected, and if necessary, rescheduling is requested (to be explained later in detail with reference to FIG. 34). Since the feeding schedule is prepared in advance, it is possible to know whether or not an arrangement must be changed for the next product to be fed. If the arrangement must be changed, lamps are lit at necessary channels and at predetermined positions of a shelf storing the parts to be set in the channels to inform the workers of the situation (refer to FIG. 59). The number of remaining parts is managed. When a shortage occurs in the middle of production, NC data is automatically changed to change channels or delete channels (to be explained later in detail with reference to FIGS. 48 through 58). When work is terminated within a lot, the terminated situation is saved so that the work can be contained from the saved situation (refer to FIG. 61).

[6] Monitoring

Results and error occurring states reported by the respective cells are centrally controlled by the line control system 3. By displaying them on the graphic display 415, it is possible to grasp the whole situation of lines at a single location. These results are transferred to the schedule managing memory 410, and utilized by the schedule result comparing process 422 to compare them with the schedule, or are used for preparing the next schedule.

[7] Collection and reproduction of results (refer to FIG. 63)

Production results and error results are stored in the logging file 413 in order of occurrence. Previous results can be reproduced on the graphic display. Frequency of errors, causes of the errors, restoration time, a ratio of operation time, preparation time, wait time, deviation from the schedule, etc., are collected and displayed as a graph. This will be reference material for improving productivity. A shortage of parts for each printed board is managed to make an after-treatment easier.

The line control system shown in FIGS. 4A to 4C has roughly the following three functions:
- a function of preparing schedules;
- a function of supporting production according to a schedule; and
- a function of analyzing production results.

The functions will be explained sequentially.

[1] Function of preparing schedules

FIG. 5 is a block diagram schematically showing scheduling according to an embodiment of the invention. First, the weekly schedule preparing process 401 refers to the production order information 403 and CMA information 402 and the accomplishment of delivery periods, an improvement in operation rate of facilities, line balance, and a reduction in the number of preparations are taken into consideration to prepare a weekly schedule in advance. The weekly schedule is stored in the memory 404. The evaluating portion 51 evaluates the prepared schedule in terms of operation rate and completion of the delivery periods. Before preparing the weekly schedule, a way of determining a feeding sequence and a way of dividing lots are selected from among a plurality of conditions. If the prepared schedule is evaluated to be unsatisfactory, an operator may change these conditions to effect rescheduling. This may form an optimum weekly schedule.

This weekly schedule makes it possible to anticipate the schedule of the next week in advance and prepare countermeasures. However, in actual practice, there is work remaining from the preceding day (remnants of work of the preceding day), occurrence of urgent articles, failure of facilities, etc., which cause a deviation from the schedule. To cope with this, a schedule (execution schedule) for one work day is precisely prepared according to the following procedures:

The cell controllers 14 of the respective facilities provide, in real time, the communication process 408 with work results. According to the work results, it is grasped how much a previously prepared execution schedule has been digested, and whether or not there are failed facilities. At the same time, a date determined by the weekly schedule is invalidated, and articles to be fed for one day are again extracted, thereby updating the schedule from that moment.

In the scheduling, the following new methods are employed:
(1) Product feeding sequence determining method (method of improving efficiency of preparation time);
(2) Job processing time simulation method;
(3) Scheduling method with half-finished articles being taken into consideration; and
(4) Scheduling method excluding failed facilities.

The above methods will sequentially be explained in detail.

(1) Product feeding sequence determining method (method of improving efficiency of preparation time)

Work time is less affected if preparations occur in a low-load process having a long wait time but not in a high-load process. A product feeding sequence is determined by finding a total work time of products fed to each process, by ranking the processes to minimize preparations, and by grouping the products having the same preparation conditions in each process. This can minimize a completion time being extended due to the preparations. A more detailed explanation will follow.

In the field of electronic appliance manufacturing, different kinds of products are processed (manufactured, worked, etc.), through a plurality of processes. Each process requires preparatory work (arrangement) such as setting process conditions, changing the process conditions, adjusting facilities, and changing materials. In particular, to produce many kinds of products in small quantities, the process conditions must be frequently changed. When products are processed through a single process, it is possible to improve the operating efficiency of facilities by determining a product feeding sequence in such a way as to minimize the number of changes of the process conditions. When products are processed through a plurality of processes, it is not always easy to determine the product feeding sequence. It is preferable, therefore, to provide a method of determining a product feeding sequence that can improve the operating efficiency of facilities in processing products through a plurality of processes.

For example, a plurality of products 1 to 7 shown in Table 1 are processed through a plurality of work processes (processes A, B, and C) in this order as shown in FIG. 6.

| Product | Process A time Work | Process A cond. Process | Process B time Work | Process B cond. Process | Process C time Work | Process C cond. Process |
|---|---|---|---|---|---|---|
| Product 1 | 1 | A-1 | 3 | B-1 | 2 | C-2 |
| Product 2 | 2 | A-1 | 2 | B-2 | 2 | C-1 |
| Product 3 | 2 | A-2 | 5 | B-1 | 2 | C-1 |
| Product 4 | 1 | A-2 | 4 | B-1 | 2 | C-2 |
| Product 5 | 2 | A-1 | 3 | B-2 | 2 | C-2 |
| Product 6 | 1 | A-2 | 3 | B-2 | 1 | C-1 |
| Product 7 | 1 | A-1 | 4 | B-1 | 1 | .C-1 |

In Table 1, the work time is based on an optional unit of time (for example, a minute), and each process requires a work time proportional to the number in the corresponding column. For example, when the product 1 is processed through the process B, it requires a work time three times as long as the process A requires. Each of the processes has two kinds of process conditions (preparations) For example, the process A processes the products 1 and 2 under the same process condition (A-1), but processes the products 2 and 3 under different process conditions (A-1 and A-2), respectively. To process the product 3 after the product 2, the process conditions must be changed from one to another. Changing the process conditions consumes a single unit of time.

Figure 7A:
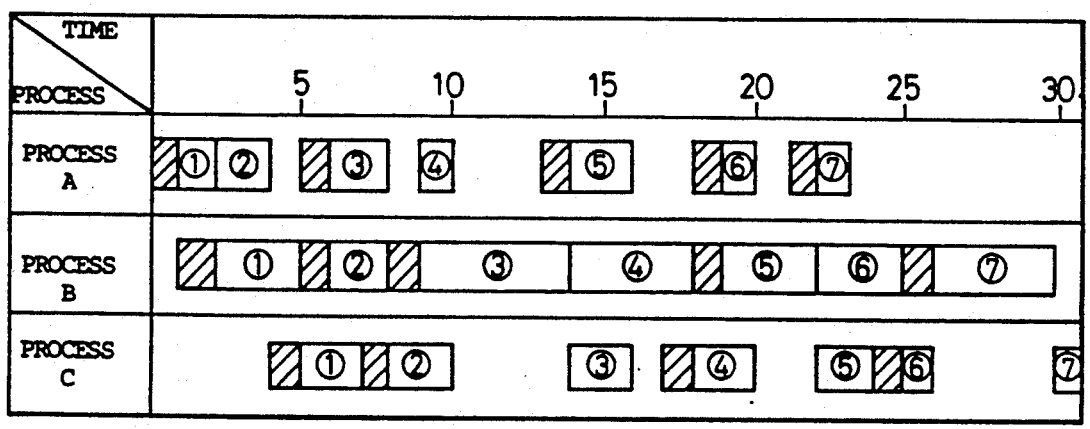
FIGS. 7A and 7B are views showing work diagrams in a conventional method.

FIG. 7A shows a work diagram on which the products 1 to 7 are fed in this order paying no attention to the process conditions of the respective processes. In the figure, numerals of time represent elapsed time based on the above-mentioned unit of time. A hatched part in the figure represents a time period for setting or changing process conditions, i.e., a time for arrangements. As is apparent in the figure, when the product feeding sequence is determined in order of the product numbers without considering the process conditions, the process conditions must be changed from one to another four times in each of the processes A and B and three times in the process C, although there are only two kinds of process conditions in each process.

Figure 7B:
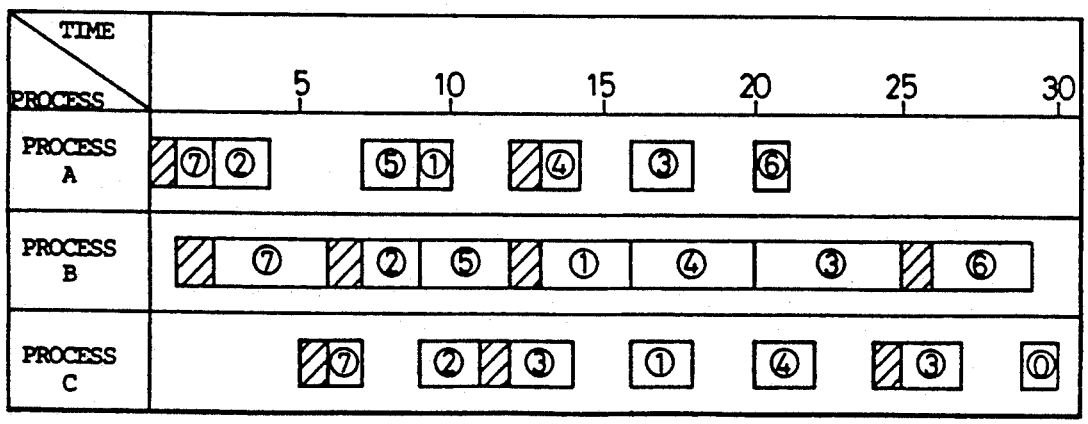

FIG. 7B shows a work diagram which has been prepared to minimize (one time) the number of changes of the process conditions in the process A. Even when products are processed under the same process conditions in the process A, it is not true that the products will be processed under the same process conditions in the other processes. Also, even when the products are processed under different process conditions in the process A, it is not true that the products will be processed under different process conditions in the other processes. Namely, even if the number of changes of the process conditions in the process A is minimized, the numbers of changes of the process conditions in the processes B and C will not be minimized.

When products are fed in order of the product numbers as shown in FIG. 7A, it takes at least 31 units of time to process all the products through all the processes. On the other hand, when the products are fed in such a way as to minimize the number of changes of the process conditions in the process A as shown in FIG. 7B, the number of units of time required in 30. It is necessary to effectively change the process conditions from one to another in each of the processes. Producing many kinds of products in small quantities involves many kinds of process conditions, and may drastically deteriorate the operating efficiency of the facilities, if the process conditions are not effectively switched from one to another.

To solve the problem, an object of the invention is to provide a method of determining a product feeding sequence that can improve operating efficiency of facilities in producing many kinds of products in small quantities.

The problems of the conventional product sequence determining method and the aims of embodiments of the present invention will be explained with reference to the processes and products shown in FIGS. 6, 7A, and 7B and Table 1 in the Specification.

In the process A of FIG. 7B, the product 1 is processed at first, and the process condition is changed to another condition to process the product 4. Compared with the process A, the process B is highly loaded and congested. Accordingly, the product 1 which is completed in the process A at time 10 will be processed in the process B only after time 12. Due to this, the product 4 will never be fed to the process A until the product 1 is transferred from the process A to the process B. During this waiting period, the process conditions can be switched in the process A for processing the product 4. Meanwhile, the process B is continuously processing products, which may require the processing conditions to be changed. Each of these changes requires a spare time. This may deteriorate operating efficiency of facilities. The operating efficiency of facilities can effectively be improved if the number of changes of the process conditions of a high-load process having less waiting time is minimized before minimizing those of low-load processes having a longer waiting time.

Based on this principle, FIG. 8 shows a flow of processes of a product feeding sequence determining method according to an embodiment of the invention.

The method of the invention determines a product feeding sequence for sequentially processing a plurality of products through a plurality of processes each involving several kinds of process conditions that require a predetermined period of time when changed from one to another depending on the products.

The method comprises a first step 81 of finding a total processing time of each of the processes and ranking the processes in order of the total processing time, a second step 82 of grouping the products according to the process conditions in each of the ranked processes, and a third step 83 of arranging the groups or the products in such a way that adjacent ones of the groups or the products may have as nearly identical process conditions as possible.

Examples of detailed procedures of each of the steps and a mode of operation of the invention will be explained next. First, a total processing time is calculated for each of the processes. The results are shown in Table 2.

TABLE 2

| Process | Table processing time | Ranking |
| --- | --- | --- |
| Process A | 10 | 3 |
| Process B | 24 | 1 |
| Process C | 12 | 2 |

It is understood that the load becomes lighter in order of processes B, C, and A. This order determines a priority order.

Figure 9:
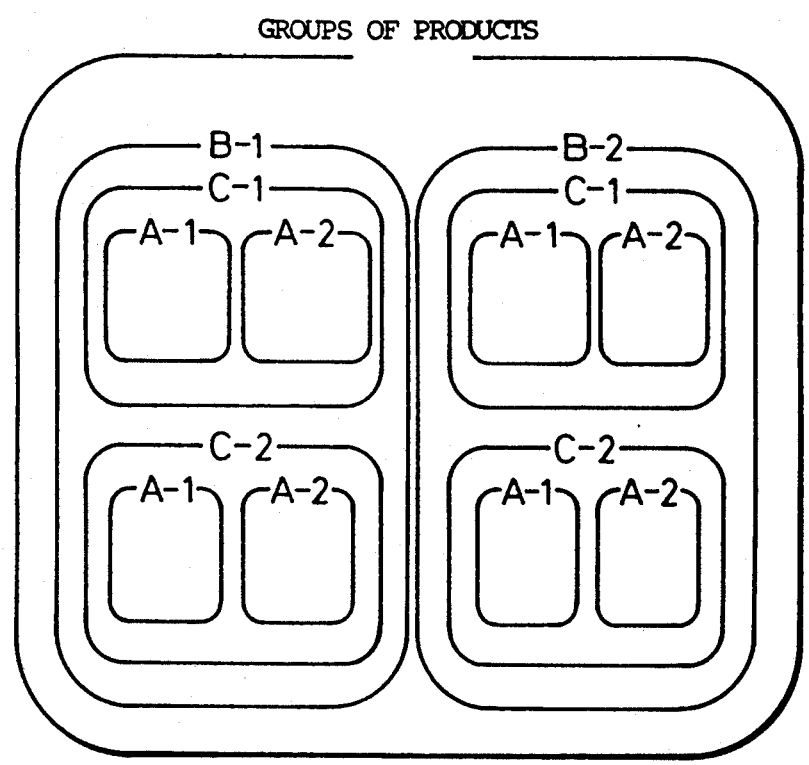
FIG. 9 is a view explaining a concept of grouping according to the method of FIG. 8.
Figure 10:
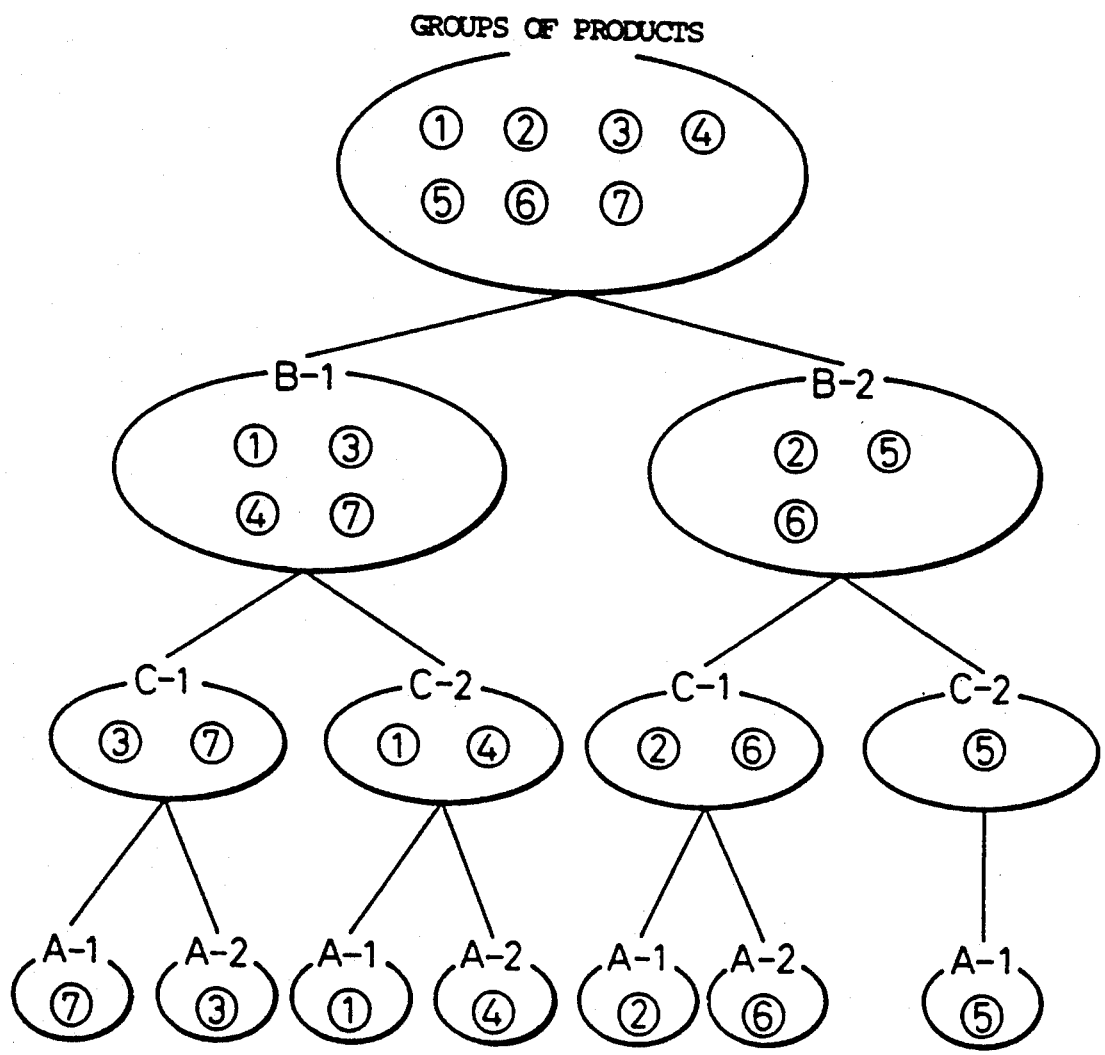
FIG. 10 is a view explaining a sequence of grouping according to the method of FIG. 8.

The products are grouped according to this priority order and the process conditions of the processes B, C, and A in this order. FIG. 9 shows a general idea of the grouping, and FIG. 10 shows a procedure of the grouping. Grouping the products 1 to 7 according to the process conditions of the process B makes a group of the products 1, 3, 4, and 7 under the common process condition (B-1), and a group of the products 2, 5, and 6 under the common process condition (B-2). Grouping the group of products 1, 3, 4, and 7 according to the process conditions of the process C further makes a group of the products 3 and 7 under the common process condition (C-1), and a group of the products 1 and 4 under the process condition (C-2). Grouping the group of products 3 and 7 according to the process conditions of the process A further makes a group of the product 7 and a group of the product 3. In this way, the products are repeatedly grouped according to the ranks of the processes.

Figure 11:
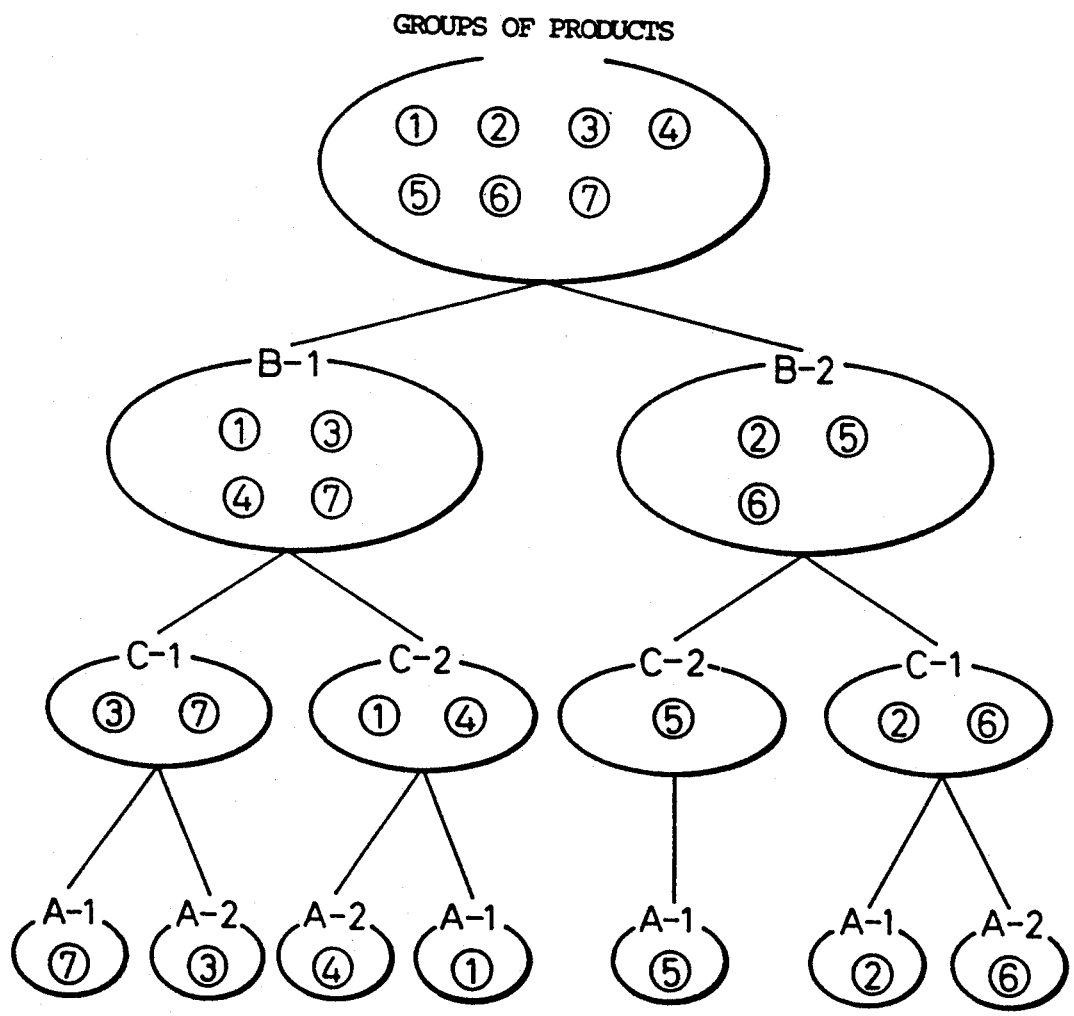
FIG. 11 is a view explaining a product arranging sequence according to the method of FIG. 8.

Thereafter, the groups or the products are rearranged so that the process conditions of horizontally adjacent groups or the process conditions of adjacent products are as nearly identical as possible. The result of this is as shown in FIG. 11. In this figure, the groups of products arranged according to the process conditions of the process B are optionally arranged because their processing conditions B-1 and B-2 will never be identical to each other. The groups of products arranged according to the process conditions of the process C are in order of (C-1), (C-2), (C-1), and (C-2) in FIG. 3. This order will be rearranged into an order of (C-1), (C-2), (C-2), and (C-1). Similarly, the products grouped according to the process conditions of the process A will be rearranged into an order of (A-1), (A-2), (A-2), (A-1), (A-1), (A-1), and (A-2). The order of the products thus rearranged determines a product feeding sequence.

In this way, the product feeding sequence is determined, and according to this sequence, the respective products are processed with no deterioration in operation efficiency of the facilities.

Figure 12:
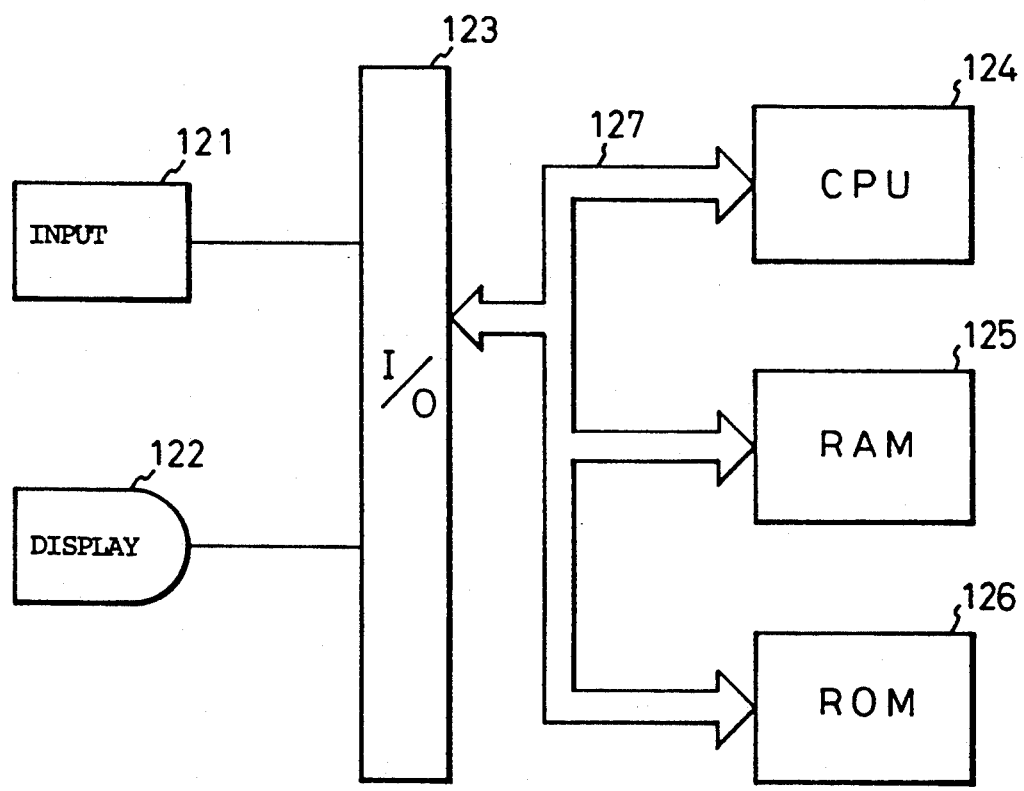
FIG. 12 is a schematic view showing a product feeding sequence determining apparatus which can be employed in executing the method of FIG. 8.

FIG. 12 is a view showing an arrangement of an apparatus for determining a product feeding sequence according to the product feeding sequence determining method of the invention. This apparatus corresponds to the rack feeding process 423 shown in FIG. 4C and comprises an input unit 121 for inputting data of products such as those shown in Table 1, a display unit 122 for displaying a determined product feeding sequence, an I/O circuit 123 having an interfacing function for the input unit 121 and display unit 122, a CPU 124 for computing a total processing time and sorting data, a RAM 125 for temporarily storing a result of computation, a ROM 126 for storing a computation program, and a data bus 127 for interconnecting the I/O circuit 123, CPU 124, RAM 125, and ROM 126 to one another.

Figure 13:
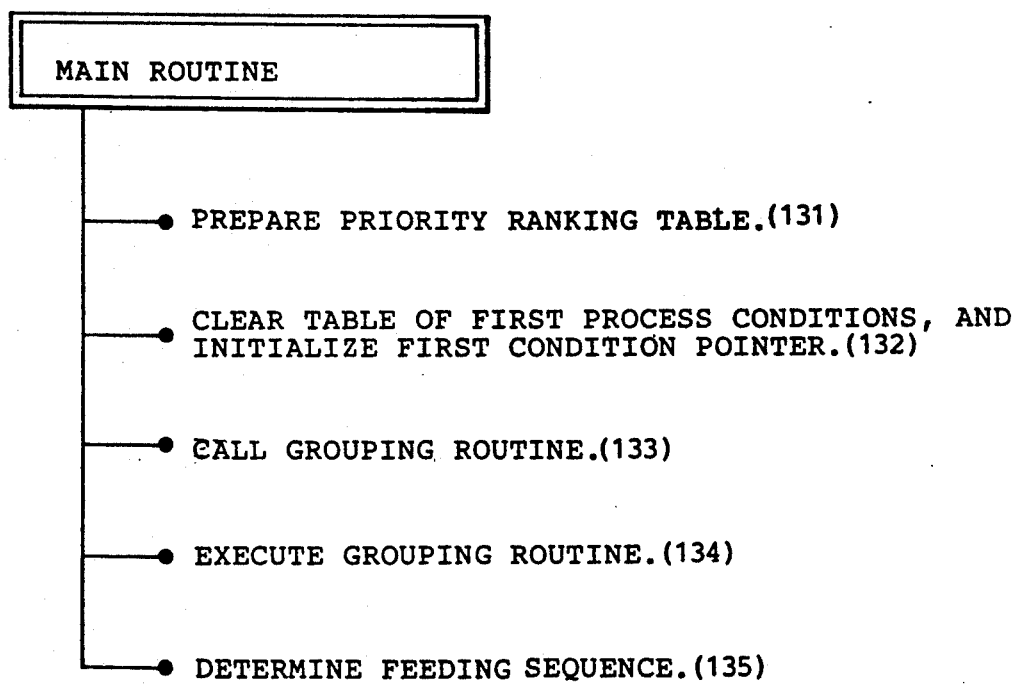
FIG. 13 is a flowchart showing a main routine according to the method of FIG. 8.
Figure 14:
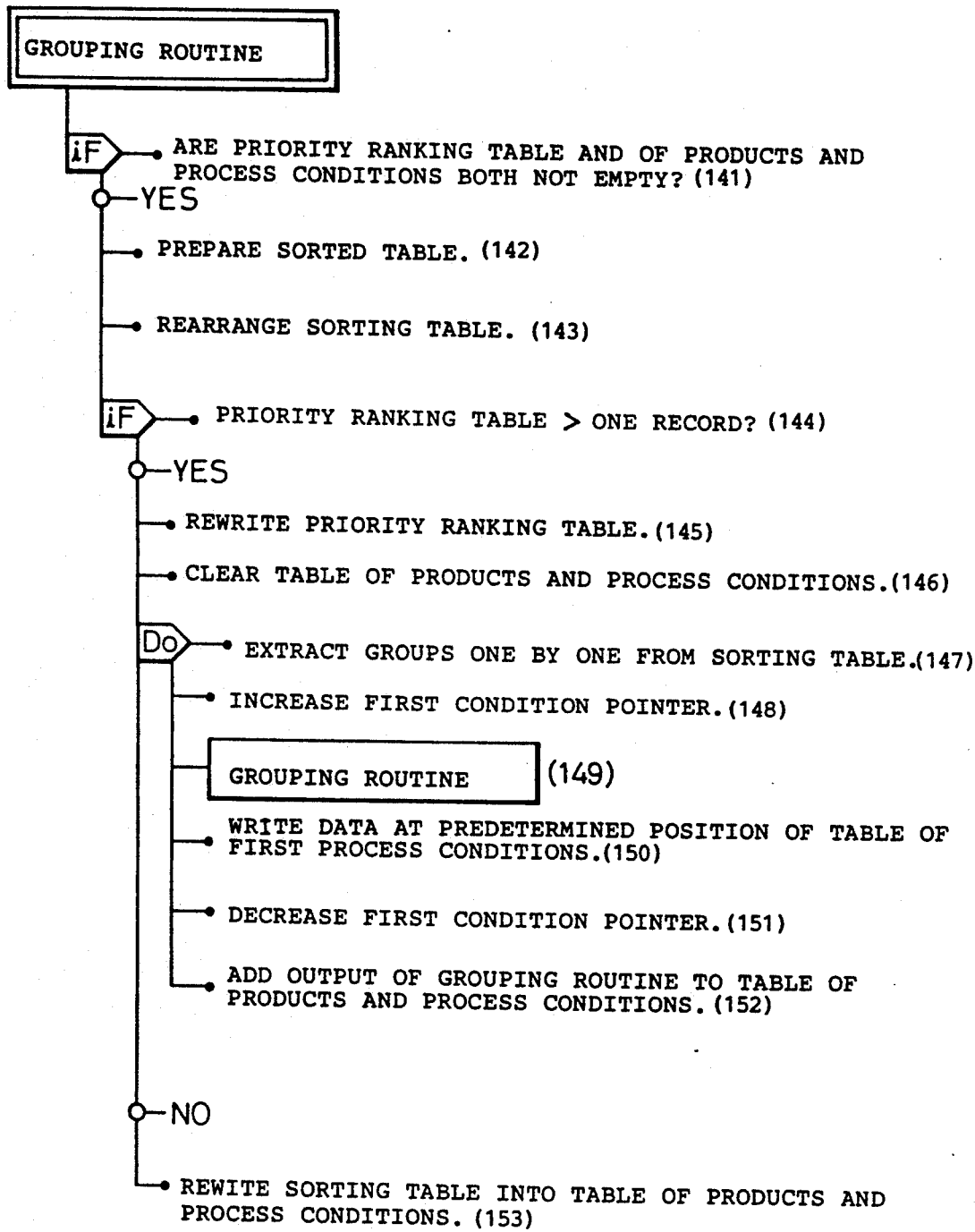
FIG. 14 is a flowchart showing a grouping routine according to the method of FIG. 8.
Figure 15:
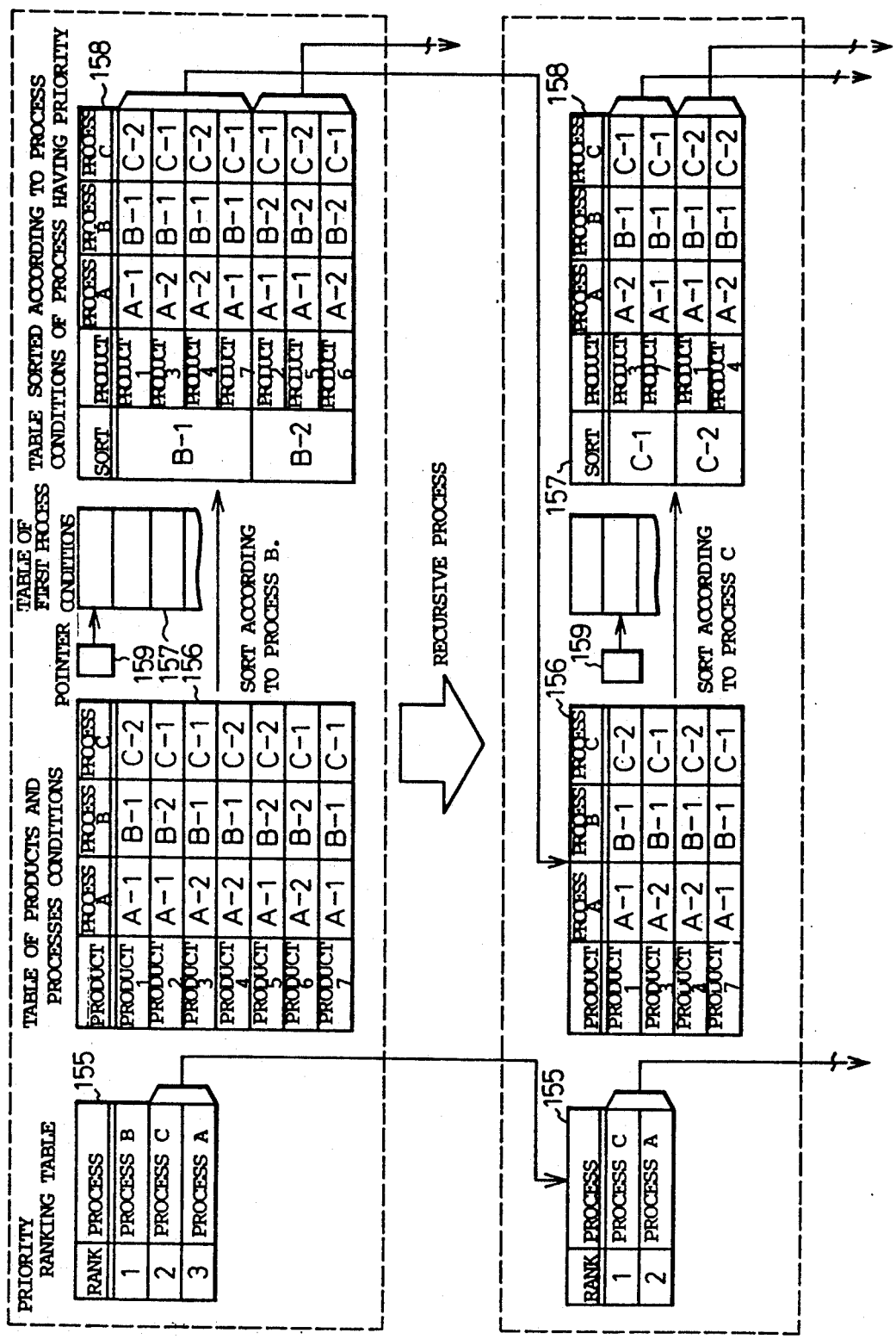
FIG. 15 is an explanatory view showing a grouping process according to the method of FIG. 8.

An operation of this apparatus will be explained next with reference to FIGS. 13 to 15. FIG. 13 is a flowchart showing a main routine to be executed in the apparatus, and FIG. 14 is a flowchart showing a grouping routine. The grouping routine is directly called by the main routine or recursively called by the grouping routine. FIG. 15 is an explanatory view of the grouping process and generally shows the contents of a priority ranking table 155, a table 156 of products and process conditions, a table 157 of first process conditions, a sorting table 158, and a first condition pointer 159. These tables and pointer are used by the main and grouping routines. For the sake of explanation, the contents of the respective tables are the same products and processes as those shown in Table 1.

The main routine will be explained with reference to FIG. 13. First in step 131, a total processing time of each of the processes is computed to prepare the priority ranking table 155 of Table 2 in which the processes are arranged in order of the total processing time. In step 132, the table 157 of first process conditions is cleared with blanks, and the first condition pointer 159 is initialized. In step 133, the priority ranking table 155, table 156 of products and process conditions, table 157 of first process conditions, and first condition pointer 159 are used as arguments to call the grouping routine. In step 134, the called grouping routine is executed. Finally in step 135, a product feeding sequence is determined according to the table of products and process conditions that has been rewritten by the grouping routine, and displayed on the display unit 12 (FIG. 12).

The grouping routine will be explained with reference to FIG. 14. The grouping routine is recursively called to simplify a computing procedure. Among the parameters used to call the grouping routine, the priority ranking table 155 is an input parameter, and the table 156 of products and process conditions, table 157 of first process conditions, and first condition pointer 159 are input/output parameters. First, step 141 confirms that both the priority ranking table 155 and the table 156 of products and process conditions are not empty. Step 142 sorts, as shown in FIG. 9, the table of products and process conditions for process conditions B-1 and B-2 according to an arrangement (process conditions) of the process B listed at the head of the priority ranking table 155, and prepares the sorting table 158. If the process condition indicated by the first condition pointer 159 on the table 156 of first process conditions exists in the process conditions of the process for which the sorting was done, step 143 rearranges the sorting table 158 to bring the corresponding group to the head of the table. In the processing range shown in FIG. 15 for the process B, nothing is written at the position indicated by the pointer in the table of first process conditions, so that the same process condition will never exist, and the step 143 will not be executed.

Step 144 judges whether or not the ranking table 155 has more than one record, i.e., more than one process. If the priority ranking table 155 has more than one record, step 145 is executed, and if the priority ranking table 155 does not have more than one record, step 153 is executed. The step 145 rewrites the priority ranking table 155 for the second and following records, i.e., the processes C and A in FIG. 15, and step 146 clears the table 156 of products and process conditions.

Step 147 picks up groups (a group of B-1 and a group of B-2) one by one from the sorted table 158, and steps 148 to 152 are repeated to do the grouping shown in FIGS. 10 and 11. In FIG. 15, the group of process B-1 is picked up. The step 148 increases the first condition pointer 159. The step 149 uses the priority ranking table 155, the table 156 of products and process conditions for one group picked up from the sorting table 158, the table 157 of first process conditions, and the first condition pointer 159 to recursively call and execute the grouping routine. Even in the recursively called grouping routine, the grouping routine is successively called until a result of the judgement of the step 144 becomes negative.

If the result of judgement of the step 144 is negative, the step 153 rewrites the sorting table 158 into the table 156 of products and process conditions, and exits from the grouping routine to the step 150. The step 150 finds the last product in the table provided by the grouping routine (the table of products and process conditions provided by the grouping routine), obtains a process condition of the last product for the process written at the head of the priority ranking table, and writes the obtained process condition in the table of first process conditions at a position indicated by the first condition pointer. Step 151 decreases the first condition pointer. Step 152 adds the table provided by the grouping routine (the table of products and process conditions of the grouping routine) to the table of products and process conditions of the caller grouping routine, i.e., the table of products and process conditions cleared by the step 146.

In this way, the last obtained table of products and process conditions is the product feeding sequence, as explained with reference to the main routine. In the example shown, the product feeding sequence is 7, 3, 4, 1, 5, 2, and 6 as shown in FIG. 11.

Figures 16, 17:
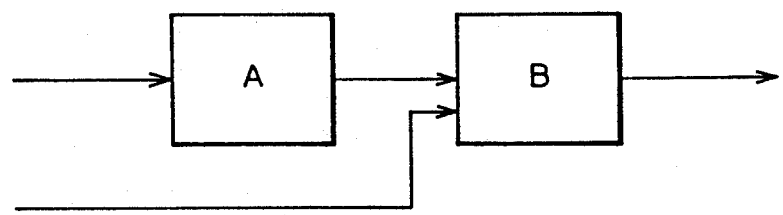
FIG. 16 is a view showing a work diagram according to the method of FIG. 8.
FIG. 17 is a block diagram showing other examples of work processes.

The above procedures can determine the same product feeding sequence as that explained with reference to FIG. 11. FIG. 16 shows a work diagram prepared according to the rules of FIGS. 7A and 7B. According to the embodiment, a time period necessary for all the processes is 28 units of time. Namely, the embodiment can shorten a processing time by 10% compared with the case of FIG. 7A and by 7% compared with the case of FIG. 7B. The effect of shortening the processing time of this embodiment is not so large but the embodiment can further shorten the processing time when it handles more products and processes.

The primary reason why the recursive program is employed is to prepare a program that is generally applicable for process routes. Namely, the same program can generally be applicable irrespective of selection of the process routes and the number of the routes. The second reason is because, when there are many products and processes, executing a program recursively as in the embodiment can reduce the number of computing processes and the required storage capacity of a memory for permanently or temporarily storing the program and tables. For example, compared with simulating all patterns of feeding sequences to find the most effective pattern, the present invention can form a simpler apparatus.

The method and apparatus explained with reference to the embodiment are applicable for, for example, an automatic inserter for mounting electronic parts onto a printed board in electronic appliance manufacturing, to improve manufacturing workability and productivity.

As explained above, the embodiment of the invention explained with reference to FIGS. 6 to 16 can provide a method of determining a product feeding sequence that is appropriate for improving operation efficiency of facilities for producing many kinds of products in small quantities.

(2) Job processing time simulation method (refer to FIGS. 17 through 29)

This method prepares a table for managing free time of each process, a table for storing the history of jobs processed through the processes, and a region for managing a latest address of the history table. A job to be processed has information of routes and man-hours for each process. Also, a table is arranged for storing a transporting time between processes. For each job, a start time, and end time, and a delivery time to the next process which is obtained by recursively simulating the next process, are simulated for each process, and stored at a latest address of the history table. These are repeated to correctly carry out the simulation of a process in question with processes before and after the process in question being taken into consideration.

A more detailed explanation will follow hereunder.

A plurality of jobs are processed through a plurality of processes that are connected to one another thorough an automatic transporting means. (For example, products are processed with several machine tools while being transported by conveyors.) In this case, it is very difficult to manually simulate the proper feeding timing of jobs and the time allocation of respective processes.

One conventional simulation method is a load heaping method. According to this method, jobs are heaped in front of each process, and successively fed to the process. This method does not consider the relation between jobs and processes so that it cannot simulate conditions correctly.

Figures 18, 19:
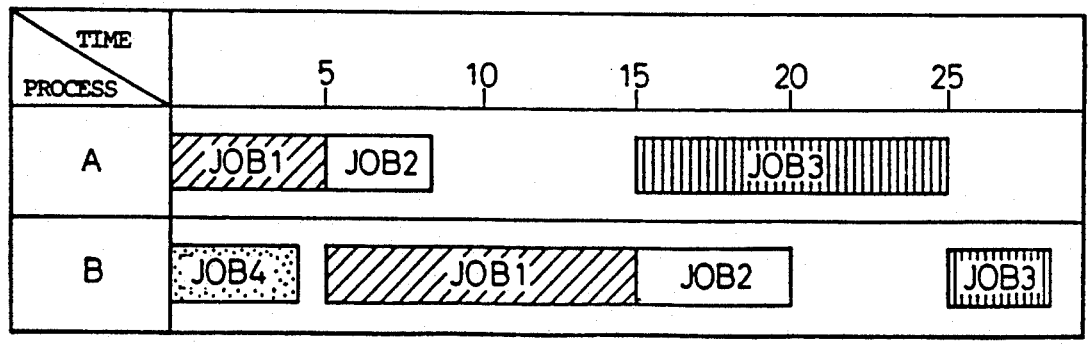
FIG. 18 is a view showing jobs and man-hours for the work processes of FIG. 17.
FIG. 19 is a view showing a result of conventional simulation according to the man-hours of FIG. 18.

Simulation will be considered next. For example, jobs shown in FIG. 18 are fed to a model of routes of processes shown in FIG. 17. The model of routes of processes of FIG. 17 involves processes A and B. In FIG. 18, there are four kinds of jobs 1 to 4 to be fed to the processes, and each job entails a certain number of man-hours for the respective processes A and B, as shown in the figure. For example, the job 1 takes five man-hours for the process A, and 10 man-hours for the process B. The job 1 can be fed to the process A and then to the process B with no problem, and as shown in FIG. 19, can be processed during a period from time 0 to 5 by the process A and during a period from time 5 to 15 by the process B. After the job 1 is completed by the process A, job 2 is processed during a period from time 5 to 8. Thereafter, since the job 1 is being processed through the process B, the job 2 waits until the job 1 is completed through the process B, and then the job 2 is processed during a period from time 15 to 20 by the process B. Namely, the job 2 must wait in the process A for a period from time 8 to 15.

As a result, the job 3 cannot be fed to the process A until time 15. Namely, the job 3 is processed through the process A during a period from time 15 to 25, and through the process B during a period from time 25 to 28. Since the job 4 is not processed by the process A, it is directly fed to the process B. Since the job 4 takes four man-hours, it may be processed in a period from time 0 to 5, or from time 20 to 25, or after time 28. If the job 4 has no limitation on its start time, the period from time 0 to 4 will be allocated for the job. Consequently, a final result of the simulation will be as shown in FIG. 19.

Such a relatively simple example shown in FIGS. 17 to 19 may be manually simulated. If routes of processes are more complicated and if the number of jobs is greater, the manual simulation will be impossible.

To solve the problem, an object of the invention is to provide a method of simulating a job processing time correctly within a short time.

Figure 20:
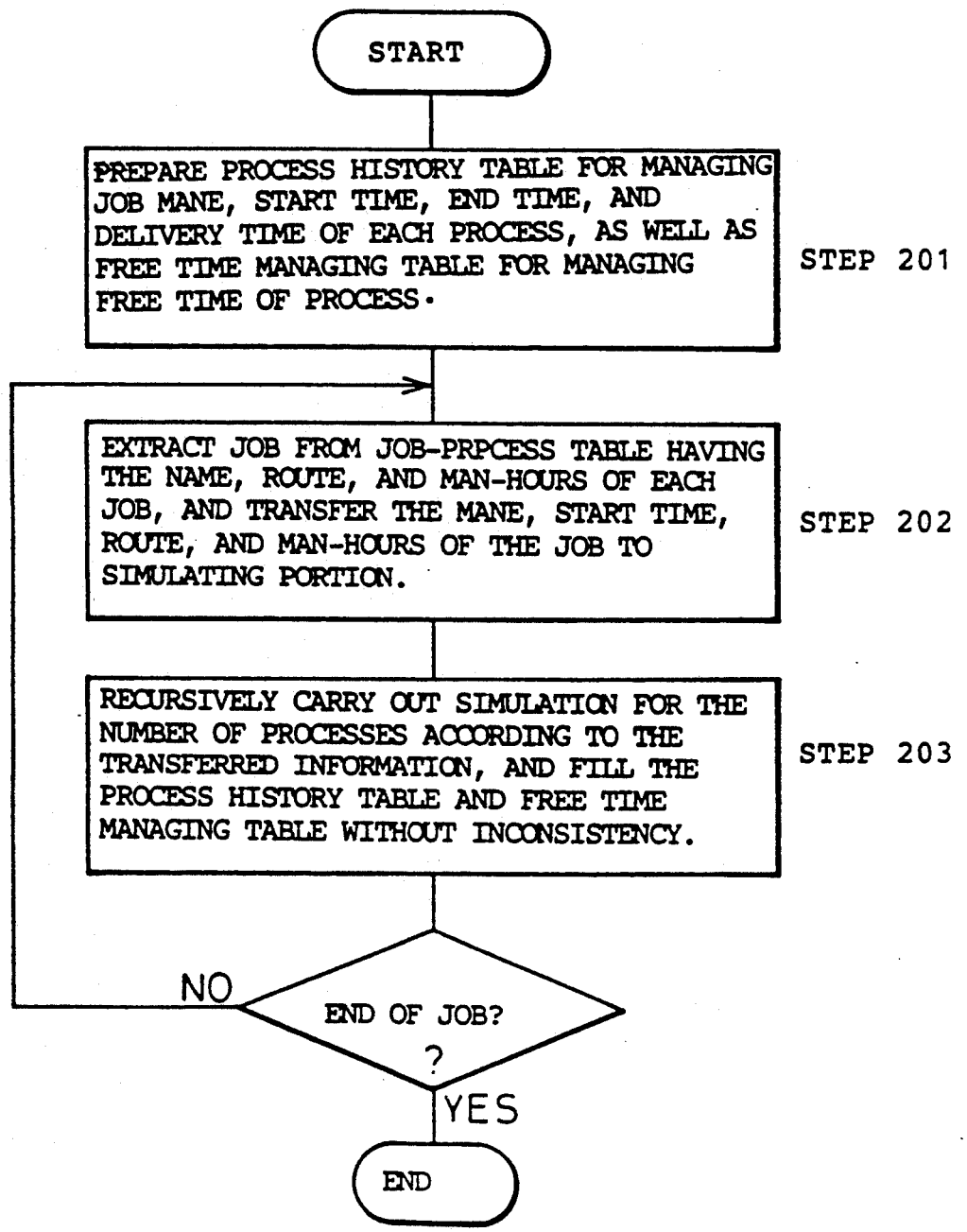
FIG. 20 is a flowchart showing a method of simulating job processing time according to an embodiment of the present invention.

FIG. 20 is a flowchart showing a principle of a method of simulating job processing time according to an embodiment of the invention. In FIG. 20, step 201 of the embodiment prepares, for each process, a process history table for managing job names, start time, end time, and delivery time, and a free time managing table for managing a free time of each process.

Step 202 extracts a job out of a job-process table that contains job names, occurring time, routes, and man-hours, and transfers the name, occurring time, route, and man-hour of the job to a simulating portion 217 (FIG. 21C).

Step 203 recursivley carries out a simulation process for the number of processes according to the transferred information, and filling the process history table and free time managing table without causing inconsistency.

The steps 2 and 3 are repeated for the number of jobs.

For each process, there are prepared the process history table for managing job names, start time, end time, and delivery time, and the free time managing table for managing a free time of each process. For each job, these tables are filled according to the simulation process without causing inconsistency in the tables. As a result, the simulation of a job processing time can be carried out automatically and correctly within a short time with no manual operation.

Figure 21A:
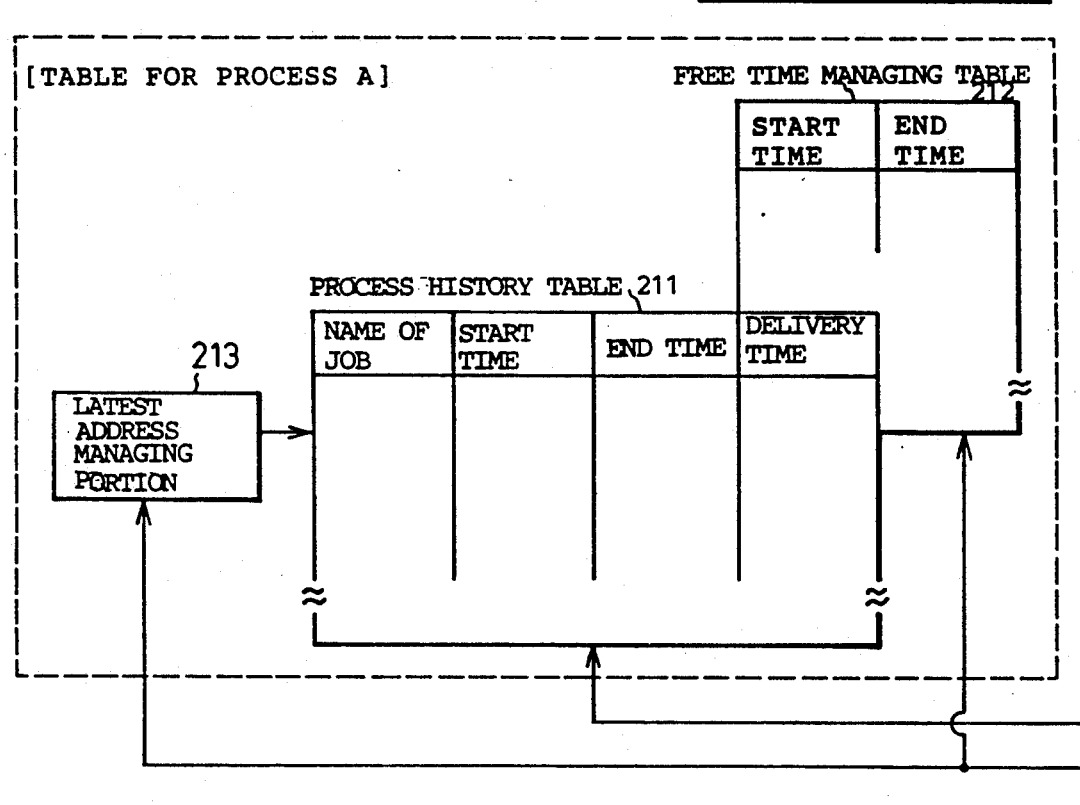
Figure 21B:
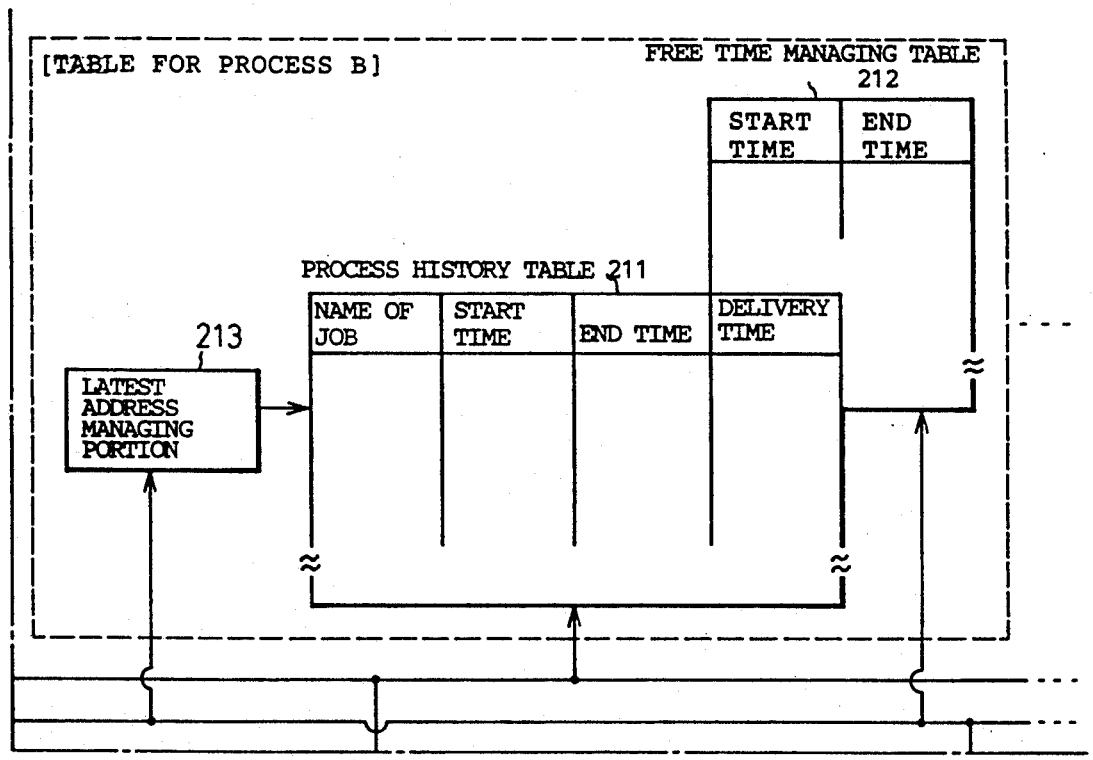

FIGS. 21A to 21C show a system arrangement of an embodiment of the invention. In FIGS. 21A and 21B, numeral 211 is the process history table for managing job names, start time, end time, and delivery time, 212 is the free time managing table for managing a free time of each process, and 213 is a latest address managing porion for indicating a latest address of the process history table 1.

In FIG. 21C, numeral 214 denotes a job table, and 215 a table of shift time.

FIG. 21C shows a processing portion for simulating a job processing time according to the contents of the tables 211 to 215. The processing portion comprises a job extracting/processing portion 216, a simulating portion 217, and a table updating portion 218.

FIG. 22 is a view showing an example of the process history table 211. As shown in the figure, the table stores job names, job start time, job end time, and job delivery time. Generally, a job is not always delivered to another process just after the completion of the job in one process, so that the end time is not always equal to the delivery time.

FIG. 23 is a view showing an example of the free time managing table 212. In an initial state, start time is zero, and end time is infinite. Namely, an entire period is free.

The process history table 211 of FIG. 22, and the free time managing table 212 and the latest address managing portion 213 shown in FIG. 23 are provided for each process. For example, each of the processes A and B shown in FIG. 21 has the process history table 211, free time managing table 212, and latest address managing portion 213.

FIG. 24 shows an example of the job-process table 214 for storing job names, timing, routes, and man-hours.

FIG. 25 shows an example of the shift time table 215 for storing man-hours necessary for a job to be shifted between processes. Man-hours of each process are stored for each job. For example, as shown in FIG. 24, a job 1 takes 10 man-hours for a process A, five man-hours for a process B, and 10 man-hours for a process C. Since the timing of some jobs is limited, the column for the timing in the figure stores that timing. In the figure, the column is filled with Os because there is no limitation on the timing. This job-process table must be completed before carrying out simulation.

In the shift time table 215 shown in FIG. 25, the man-hours needed for a job to shift between the processes A and D is found at an intersection of A and D, i.e., 2.

In FIG. 21, the contents of the job-process table 214 are transferred to the job extracting/processing portion 216, which separates the name, timing, route, and man-hours of each job. The separated pieces information are sent to the simulating portion 217. The simulating portion 217 also receives the contents of the shift time table 215.

The simulating portion 217 firstly extracts the first one of the routes of processes given as input values, finds free time in the free time managing table 212 of the process, the free time being after the above timing and as early as possible to process the job. For this free time, a start time and end time are temporarily written in the process history table 211. The start time of the process in question may be changed depending on when the job is delivered to the next process.

Based on the temporary end time, man-hours (to be obtained on the shift time table 215) necessary for the job to shift from this process to the next process are taken into account to obtain a timing for the next process, and the processes and man-hours after the next process are recursively processed in the simulating portion 217, thereby successively determining a possible start time of each for the processes.

Upon the completion of the simulation of the next process, start time is read from the latest process history table 211 of the next process, and the man-hours necessary for shifting are subtracted from the start time to find the delivery time of the present process. Based on the delivery time thus found, it is judged whether or not the job can be completed within the free time in question. If the result is negative, the next free time is found, and the simulation is repeated.

In this way, the process history table 211 of each of the precesses has a start time, end time, and delivery time for the job. Thereafter, the table updating portion 218 updates the free time managing table 212 and the latest address of the latest address managing portion 213 according to the process history table 211.

Figure 26B:
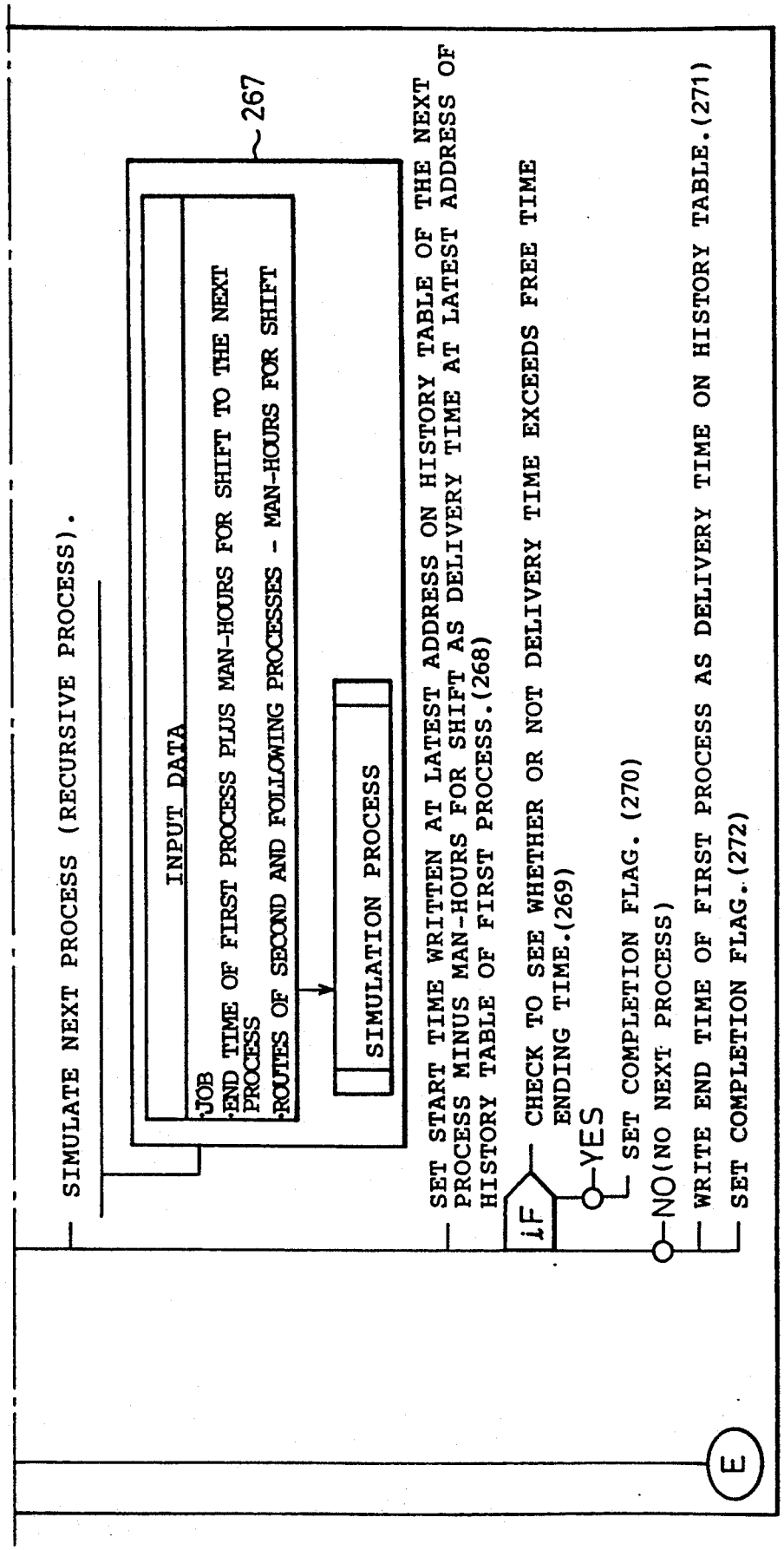

FIG. 26 is a flowchart showing an operation of the simulating portion 217. This flowchart shows the abovementioned procedures in more detail. After receiving input data, step 261 picks up a free time of a process written at the head of a route of processes from the free time managing table 212, and repeats the following sequence. First, a job name is written at a latest address of the process history table 212 of the head process (step 262). A later one of the job timimg and the free time starting time is set as the start time, and is written at the latest address of the process history table 1 of the head process (step 263). The start time plus man-hours of the head process is set as the end time and written at the latest address of the process history table 211 (step 264).

It is confirmed that the end time found in the step 264 does not exceed the end of the free time according to the free time managing table 212 (step 265). After the confirmation, it is checked to see whether or not the job in question has a next process (step 266). If it has a next process, a simulation is recursively carried out for the next process according to the input data (step 267).

After the recursive simulation, man-hours necessary for shifting are subtracted from the start time written at the latest address of the process history table 211 of the next process, and the result of the subtraction is set as the delivery time at the latest address of the process history table 211 of the head process (step 268). It is checked to see whether or not the delivery time exceeds the end time of the free time according to the free time managing table 212 (step 269). If it does not exceed, the end time a completion flag is set (step 270).

If there is no next process in the step 266, the end time of the head process is set as delivery time and written in the process history table 1 (step 271), and the completion flag is set (step 271). This simulation process is carried out for all processes of one job. After the process is completed for the all processes, input data for the next job are provided to carry out a similar process.

Next, application of the present invention to concrete jobs will be explained. For process routes shown in FIG. 27, the jobs 1 to 5 on the job-process table of FIG. 24 will be applied. FIG. 25 will be man-hours necessary for the jobs to shift between the processes of FIG. 27. FIG. 28 shows changes in the process history tables 211 and free time managing tables 212 when the jobs are successively simulated. In the figure, ST denotes start time, ET end time, and OT delivery time.

(1) Initial state

Each free time managing table 212 is from 0 to infinity, and each process history table 211 has nothing written therein. Accordingly, a latest address of each process is 1 as shown in FIG. 28.

(2) Feeding job 1

For the first process A, a free time is from zero to infinity, so that, in the process history table 211, start time is set to 0, and end time to 10. To determine delivery time, it is necessary to determine start time of the next process B shown in FIG. 27. To do so, with reference to the table 215 of shift time of FIG. 25, one man-hour necessary for the job to shift from the process A to the process B is added to the end time 10 of the process A to find time 11, which is used as the timimg for simulating the process B and the following processes. Since the man-hours of the process B is 5 and the free time thereof is from 0 to infiniteyat first, its start time is 11 and end time is 16.

Similarly, to determine delivery time of the process B, the next process C is simulated to find start time 18 from the man-hours of 2 for shifting, and end time 28 from the man-hours of 10. For the job 1, the process C is the last process so that the end time will be equal to delivery time. Since the start time of the process C has been determined, the delivery time of the process B and the delivery time of the process A are successively determined. As a result, the free time of each of the processes after feeding the job 1 will be, as shown in FIG. 28, from 10 to infinity for the process A, from 0 to 11 and from 16 to infinity for the process B, from 0 to 18 and from 28 to infinity for the process C, and from 0 to infinity for the process D.

(3) Feeding job 2

Since the free time of the first process A is from 10 to infinity and the man-hour of the job is 20, the job 2 may have start time 10 and end time 30. After the completion of the job 1, the free time of the process C is from 0 to 18 and from 28 to infinity. The man-hours of the job 2 in the process C is 15, and the man-hours necessary for shifting the job from the process A to the process C is one. As a result, the start time of the job 2 in the process C is 31 and the end time is 46. Similarly, the start time of 47 and end time of 57 are obtained for the next process D. The end time of the process D is equivalent to its delivery time, and also, the delivery time of each of the processes C and A is equal to the end time thereof.

(4) Feeding job 3

After the completion of the job 2, the free time of the first process B is from 0 to 11 and from 16 to infinity. The job 3 requires 10 man-hours so that the job 3 may have start time 0 and end time 10. One man-hour necessary for the job 3 to shift to the process A is considered to set a timimg of 11, and the process A is simulated. Since the process A has the free time from 30 to infinity after the completion of the job 2 and since the job 3 requires five man-hours in the process A, a start time 30 and end time 35 are determined. Since the process A is the final process for the job 3, delivery time 35 is determined.

The Man-hours necessary for the job 3 to shift from the process B to the process A is one, and the start time of the process A is 30, so that delivery time of the process B is 29. This determines the start time of the process B as 19. The free time of the process B is, however, up to 11, so that the job 3 may not be fed to the process B in this free time. To cope with this, the simulation is repeated for the next free time of the process B from 16 to infinity. As a result, as shown in FIG. 28, the job 3 will have start time 16, end time 26, and delivery time 29, and the process A will have start time 30, end time 35, and delivery time 35.

Similarly, the jobs 4 and 5 are simulated, and the result will be as shown in FIG. 28. After completing all the simulations, the process history tables 211 have results for the respective processes. According to the results, a Gantt chart will be prepared to provide a simulation result of FIG. 29.

Figure 27:
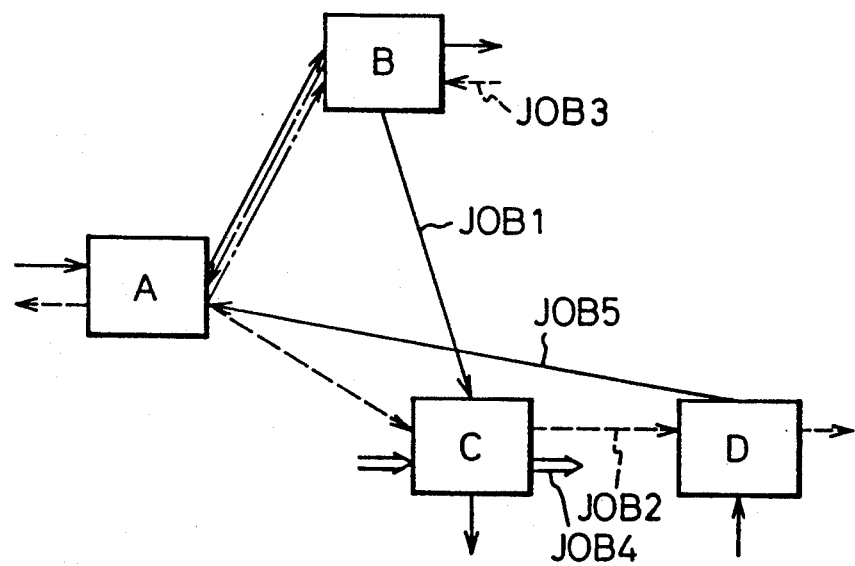
FIG. 27 is a view showing process routes applied for the method of FIG. 20.
Figure 28A:
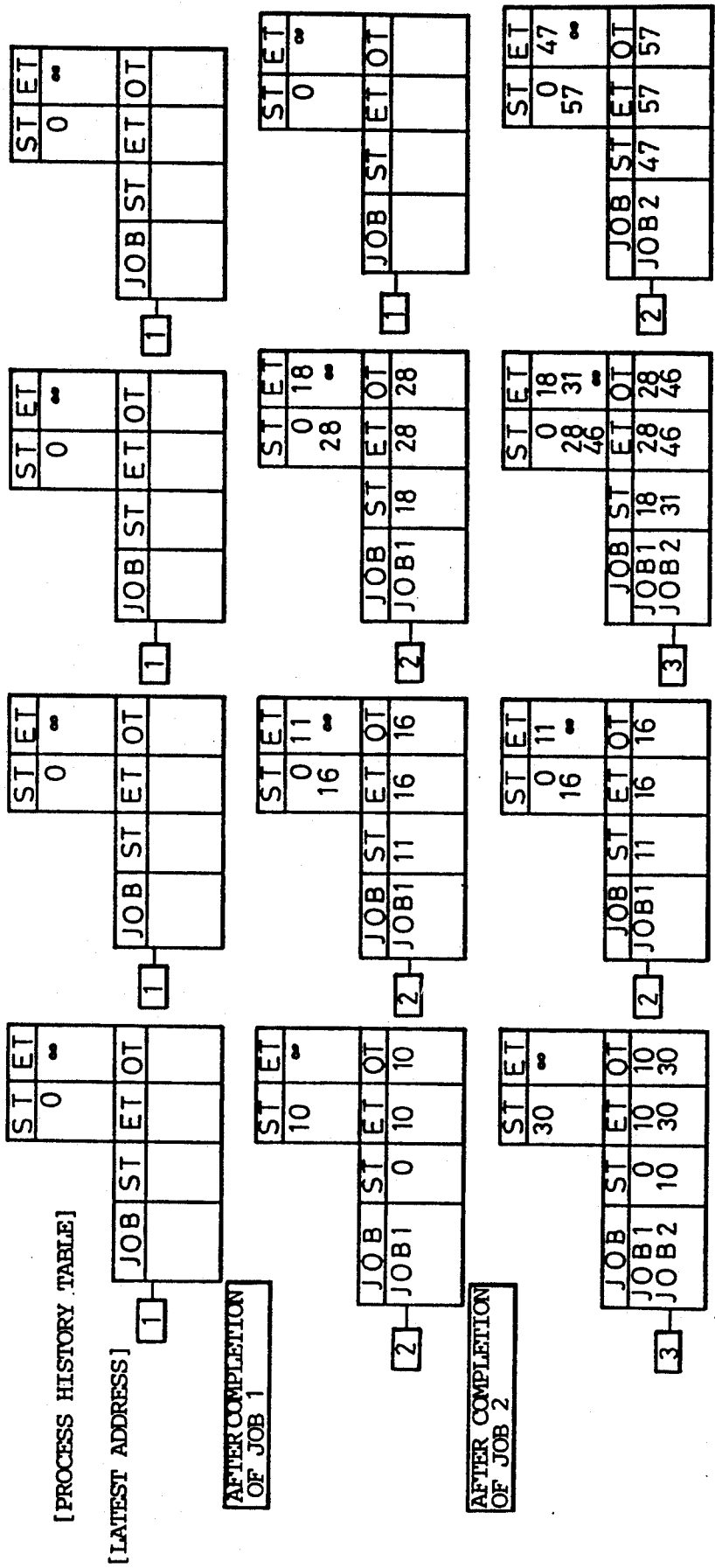
Figure 29:
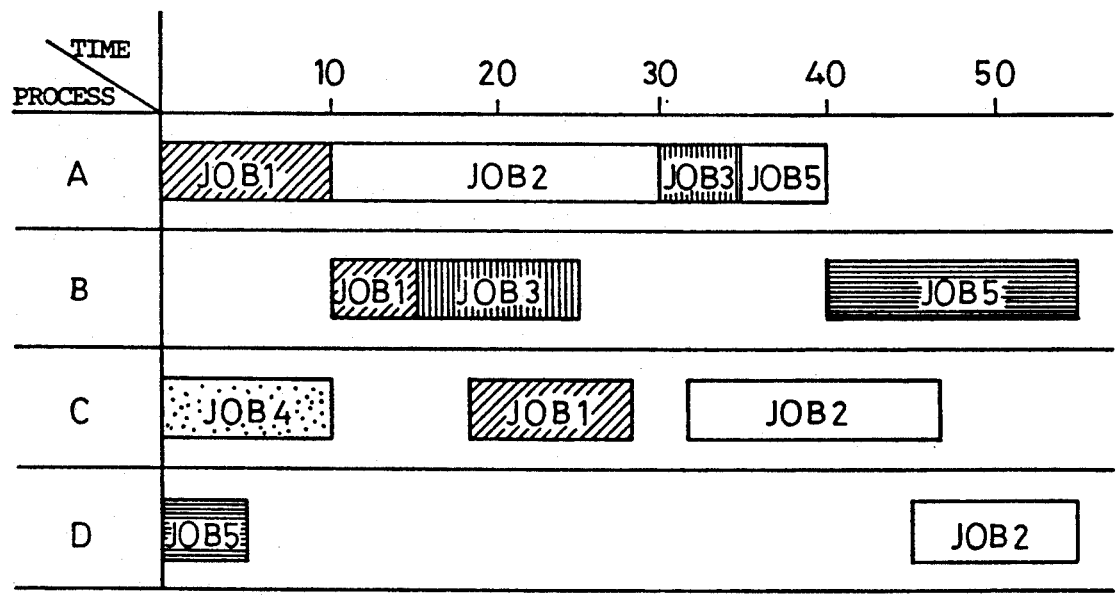
FIG. 29 is a view showing a result of the simulation according to the method of FIG. 20.

In the above embodiment, the jobs of FIG. 24 have been applied for the routes of processes of FIG. 27. The present invention is applicable not only for this embodiment but also for others.

As explained above in detail, the simulation method of job processing time according to the embodiment of the invention prepares, for each process, the process history table for managing job names, start time, end time, and delivery time, and the free time managing table for managing a free time of each process. For each job, these tables are filled according to simulations without causing inconsistency in the tables. The present invention has an excellent practical effect in that it can simulate a job processing time correctly and automatically within a short time with no manual work.

(3) Scheduling method taking half-finished products into consideration (refer to FIGS. 30A and 30B)

According to this method, a lot start time, the number of completed products, and a lot end time are recorded and updated in real time for each product to be fed. This enables the conditions of half-finished products at a certain time to be grasped correctly and rescheduling to be done continuously.

This rescheduling has briefly been explained with reference to FIG. 5, and will now be explained in more detail with reference to FIGS. 30A and 30B.

FIG. 30A is an example of a table showing a previous schedule and previous results. As is apparent in the figure, products a have finished processes A, B, and C completely. Products b have finished the process A but are still in process B, in which 10 out of 20 are completed and the remaining 10 are half-finished. The products b have not started in the process C, and products c have not started in the processes A and C.

FIG. 30B is a view showing newly fed products, the numbers of the products, and processes to be carried out on the products.

According to this embodiment, these results and products to be newly fed are recorded in real time in the result data memory 405 of FIG. 4A and the NC data memory 409 of FIG. 4B. According to these data, the table of the previous schedule and results is updated, thereby making a new schedule of FIG. 30B with the half-finished products, unfinished products, and newly fed products. The new schedule is stored in the weekly schedule memory 404 (FIG. 4A).

As a result, the memories are effectively used, and the new schedule is smoothly formed.

Figure 31:
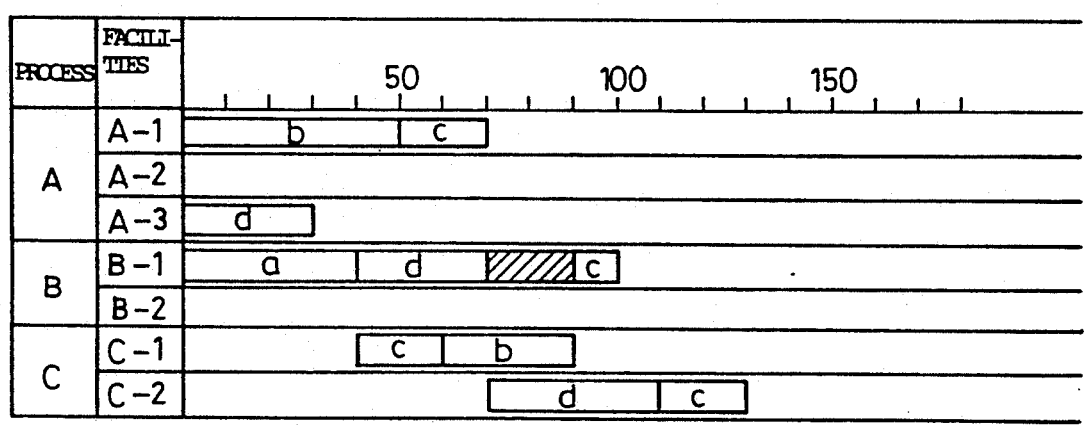
FIG. 31 is a view explaining rescheduling for avoiding failed facilities.

(4) Scheduling method excluding failed facilities (refer to FIG. 31)

According to this method, operation conditions of the respective facilities are always monitored. If there are abnormal facilities that cannot operate at the time of scheduling, the facilities are excluded from the scheduling. The method will be explained with reference to FIG. 31.

In FIG. 31, a facility condition table 310 tells that facilities A-2 for executing a process A is abnormal and that facilities B-2 for executing a process B is abnormal. A feeding schedule table 310 tells that 20 pieces of products a, for example, are to be processed in the process B for 40 man-hours and in a process C for 20 man-hours. A feeding schedule of other products is as shown in the figure. In the column of preparation, (1) and (2) denote preparation patterns. In this case, the abnormal facilities are excluded to prepare the schedule. As a result, as shown in the figure, for the process A, the facilities A-1 are employed to process the products b for 50 man-hours and the products c for 20 man-hours. Also, the facilities A-3 are employed to process the products d for 30 man-hours. Since the facilities A-2 are abnormal, a schedule which employs the same will not be prepared.

Similarly, for the process B, a schedule which employs the facilities B-2 will not be prepared.

In this way, the scheduling is done avoiding the abnormal facilities, thereby reducing the frequency of alarm occurrence, and smoothly mounting parts.

[2] Function of supporting production according to schedule

To surely perform work according to the schedule prepared according to the method explained in the above [1], the following functions are provided according to an embodiment of the invention:

(1) Function of comparing the schedule with results to detect a deviation, and issuing countermeasure instructions for a line manager (refer to FIGS. 32 and 33)

As shown in FIG. 32, a result may delay over a certain extent from a schedule at a changing point of an event on the schedule, e.g., the feeding, ending, or delivering point of a products, and the starting or ending point of a preparation change. Also, a product margin or an operation time margin of facilities may greatly exceed a logical value, a error frequency may be abnormally large, or restoration from an error may take too long. In these cases, the results may greatly deviate from the schedule. In this case, as shown in FIG. 33, the case of each situation is analyzed, and the result is reported in a batch system to a line manager or to a worker in real time.

In FIG. 33, the phenomenon (1) is a delay in a start time or in an end time of a job. The cause of this may be an aftereffect of a certain delay occurred before, or a decrease in work efficiency, which is to be found out by analysis.

The phenomenon (2) is an increase in a wait time (standby time) in facilities. The cause of this may be a failure of the carrier, influence of delay in other processes, etc. Other phenomena are also analyzed to find out their causes as shown in the figure.

With this function, the worker or line manager can quickly and properly cope with the deviation of results from the schedule.

Figure 34:
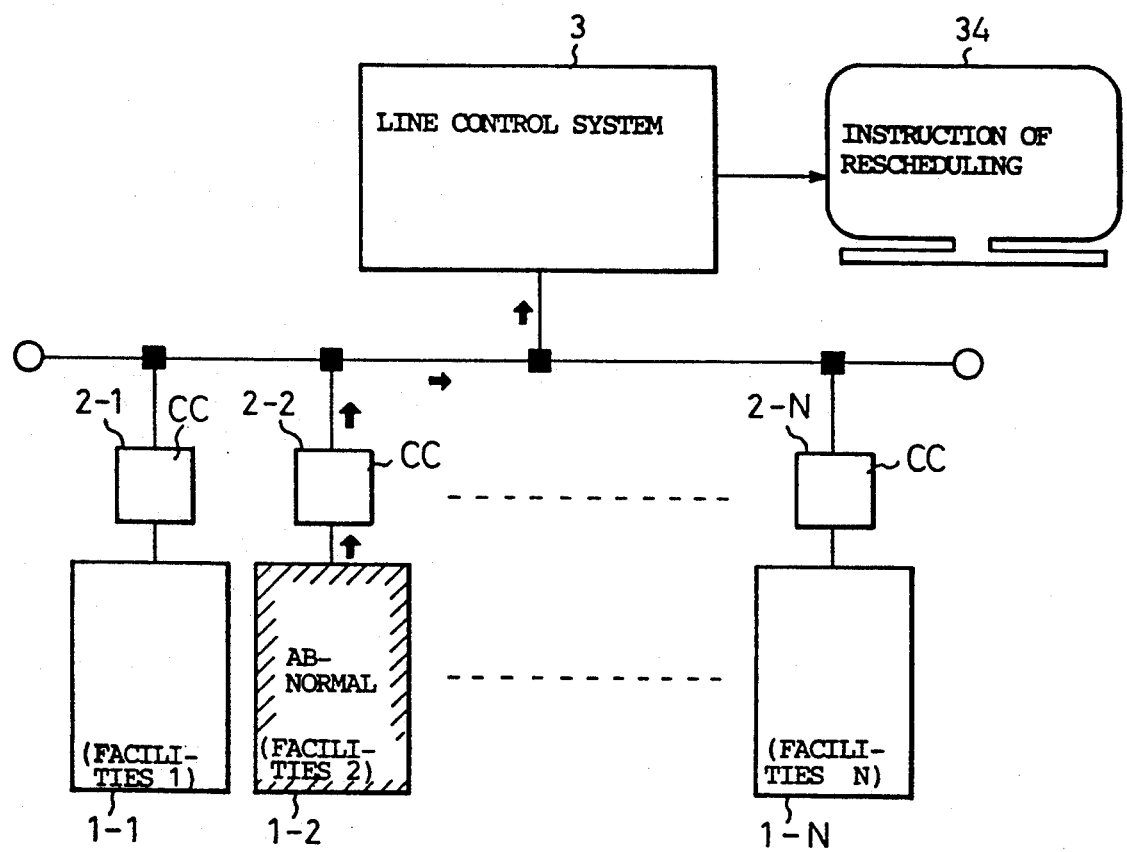
FIG. 34 is a schematic view showing a rescheduling indicating system for the embodiment of FIG. 30.

(2) Function of detecting failure in facilities and rescheduling (refer to FIG. 34)

During the execution of a schedule, the cell controller 2—2, for example detects alarm information or communication failure (power source breakdown, etc.), from the facilities 1-2. The cell controller 2—2 then analyzes it. When the cause of the trouble is identified and if it is impossible to restore it to a normal state or if it takes time to restore, rescheduling is automatically done without taking the troubled facilities into account. If the cause cannot be identified after the analysis of the alarm information and failed communication, a worker is asked whether or not the rescheduling should be done.

In this way, a failure of facilities is detected even during the execution of the schedule, and the rescheduling is done. As a result, the facilities 1-2 may not generate an alarm every time, thereby smoothly controlling the lines.

Figure 35:
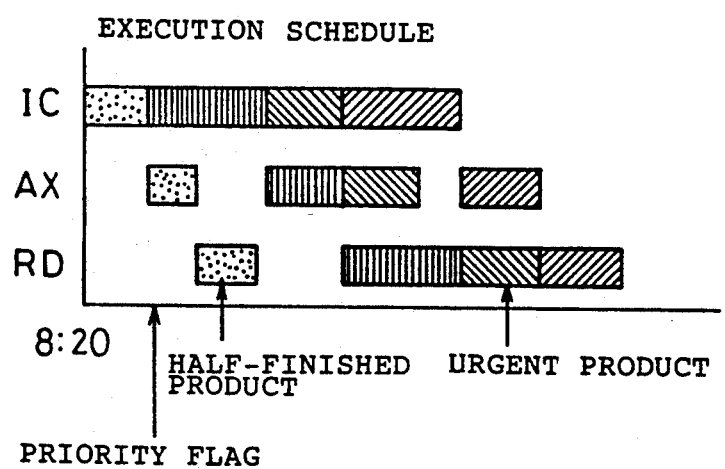
FIG. 35 is a view explaining an execution schedule including urgent articles according to an embodiment of the present invention.

(3) Function of processing urgent articles first (refer to FIG. 35)

In the product feeding sequence determined by the embodiment explained with reference to FIGS. 6 to 16, there may be a request to complete urgent articles within the morning of that day. When such a request is made, a priority flag is set for the articles at the time when such a request is made as shown in FIG. 35, and the articles with the priority flag are processed first. Instead of setting the priority flag, a margin of a processing time of the urgent articles may be mode smaller than a margin of a processing time of normal articles, or may be zeroed.

Figure 36:
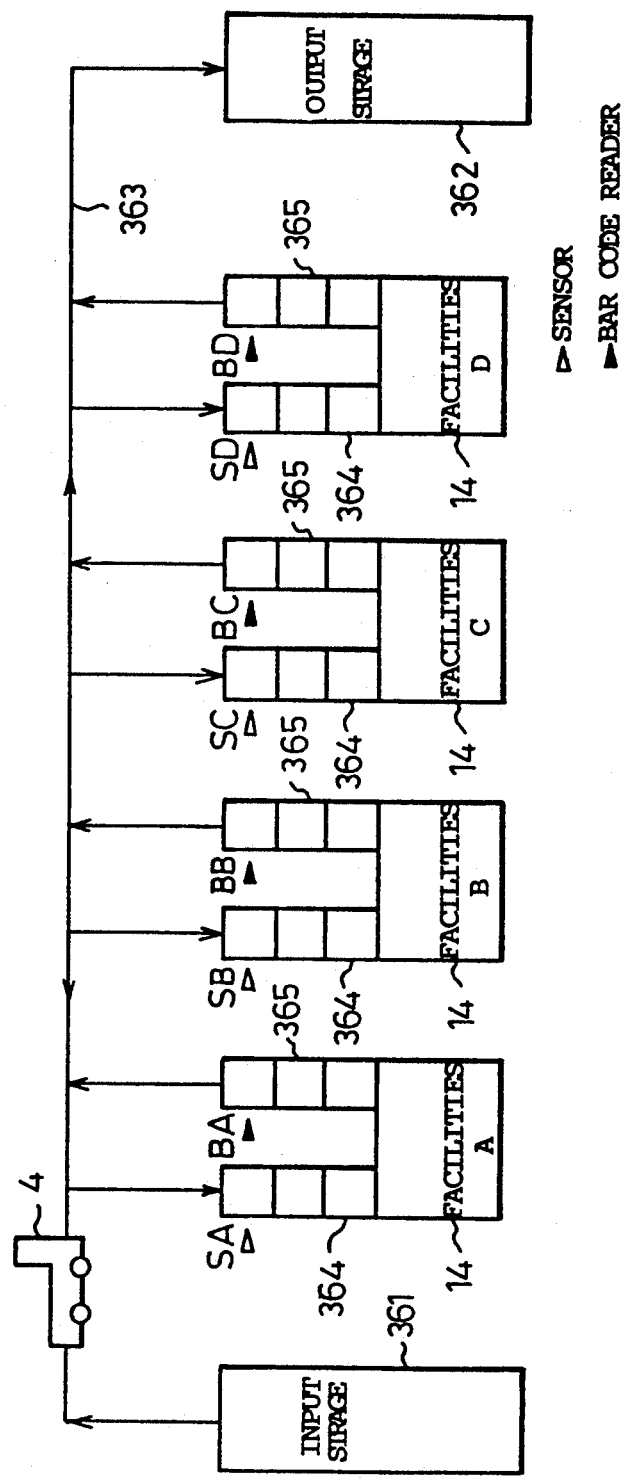
FIG. 36 is a view showing a model of a line system according to an embodiment of the invention.

(4) Method of controlling unmanned carriers according to execution schedule (refer to FIGS. 36 to 470)

Instead of transporting a product to the next process upon the completion of work on the product, this method prepares a product transporting (feeding) schedule for each process, and according to the schedule, a process to which a product is to be sent issues a product transporting request. The request is checked to see whether or not the request matches a product located at an origination processing point. In this way, automatic transportation according to the schedule is realized.

In recent years, automatization and unmanned operation of various facilities have been developed. In addition to automatization and unmanned operation of facilities alone, unmanned automated operation of a system as a whole has been developed with the use of unmanned carriers for carrying products between a plurality of facilities.

FIG. 36 is a view explaining this method and showing a model of a line system. In the figure, a plurality of facilities 14 (from A to D) are disposed in the vicinity of a transportation path. A rack loaded with printed boards is transported on a carrier 4 form an input storage 361 or from an unloader to a loader 364 of certain facilities. The rack may be delivered by the carrier 4 from the unloader 365 of each set of facilities through a transportation path 363 to the loader of another set of facilities or to an output storage 362. The loaders 364 have sensors SA to SD for checking to see whether or not there are fed products. The unloaders 365 have bar code readers BA to BD for checking to see whether or not there are processed products.

Figure 37:
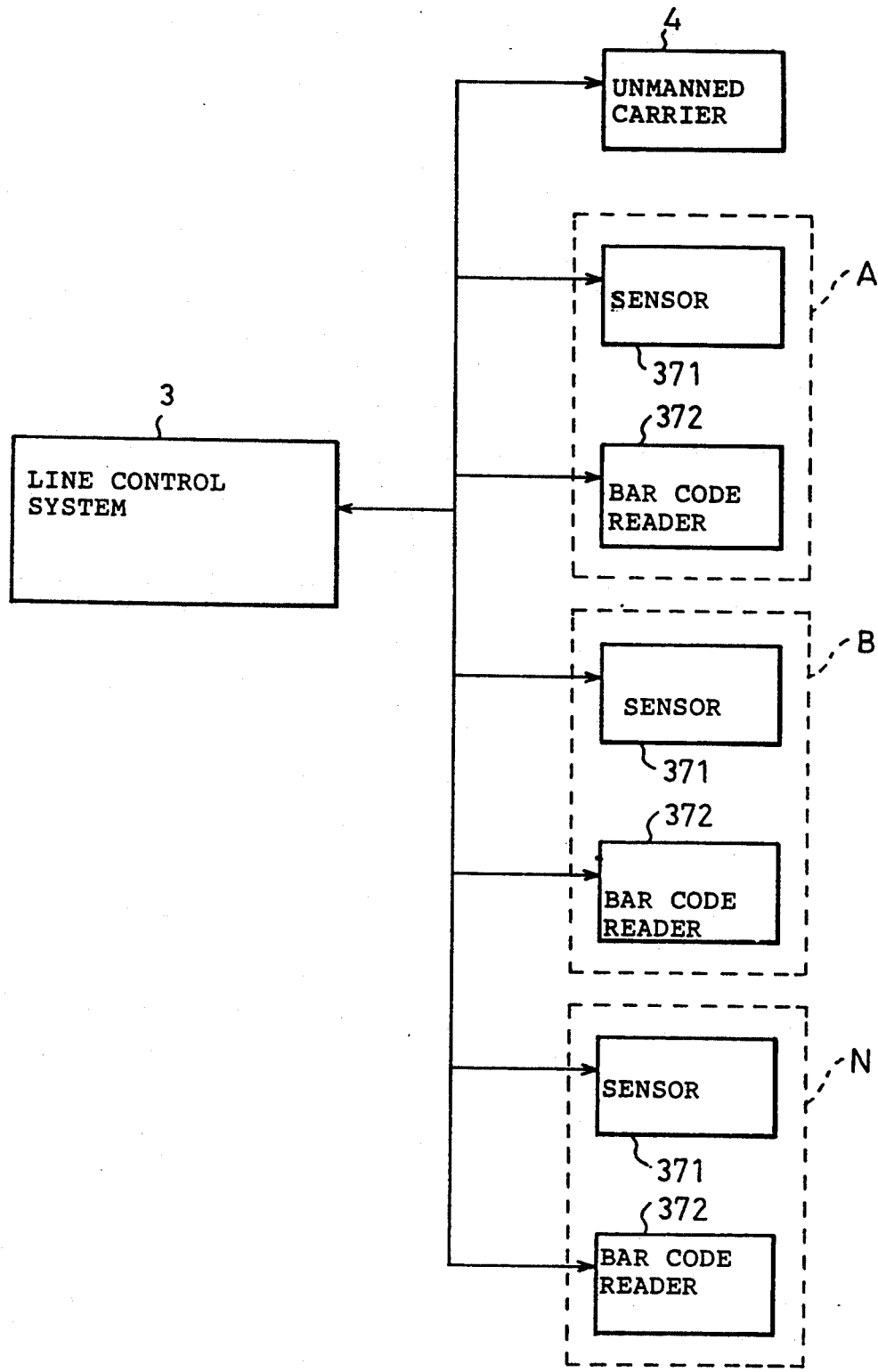
FIG. 37 is a view explaining the line system of FIG. 36.

FIG. 37 is a view for explaining a control system of the unmanned carrier shown in FIG. 36. Facilities A to N each have a sensor 371 for confirming whether or not there is a product on a loader, and a bar code reader 372 for identifying a processed product on an unloader.

Pieces of information from the sensors 371 and bar code readers 372 are provided to the line control system 3 (refer to FIG. 1), which recognizes facilities that are going to process a product next time and issues a transportation instruction. According to the instruction, the unmanned carrier carries that product, and unloads the product on the loader of the specified facilities. When the facilities completely process the product, the unmanned carrier receives the product from the unloader of the facilities, and caries the product to another set of facilities for the next process.

This sort of processing system requires a controlling system for the unmanned carrier, which must not deteriorate overall efficiency even if a processing time deviates from a scheduled time.

Figures 38A, 38B:
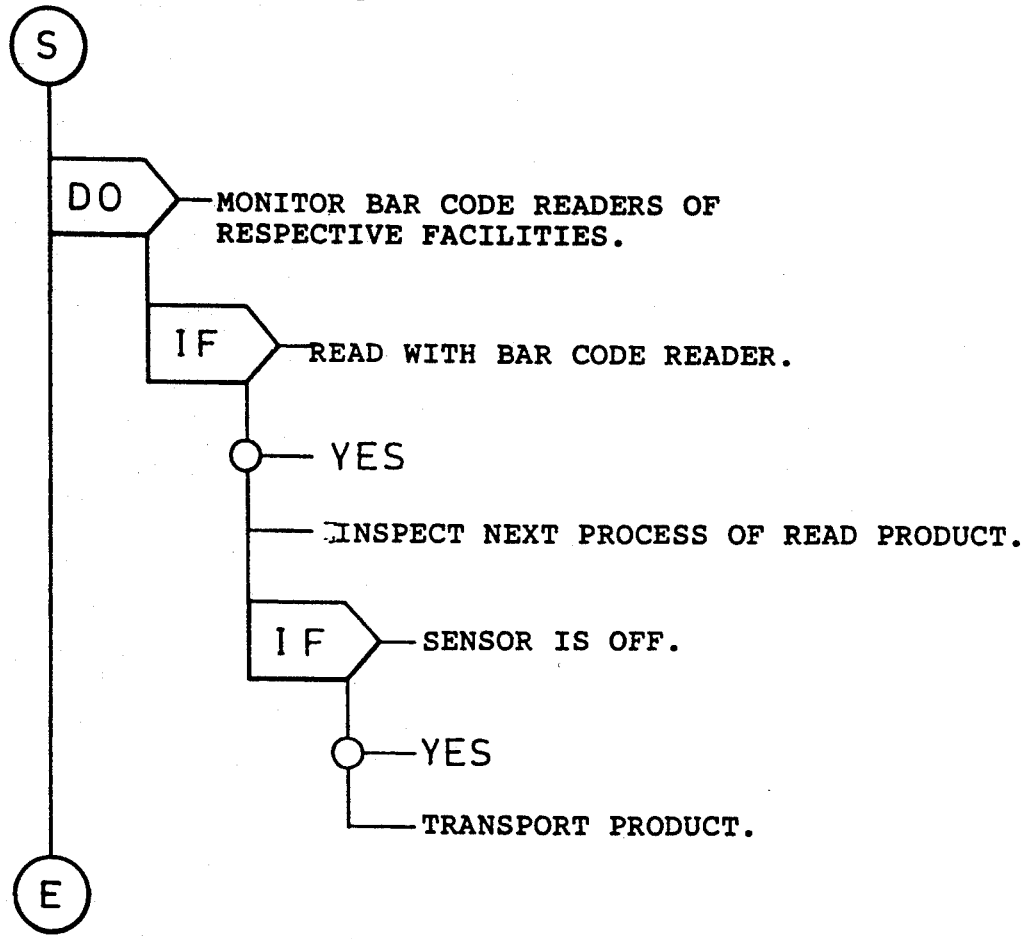
FIG. 38A is a view explaining a conventional unmanned carrier control system.
FIG. 38B is a view explaining conventional process routs of products.
Figures 39A, 39B:
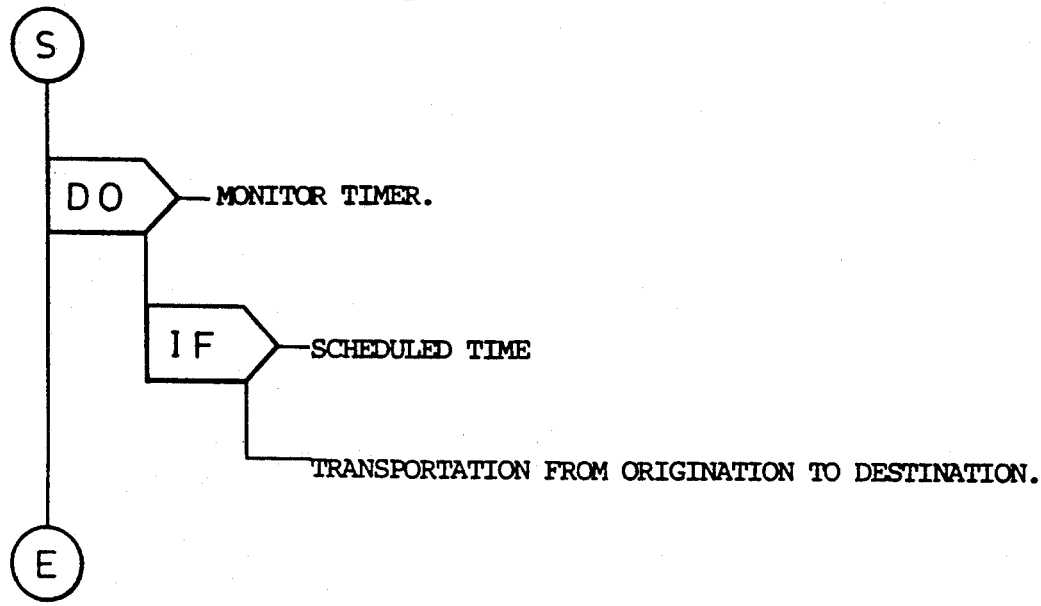
FIG. 39A is a view explaining another conventional unmanned carrier control system.
FIG. 39B is a view explaining other conventional processes of products.

FIG. 38A explains an unmanned carrier controlling system according to a prior art, FIG. 38B explains processes of products according to the prior art, FIG. 39A shows an unmanned carrier controlling system according to another prior art, and FIG. 39B explains processes of products according to the another prior art.

In the prior art unmanned carrier controlling system of FIG. 38A, products a, b, c, ... are processed in a sequence of FIG. 38B.

As shown in FIG. 37, the loaders for feeding products to facilities A to N are equipped with the sensors 371, and the unloaders for delivering the products are equipped with the bar code readers 372.

In FIG. 38A, each of the bar code readers 372 of the facilities A to N is monitored at first, and if there is a product, a next process of the product is confirmed. If the sensor 371 of the next process is OFF, the product is transported.

For example, a product "a" of FIG. 38B is first processed in the facilities A, and put on the unloader of the facilities A. The bar code reader 372 of the facilities A reads a bar code of the product to confirm that a next process of the product is done in the facilities B. If it is confirmed that the loader of the facilities B has no product, the product is transported t the facilities B.

FIG. 39A shows the unmanned carrier controlling system according to the another prior art. As shown in FIG. 39B, products are transported and processed according to time.

For example, a product "a" is in an input storage St at start time 8.00 and transported to specified facilities A, as shown in No. 1. In No. 7, the product a is completed in the facilities A at time 8.40, and carried from the facilities A to facilities B. In this way, a timer is monitored, and at scheduled time, a specified product is carried from specified facilities to other specified facilities.

The prior art explained with reference to FIGS. 38A and 38B inspects whether or not the loader is empty, and carries a product at once, so that the facilities may be operated efficiently but a sequence of products fed to the facilities is not secured.

If the facilities carry out the same process on all products, there will be no problem. If, however, arrangements of the facilities are to be changed depending on different processes to be done on products, it is necessary to feed the products according to an optimum product feeding sequence that is determined in advance.

For example, when ICs are mounted onto printed board units by an IC inserter, the kinds of ICs and control programs must be changed if the kinds of printed board units are changed. In this case, it is important to do the same work as continuously as possible so as not to deteriorate efficiency.

According to the prior art shown in FIGS. 39A and 39B, products are transported according to a time table prepared in advance. If a processing time fluctuates, inconsistency or idle time may occur.

A controlling method of an unmanned carrier according to an embodiment of the present invention can, as will be explained in more detail hereunder, feed products to a plurality of facilities according to respective feeding schedules and efficiently operate the facilities even if the processing time fluctuates.

FIG. 40 is a block diagram explaining a principle of the controlling method of an unmanned carrier according to the embodiment of the invention.

In FIG. 1, reference marks A to N are facilities, 4 is an unmanned carrier for carrying products between the facilities A to N, 41 is a product detecting portion disposed at each feeding port of the facilities A to N, 3 is a line control system for controlling process schedules of the facilities A to N and the unmanned carrier 10, and 42 is a transport request generating means for providing a request for transporting a next product when the product detecting portion 41 detects that there is no product at the feeding port of corresponding set of the facilities A to N.

An operation of the system of FIG. 40 will now be explained.

The product detecting portion 41 detects whether or not there is a product at the feeding port of corresponding set of the facilities A to N, and if there is no product at the feeding port, the transport request generating means 42 issues a request for sending a next product. The line control system 3 collates the transport request issued by the transport request generating means 42 with processed products, and if any coincidence is found as a result of the collation, sends an instruction to the unmanned carrier 4 to carry the product. Even if a processing time of product deviates from a scheduled time, the facilities A to N can be operated efficiently.

A detailed explanation will now be given with reference to an embodiment shown in FIGS. 41 through 47O.

Figure 41:
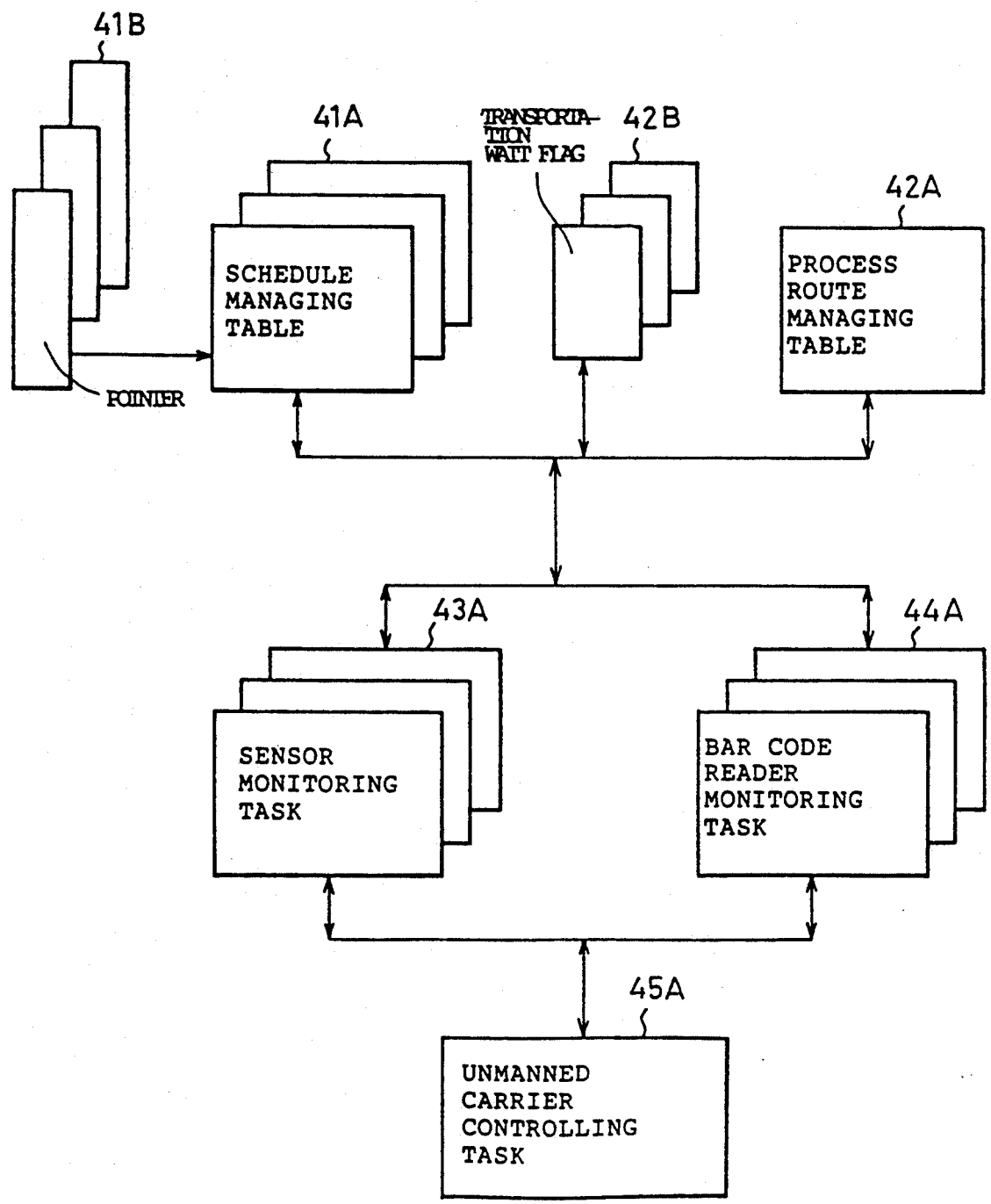
FIG. 41 is a view explaining a control method of the control system of FIG. 40.
Figure 44:
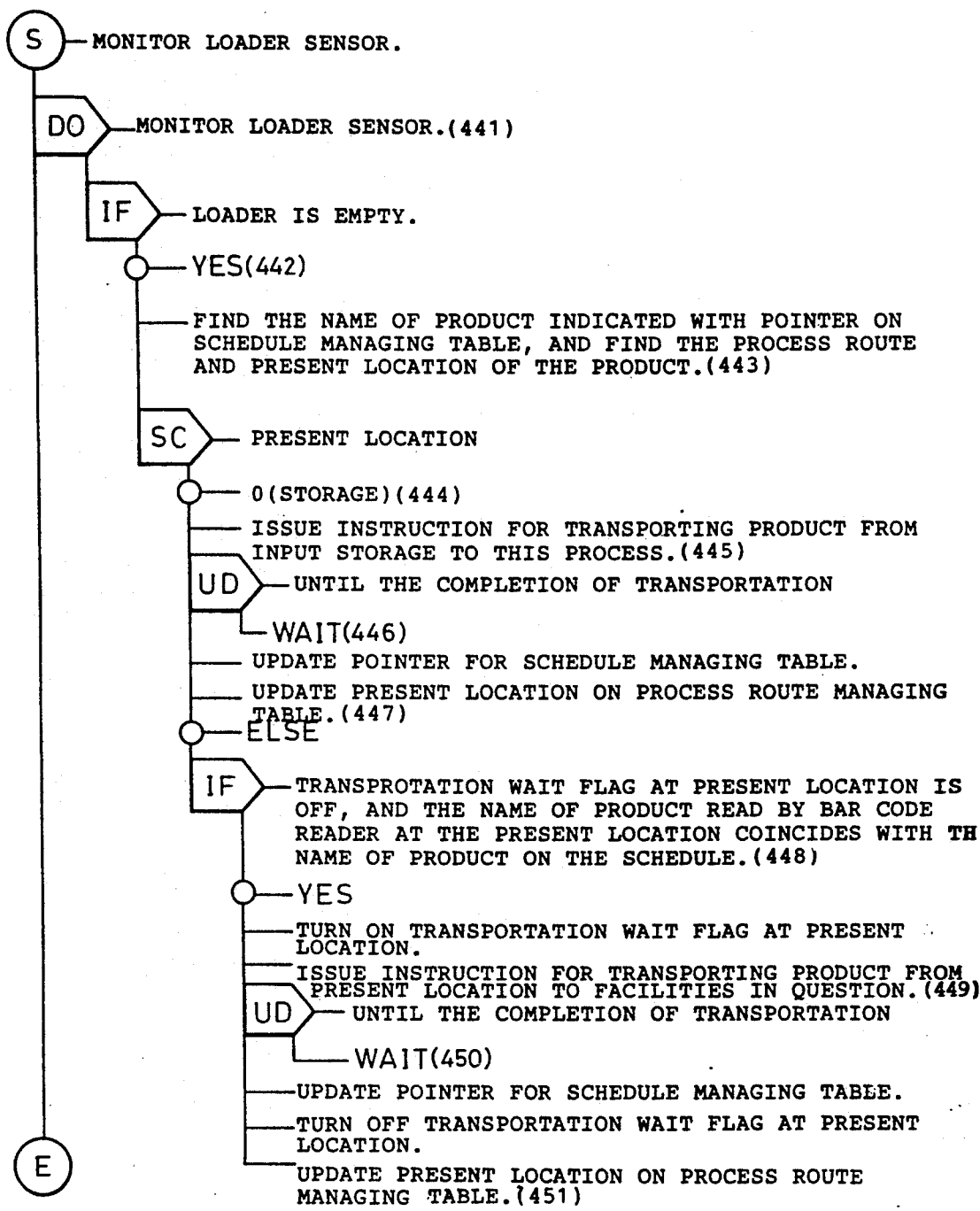
FIG. 44 is a view explaining a sensor monitoring process of FIG. 41.
Figure 45:
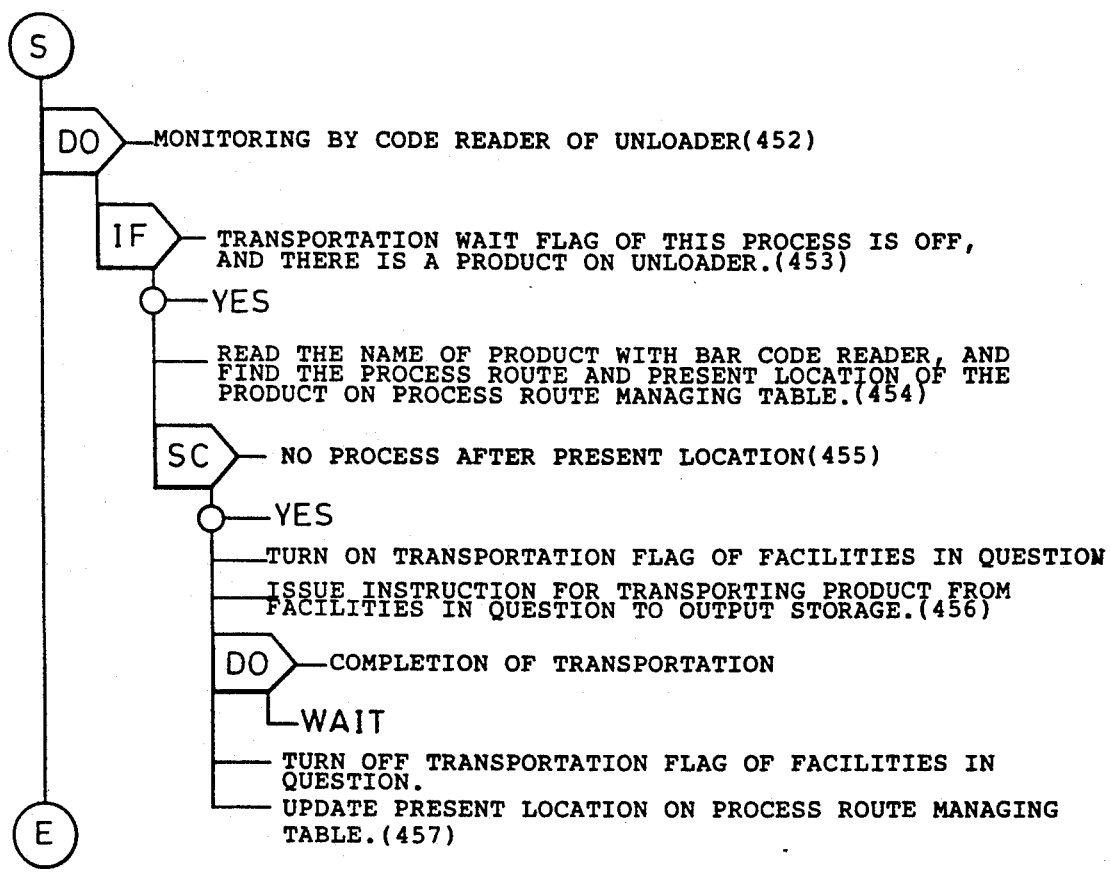
FIG. 45 is a view explaining a bar code reader monitoring process of FIG. 41.
Figure 47A:
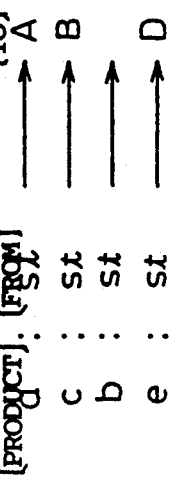
FIGS. 47A to 47O are views showing changes in the schedule managing table of the embodiment of FIG. 41.

FIG. 41 explains the unmanned carrier controlling system according to the embodiment of the invention, FIG. 42 explains a schedule managing table according to the embodiment of the invention, FIG. 43 explains a process route managing table according t the embodiment of the invention, FIG. 44 explains a sensor monitoring task according to the embodiment of the invention, FIG. 45 explains a bar code reader monitoring task according to the embodiment of the invention, FIG. 46 explains a work schedule according to the embodiment of the invention, and FIGS. 47A through 47O explain changes on managing tables according to the embodiment of the invention.

FIG. 41 explains a system of controlling the unmanned carrier 4. The line control system 3 explained with reference to FIG. 37 has schedule managing tables 41A for managing work schedules of products to be fed to the facilities, pointers 41B for pointing to latest schedules, process route managing tables 42A for managing process routes and present locations of respective products, and transport wait flags 42B for avoiding a transport request form being repeatedly generated after issuing the transport request until the completion of actual transportation. If the transport wait flag 42B is ON, it means that a product is being transported.

Similar to the prior arts, in the respective facilities A to N, a loader for feeding a product has a sensor 371, and an unloader for delivering the product has a bar code reader 372. The sensors 371 and bar code readers 372 of the facilities A to N are monitored by sensor monitoring processes 43A and bar code reader monitoring processes 44A. According to results of the monitoring, an unmanned carrier controlling process 45A controls the unmanned carrier 4.

FIG. 44 is a flowchart explaining an operation of the sensor monitoring process 43A according to the embodiment of the invention.

In FIG. 44, the sensor monitoring process always monitors the sensor 371 of each loader (step 441). For example, No. 1 of the schedule managing table 41A of FIG. 42 is referred to. At time 8.00, if the loader of the facilities A is empty (step 442), the loader can receive a product. The product to be received is checked on the schedule managing table 41A and confirmed as a product "a". The process route managing table 42A is checked to find the present location and process route of the product a (step 443).

If the present location is 0 (step 444), the product a set at the input storage (St) 361. A transport request is issued for transporting the product a from the input storage 361 to the facilities A (step 445), and the product is transported. After the completion of the transportation (step 446), the pointer 41B of the schedule managing table is updated to No. 2, and the present location on the process route managing table 42A is updated to 1 to indicate that there is the product a in the facilities A (step 447). In this way, the product a is transported from the input storage (St) 361 to the loader of the facilities A.

Since the pointer 41B for the schedule managing table indicates No. 2 of FIG. 42, the facilities A request a product "b". Since the present location is 1, it is understood that the product b is in the facilities C from FIG. 43. If the transport wait flag 42B for the facilities C is OFF and if the bar code reader 372 of the facilities C reads the name of product as b (step 448), the transport wait flag 42B is turned ON, and the facilities B issue a request of the facilities A of transporting the product b (step 449). After the product is transported (step 450), the pointer 41B is updated to No. 3, and the present location of the product b on the process route managing table 42A is updated from 1 to 2 (facilities A) (step 451), thereby completing the transportation of the product b from the facilities C to the facilities A.

FIG. 45 is a flowchart explaining an operation of the bar code reader monitoring process 44A according to the embodiment of the invention. The sensor monitoring process 44A of FIG. 44 alone cannot transport a completed product to the output storage St. To cope with this, the bar code reader 372 reads the name of a product, and the name is confirmed in the process route managing table 42A. If a destination of the product is the output storage St, a transport request is issued to carry the product to the output storage St.

In more detail, the bar code reader monitoring process 44A always monitors the bar code reader of the unloader 365 (FIG. 36) of each set of the facilities (step 452). If the transport wait flag 42B for certain facilities is OFF and if there is a product on the unloader of the facilities in question (step 453), the bar code reader 372 reads the name of the product, and the process route and present location of the product is checked in the process route managing table 42A (step 454). If there is no process to which the product is to be transported other than the present location (step 455), the transport wait flag corresponding to the facilities is turned ON, and the facilities provides an instruction for transporting the product from the facilities to the output storage (St) 362. After the completion of the transportation, the transport wait flag corresponding to the facilities is turned OFF, and the present location on the process route managing table 42A is updated to 0 (step 457).

FIG. 46 is a view explaining a work schedule according to the embodiment explained with reference to FIGS. 40 to 45. This schedule shows which of the facilities A to D process which of products according to elapsed time. In this example, the facilities A, B, C, and D process products a, b, c, d, and e.

In FIG. 46, a work schedule for the facilities A is to process, as shown in FIG. 42, the product a from time 8.00 to 8.40, the product b from time 8.40 to 8.50, and the product d from time 8.50 to 9.00.

For the facilities B, C, and D, work schedules are prepared to process the products in time bands shown in the figure.

FIGS. 47A to 47O are managing tables representing the work schedules of FIG. 46 and show changes in the tables.

FIG. 47A shows an initial state. In the initial state, pointers (each indicated with a white triangle in the figure) for indicating latest schedules are at the heads of the schedule managing tables and process route managing table. The present locations of the products in the process route managing table are all in the input storage St.

In this situation, all the loaders are empty, so that instructions are provided to transport first products from the input storage St to the respective facilities according to the schedule.

FIG. 47B: According to the instructions, the products are transported, and the pointers of the schedule managing tables of the respective facilities are updated from No. 1 to No. 2 and the present locations in the process route managing table are updated from 0 to 1. The pointers depicted with black triangles on the schedule managing tables indicate that states have been changed from the previous states.

Figure 47C:

FIG. 47C: When the loader of the facilities C becomes empty after a certain time, the pointer in the schedule managing table of the facilities C indicates the product c. On the process managing table, the present location of the product c is 1, i.e., the first facilities B in the process route. Accordingly, after the product c comes on the unloader of the facilities B, a transport instruction is issued to transport the product from the facilities B to the facilities C.

After the product is transported, the pointer of the schedule managing table of the facilities C is updated from No. 2 to No. 3 and the present location of the product c is updated from 1 to 2. FIG. 47C shows the updated tables.

Thereafter, the schedule managing tables and process managing table are collated in a similar manner to process the products by the respective facilities.

As explained above, the present invention provides an unmanned carrier controlling system that manages work schedules of respective facilities, and provides transport requests in response to information provided by product detecting portions disposed at the feeding ports indicating that feeding ports of the facilities are empty, thereby efficiently operating the facilities as a whole even if a product processing time fluctuates.

(5) Method of managing shortage of parts to be assembled and automatically correcting insertion data in automatic assembling machines such as inserters and mounters (refer to FIGS. 48 through 58)

According to this method, a cell controller 2 manages the number of remaining parts set in each channel. If there is no parts in a certain channel and the channel is switched to another channel having the same parts or when a shortage of parts occurs, NC data is automatically changed and resent. The shortage is managed for every product, thereby improving efficiency of after-treatments after parts are supplied.

Detailed explanations are as follows.

In a field of manufacturing electronic circuit devices such as printed board units and ceramic circuit modules, the parts mounting apparatus 14 (refer to FIG. 2) such as the parts inserter and parts mounter is employed to improve productivity. The parts mounter has a plurality of channels for storing parts, which are mounted on predetermined positions of a printed board according to NC data. Since consumption of the parts depends on their kinds, some of the channels may run out of the parts in a short time while some of them last for a long time. This is why some ideas are needed for realizing an unmanned operation of the apparatus for a long time.

A general arrangement and operation of the parts mounter will be explained with reference to FIG. 48. A belt conveyor 15-1 transports printed boards, each of which is supplied to a parts mounter 14 through a feeding/delivering unit (pusher) 12. A parts setting portion 542 has channels in which parts are set. These parts are mounted on the printed boards by the parts mounter 14. The parts mounted printed board is delivered to a belt conveyor 15-2 through a feeding/delivering unit 12a, and transferred to the next process. The printed board supplied to the parts mounter 14 is identified by a bar code reader 541. According to an identification signal, a cell controller 2a controls the feeding/delivering unit 12a, parts mounter 14, and parts setting portion 542.

Figure 49:
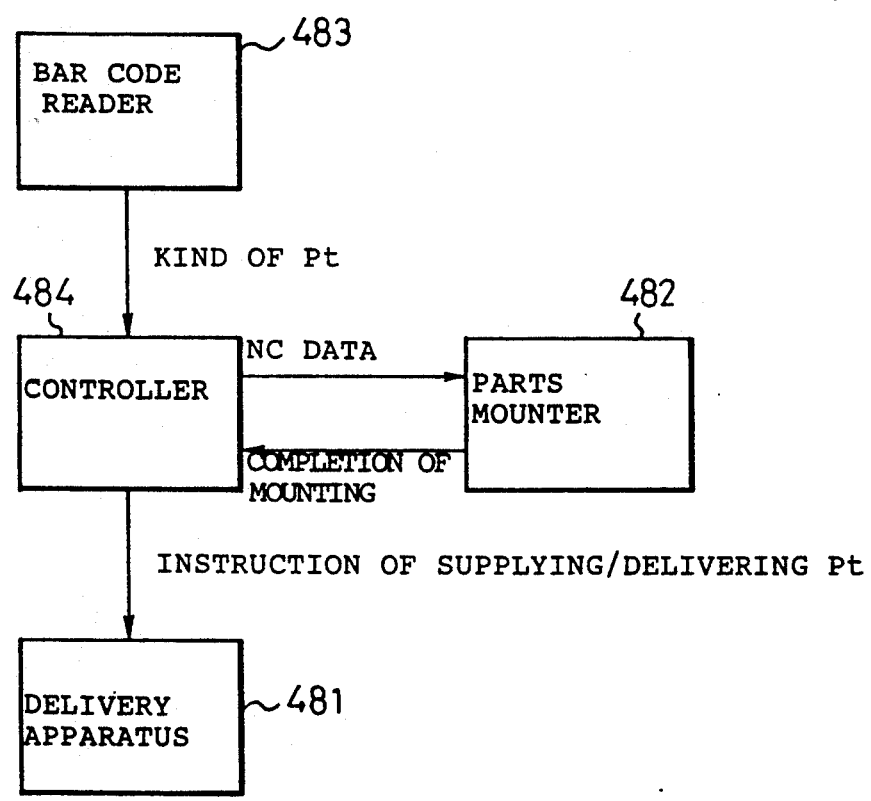
FIG. 49 is an explanatory view showing a conventional parts mounting system.

A conventional way of transmitting and receiving signals between the respective components will be explained with reference to FIG. 49. The bar code reader 483 sends an identification signal relating to a printed board to the cell controller 2a, which sends NC data to the parts mounter 14. The parts mounter 14 sends a mounting completion signal to the cell controller 12a, which sends a feeding/delivering instruction signal of the printed board to the feeding/delivering unit 12a.

The conventional method of controlling the parts mounter does not have a function of automatically switching a plurality of channels containing the same kind of parts from one to another when the one channel runs out of parts. This causes a problem. Namely, in an unmanned parts mounting system in which a bar code reader automatically identifies printed boards to automatically exchange NC data of the mounting system whenever the kind of the printed board is changed, a channel having parts that are frequently used may run a short of the parts in a short time. Whenever such shortage occurs, more parts must be supplied. If there are no parts to supply, the step of mounting the parts causes an error every time, and the unmanned operation will not be continued for a long time.

To solve the problem, an object of the invention is to provide a method of controlling a parts mounter that allows the same parts to be set in a plurality of channels, and manages a shortage of parts of printed boards board by board to automatically continue the processing of the boards.

Figure 50:
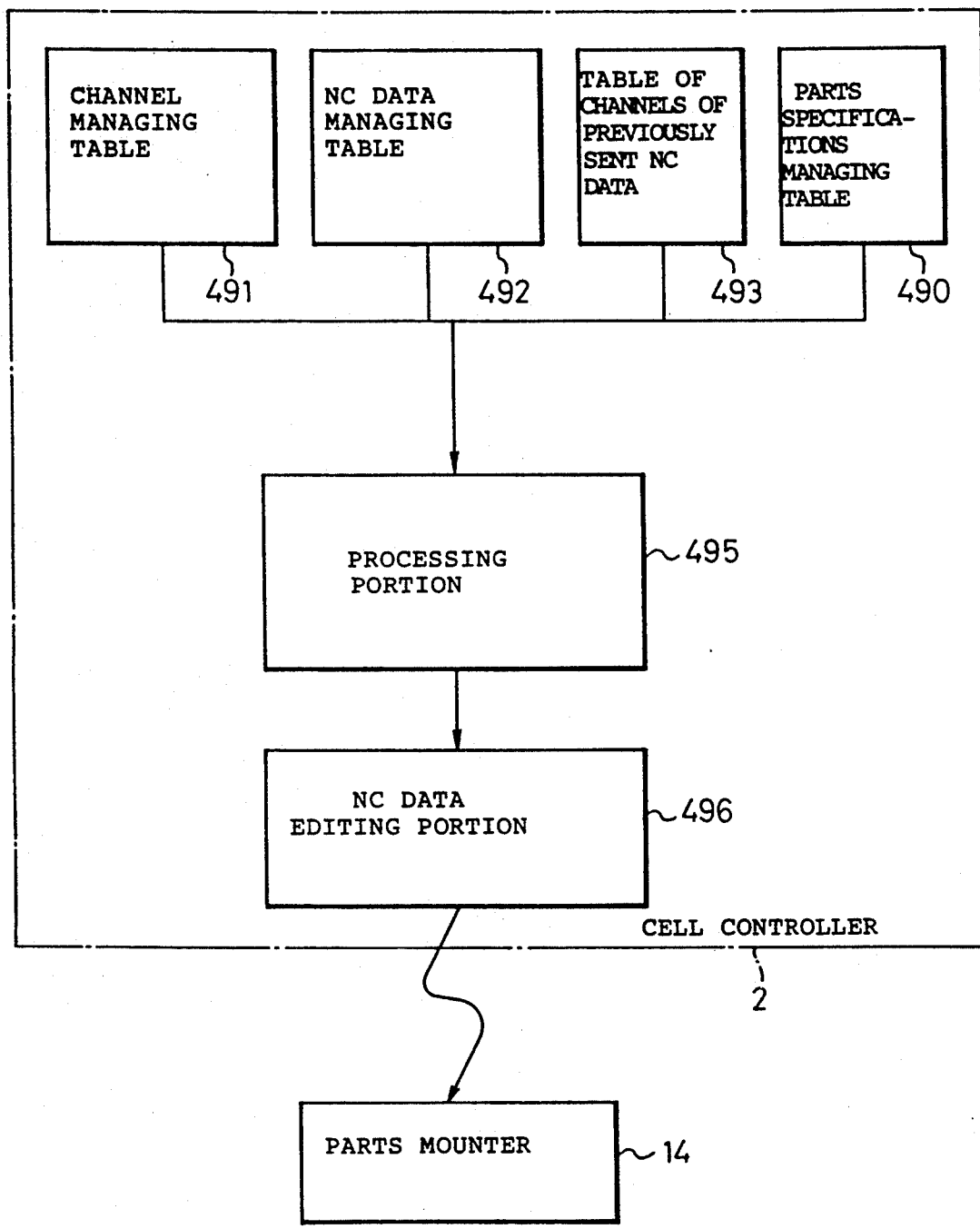
FIG. 50 is an explanatory view showing a parts mounting system according to an embodiment of the present invention.

FIG. 50 is a block diagram showing a principle of the embodiment of the invention. In the figure, a parts mounter 14 has a cell controller 2, which controls a plurality of channels to supply parts one after another from the channels onto predetermined positions of a printed board supplied successively one by one, according to NC data.

In FIG. 50, numeral 490 denotes a parts specifications managing table for storing the kinds and quantities of parts to be mounted on a supplied printed board.

Numeral 491 is a channel managing table for storing the kinds and quantities of parts set in the respective channels as well as information about channels in use.

Numeral 492 is an NC data managing table for storing information of channels that contain parts to be mounted on the supplied printed board and information about positions where the parts are to be mounted.

Numeral 493 is a table of channels of previously sent NC data for storing all or part of NC data of a printed board supplied just before the presently supplied printed board.

A processing portion 495 updates the contents of the NC data managing table 492 according to the quantities of parts remaining in the respective channels. An NC data editing portion 496 edits the NC data and sends the edited NC data to the parts mounter 14.

The embodiment of the invention arranges the above-mentioned tables, and according to the quantities of parts remaining in the respective channels, updates the contents of the NC data managing table. The same parts are set in a plurality of the channels which are automatically switched from one to another if the one causes a shortage of parts.

The tables 490 to 493 are stored in the NC data memory 409 of FIG. 2.

FIG. 51A shows an example of a relation between channel numbers and parts specifications (the kinds of parts) of a prior art, and FIG. 51B shows a relation between channel numbers and parts specifications of this invention. In the tables, lower-case letters denote the parts specifications. As shown in the figures, the prior art assigns each channel to a single kind of parts specification at a ratio of one to one, while the embodiment of the invention assigns a plurality of channels 1, 2, and 3 for a parts specification a, channels 3 and 4 for a parts specification b, and channels 10, 11, 12, and 13 for a parts specification g.

The embodiment of the invention will now be explained in more detail.

In FIG. 48, the embodiment of the invention arranges the cell controller 2 instead of the conventional cell controller 2a. The arrangements and functions of other parts except the cell controller 2, and connections between the cell controller 2 and the other parts are the same as those of the conventional system, and therefore, their explanations will be omitted.

FIG. 52 shows an example of the parts specifications managing table 490 containing parts a, b, c, . . . in quantities of 30, 20, 15, . . . to be mounted on printed boards.

FIG. 53 shows an example of the channel managing table 491. In this example, the parts a for example are stored in channels (CH) 1, 7, and 8, and parts b are stored only in a channel 3. If a busy flag is "1", the corresponding channel is in use. If the busy flag is "0", the corresponding channel is not in use. The quantities of the parts a in the channels 1, 7, and 8 are 14, 9, and 7, respectively. The total of the quantities of the parts a is 30 which matches the quantity on the table of FIG. 52.

FIG. 54 shows an example of the NC data managing table 492. The table shows information about channels that contain parts and information about mounting positions. These information pieces are arranged in a mounting order from the top to the bottom of the table. X and Y represent positional coordinates on a printed boards, and $\theta$ represents the orientation of each part. Seven pieces of the parts "a" are needed, and six of them are supplied from the channel 1, and the remaining one is supplied from the channel 7.

FIG. 55 shows an example of the table 493 of channels of previously sent NC data. For example, this table stores part (the kinds of parts and the channel numbers containing the parts) of the NC data of a printed board supplied just before the printed board that relates to the NC data managing table of FIG. 54.

Figure 56:
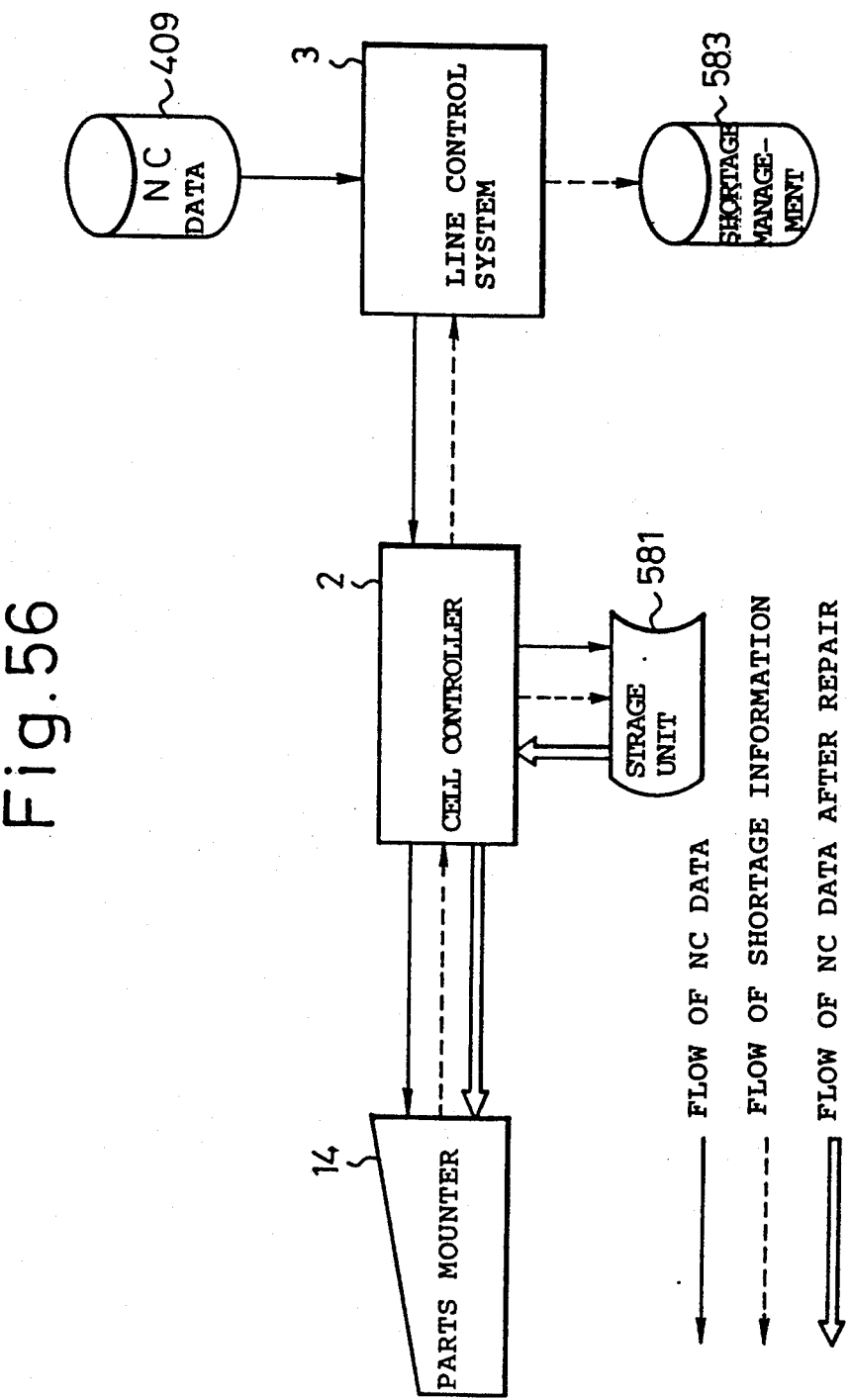
FIG. 56 is a view explaining a shortage managing system according to an embodiment of the invention.

FIG. 56 is a block diagram showing an arrangement of a shortage processing system according to the embodiment. This embodiment is a part of the system of FIG. 2. In FIG. 56, the parts mounter 14 provides parts shortage information indicating parts of which channel are running short to the cell controller 2. According to data of the NC data memory 409 sent from the line control system 3, the cell controller 2 finds out which parts of a printed board are runing short in the channel and stores the information in the shortage managing memory 583 to use the information for manually supplying the pars. The cell controller 2 automatically generates NC data with excluding the parts in shortage and sends it to the parts mounter 14. After the parts in shortage are supplied, it is possible to output which product has caused the shortage of parts. Instead of automatically generating the NC data with excluding the parts that are running short, the NC data may automatically be changed to switch the channel having the shortage to another channel having the same parts. In any case, the contents of the NC data memory serving as a master are unchanged. Accordingly, error information will not be sent to the cell controller 2 every time when the parts mounter has a shortage of parts, and the parts are smoothly mounted.

Figure 57:
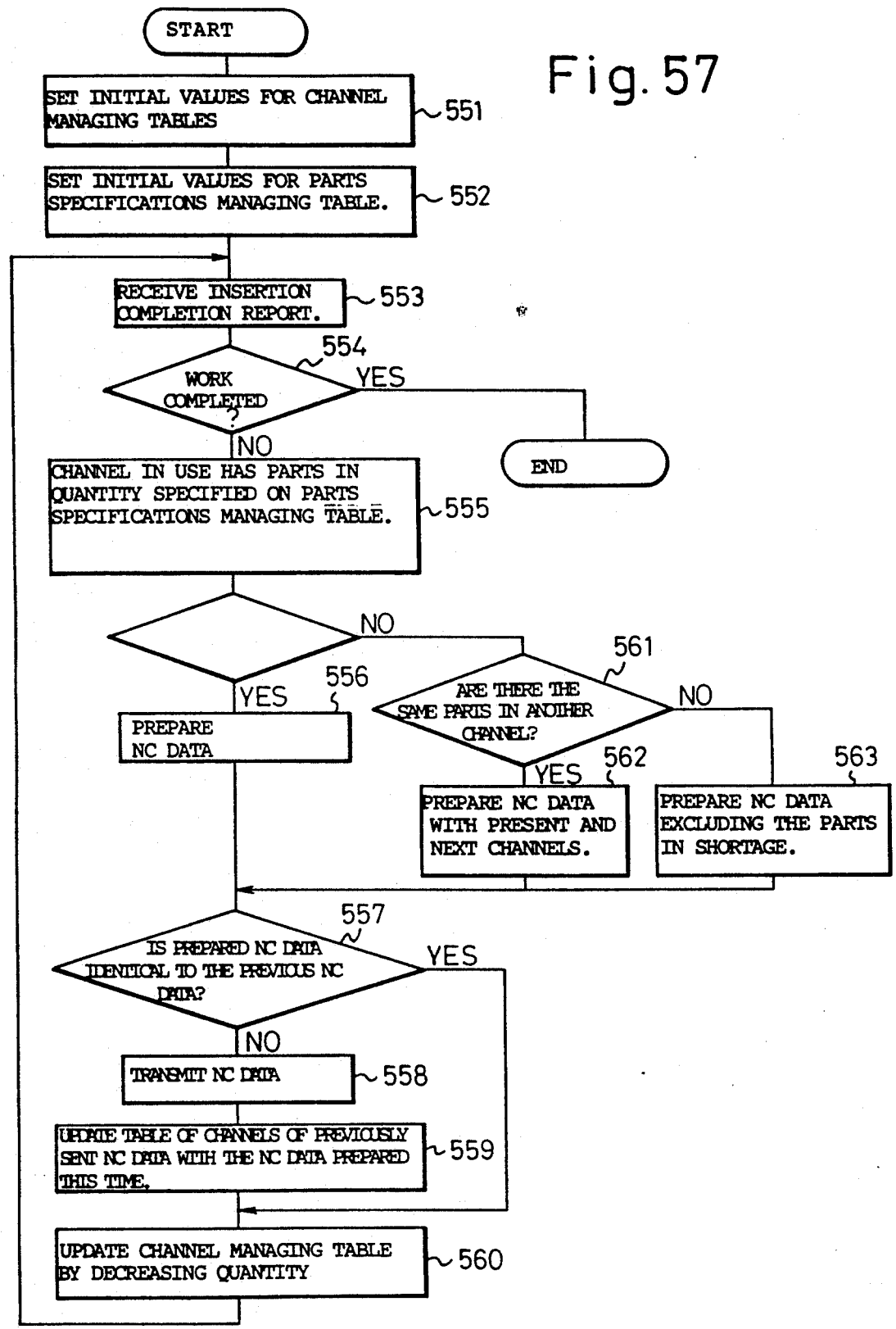
FIG. 57 is a flowchart explaining an operation of a line control system of FIG. 56.

FIG. 57 shows a control flowchart of a part of the shortage process or the channel changing process in the cell controller 2. First, step 551 sets initial values of the channel managing table 491 in advance according to data sent from the NC data memory 409 through the line control system 3. Step 552 sets initial values of the parts specifications managing table 490 according to data from the NC data 409. Step 553 receives and insertion completion notice signal (a signal indicating that parts have been mounted on a printed board) from the parts mounter 14, and step 554 judges whether or not all printed boards have been completely worked. If there are unfinished printed boards, step 555 judges whether or not the quantities of parts on the parts specifications managing table 490 can be covered by those stored in channels in use. If there are sufficient parts in the channels in use, step 556 prepares NC data. If any one of the channels in use is short of parts, step 561 checks to see whether or not another channel is storing the same kind of parts. If another channel is storing the same kind of parts, step 562 prepares NC data according to the parts stored in the two channels. If another channel does not have the same kind of parts, step 563 prepares NC data excluding the parts that are running short from the present NC data.

After the NC data is prepared in the step 556, 562, or 563, step 557 judges whether or not the prepared data is the same as the previous NC data. If they are not identical, step 558 sends the new NC data to the parts mounter 14, and step 559 updates the table 493 of channels of previously sent NC data accordingly. When the step 559 updates the NC data, or when the step 557 judges that the present data is identical to the previous NC data, step 560 decreases and updates the quantities of the parts in the channel managing table 491, and the flow returns to the step 553. This routine is repeated until the step 554 judges that the work has been completed.

Figure 58B:
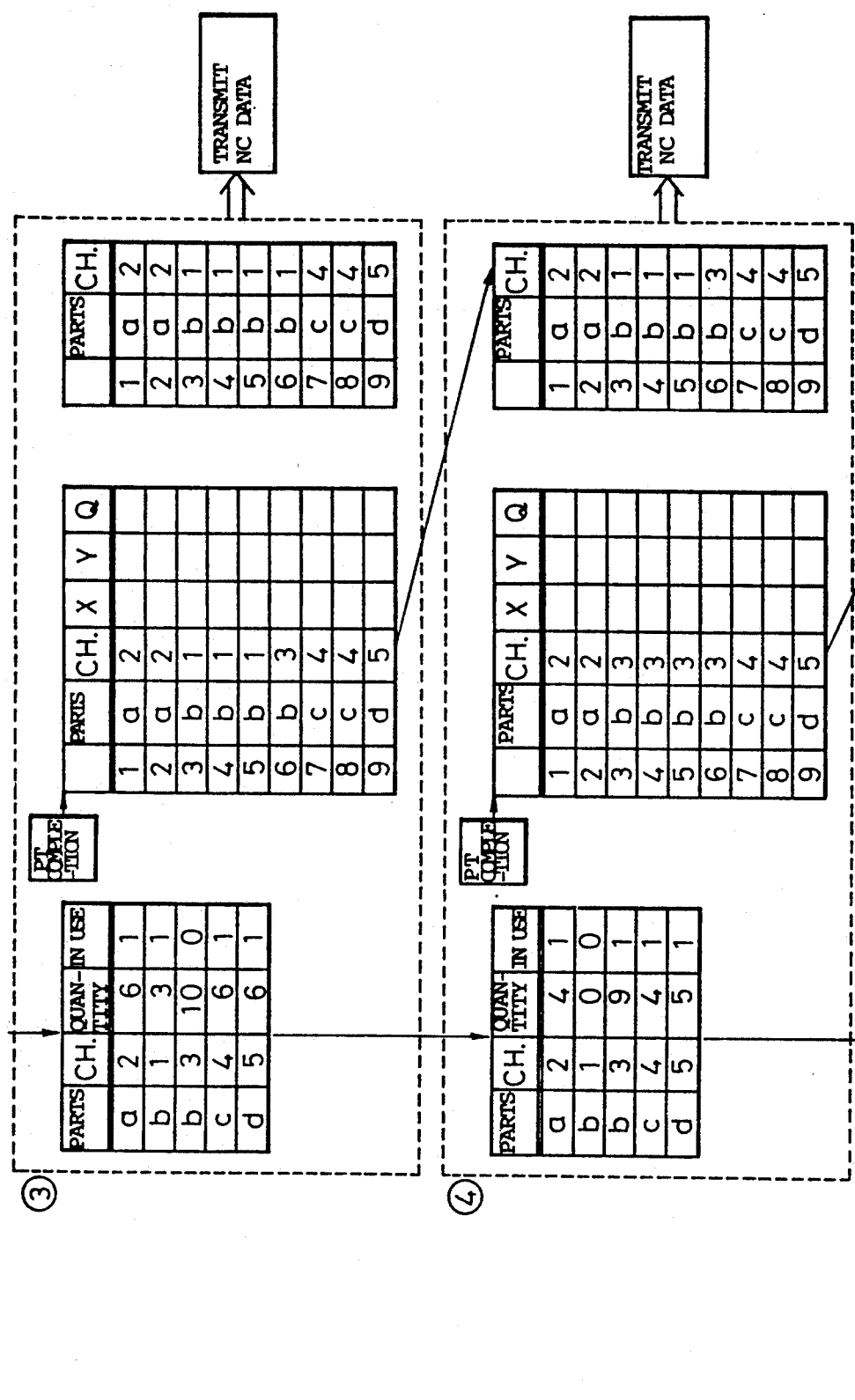
Figure 58C:
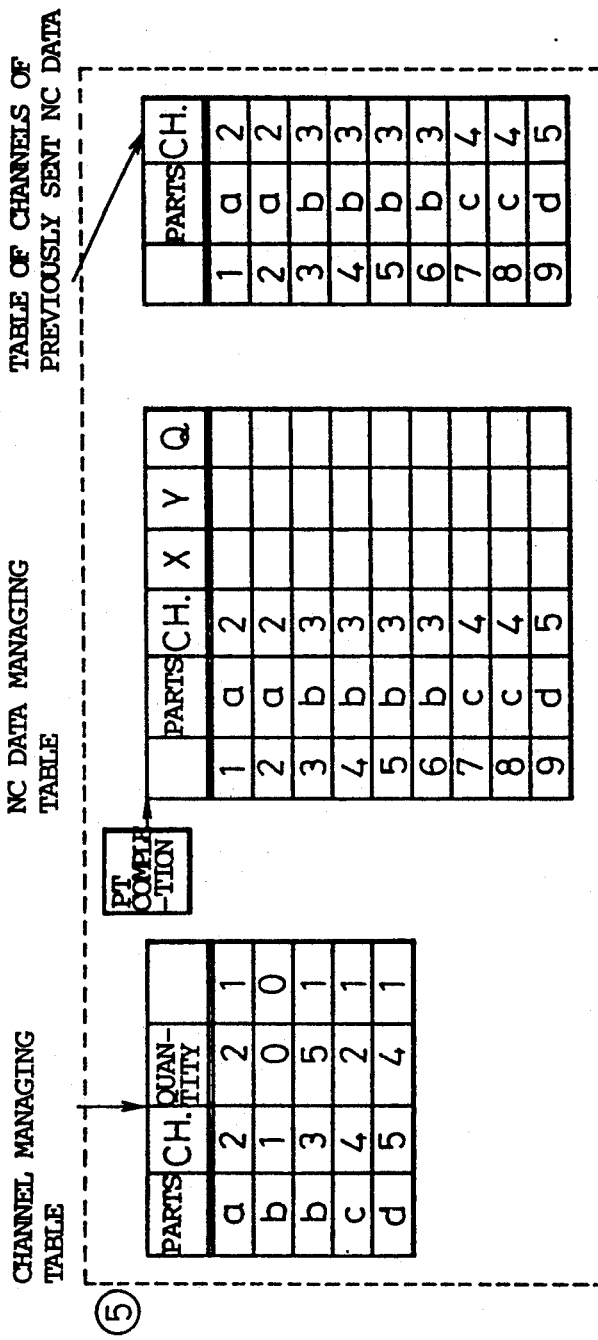

FIG. 58 shows temporary changes in the contents of the respective tables 490 to 493. Numerals (1) to (5) indicate the contents of the respective tables corresponding to five printed boards that are successively processed.

First in (1), the quantities of parts on the parts specifications managing table 490 are compared with those of the channel managing table 491. Since the quantities of parts of the channel managing table 491 are greater than those of the table 490 for every part, it is possible to prepare NC data with the present channels. In (1), the table 493 of channels of previously sent NC data has no data, and therefore, the NC data is transmitted to the parts mounter 14.

In (2), the quantities of parts on the channel managing table 491 have been reduced and updated by the quantities of parts mounted on the first printed board, and the table 493 of channels of previously sent NC data is storing the NC data prepared in (1). In (2), the NC data of the NC data managing table 492 is equal to the NC data of the table 493 of channels of previously sent NC data, so that the NC data need not be transmitted.

In (3), the third printed board is processed. Here, the quantity 3 of the parts "b" in the channel 1 in use in the channel managing table 491 is smaller than the quantity 4 of the same parts in the parts specifications managing table 490. To prepare NC data, the parts are supplied, therefore, from a channel 3 that is not in use, to cover the shortage. In this case, the NC data prepared on the NC data managing table 492 is different from (2), so that the NC data is resent, and a busy flag of the channel 3 of the parts "b" is turned ON in the channel managing table 491.

In (4), parts are mounted from the channels in use in the channel managing table 491. Since its NC data is different from that of (3), the NC data must be resent. Similarly, the fifth printed board is processed in (5).

As explained above, this embodiment of the invention can set the same parts in a plurality of channels, and automatically change the channels from one to another depending on consumption of the parts, thereby reducing the frequency of parts shortage and system rearrangement.

Figure 59:
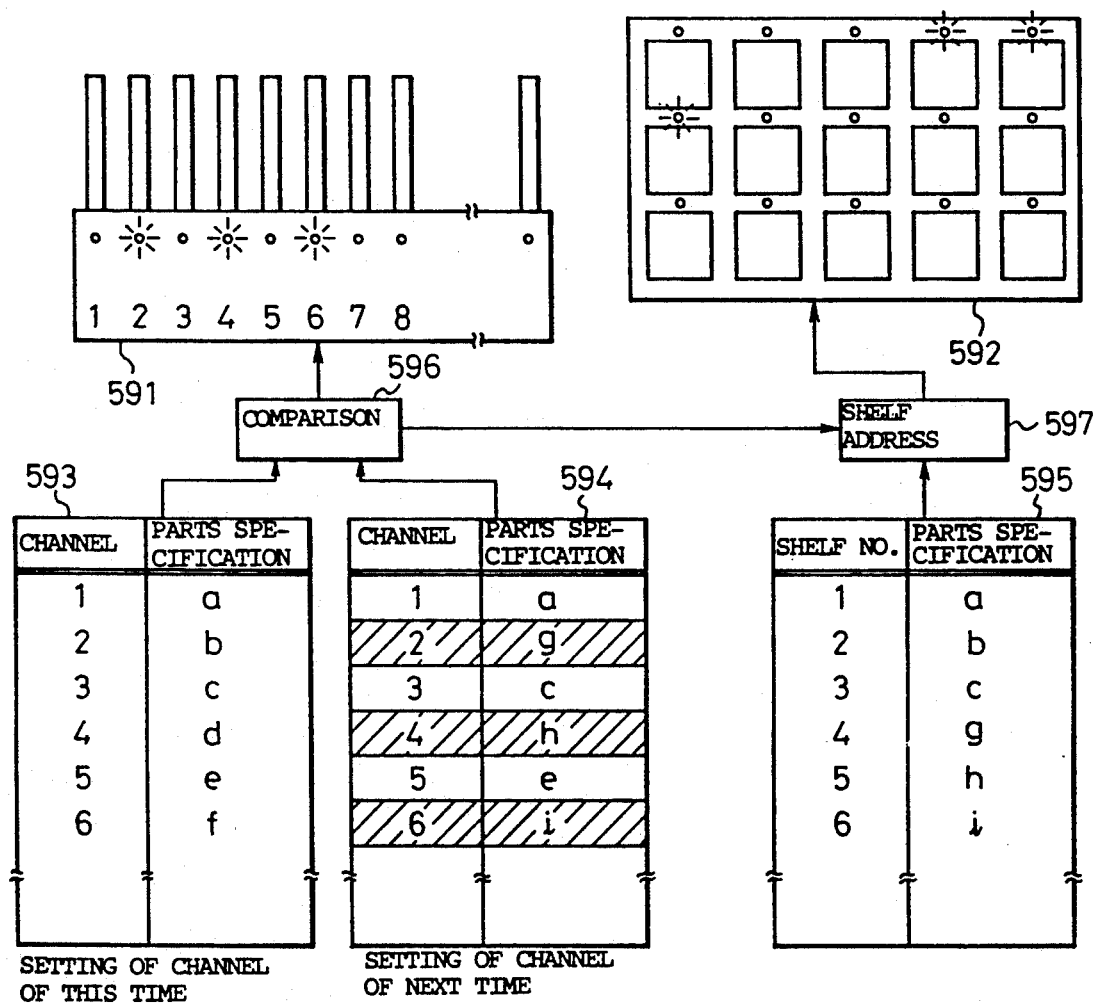
FIG. 59 is a view explaining indications of arrangement changing instructions in the system of FIG. 56.

(6) Function of indicating channels which must be changed in altering arrangement (refer to FIG. 59)

This function checks an arrangement for next products to be fed according to a predetermined feeding schedule. A parts shelf for storing parts is also controlled (which parts are stored where). If there is a channel which must be rearranged, a lamp of the parts setting portion of the corresponding channel and a lamp of the parts shelf at a corresponding location are lighted up to let a worker know which parts must be set into which channel.

FIG. 59 is a schematic view showing a system for realizing this function. In the figure, numeral 591 is the parts setting portion, 592 is the parts shelf, 593 is a table of parts specifications set for channels of this time, 594 is a table of parts specifications set for channels of the next time, 595 is a table for indicating positions on the shelf where parts are stored, 596 is a comparing portion, and 597 is a shelf address setting portion. If the parts specifications of the next channel setting differ from those of the channel setting of this time (present channel setting) in, for example, channels 2, 4, and 6, the comparing portion 596 detects the difference and lights up lamps of corresponding channels of the parts setting portion 591 of the facilities. Also, the shelf address setting portion 597 lights up lamps at locations of the parts shelf 592 where the parts having the different specifications are stored. These will be done by sending signals from the channel setting table to the parts setting portion 591 and to the parts shelf 592.

Figure 60:
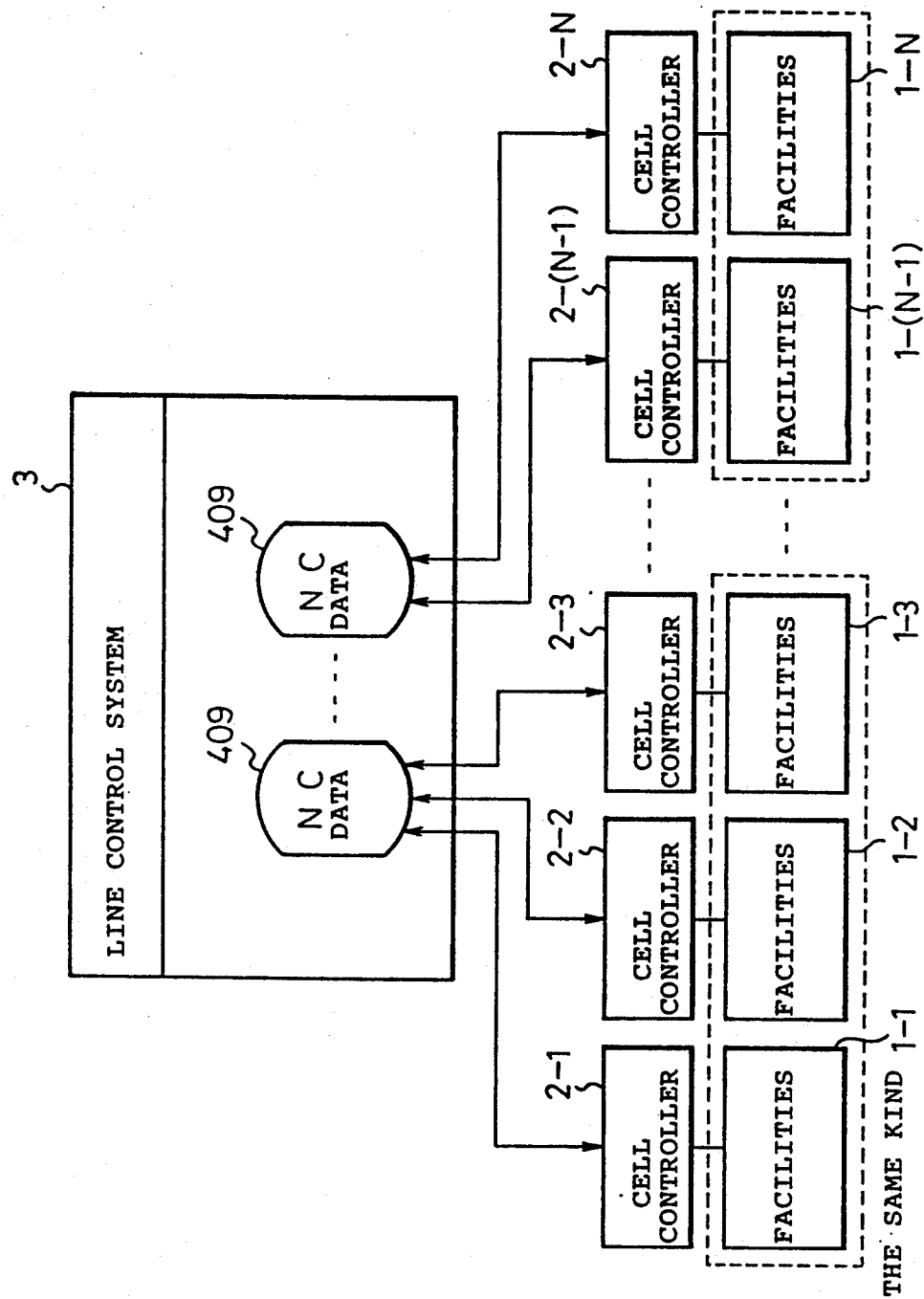
FIG. 60 is a view explaining the referring of CAM data in the system of FIG. 56 according to an embodiment of the present invention.

(7) Function of immediately reflecting correction on NC data for one of facilities of the same specifications to the other there of (refer to FIG. 60)

According to this function, information (for example, mounting data) common to facilities having the same specifications is not stored in the cell controllers but in the line control system. As and when required, the cell controllers use a server function, etc., to refer to a database of the line control system. In this way, corrections made in the database of the line control system are reflected to the cell controllers of the facilities having the same specifications.

FIG. 60 is a schematic view showing a system for realizing this function. In the figure, the facilities 1-1 to 1-3 have the same specifications and use common information. The facilities 1-(N-1) and 1-N are other facilities having the same specifications. According to a prior art, each of the cell controllers 2-1 to 2-N must store common information. Data is communicated only between the cell controllers and corresponding facilities. According to this prior art, when the common information is corrected in one of the cell controllers, the same correction must be made in the other cell controllers. This is troublesome. To avoid this, the embodiment of the invention stores the common information in the database (NC data) of the line control system 3. As a result, a correction made in the database of the line control system 3 is reflected to the cell controllers connected to the facilities having the same specifications, and no correction is required in each of the cell controllers.

Figure 61:
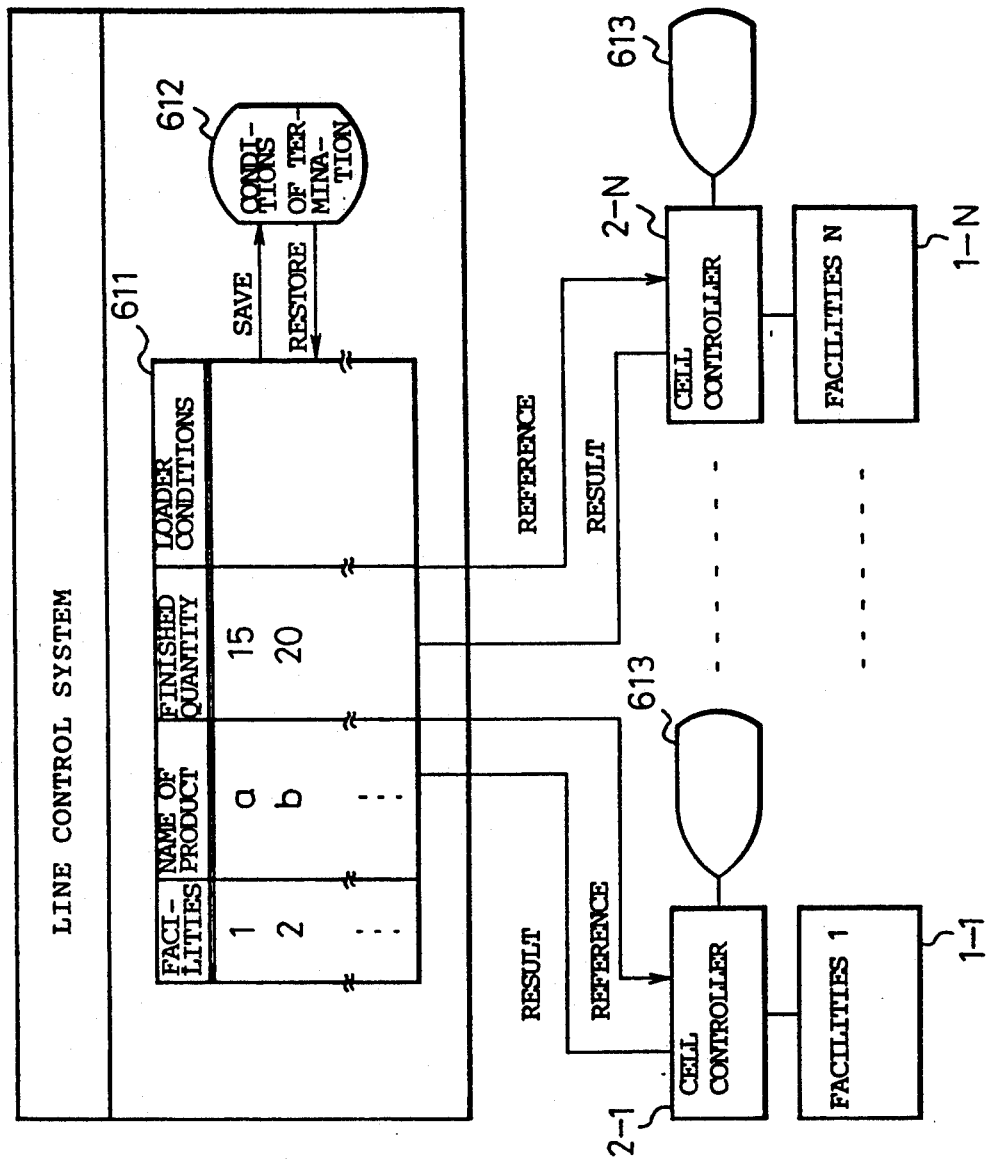
FIG. 61 is a view explaining the collective controlling production conditions in the system of FIG. 56 according to an embodiment of the present invention.

(8) Function of terminating work in the middle of lot and restarting the work continuously from the terminated situation (refer to FIG. 61)

According to this function, the line control system totally manages progress conditions of each product in respective facilities through the cell controllers. When a power source is cut, the progress conditions (the presently finished states, etc.), are saved in a file. When the power source is turned ON, the conditions are restored from the file, thereby starting production from the terminated conditions. Accordingly, the work can be terminated at any time.

FIG. 61 is a schematic view showing a system for realizing this function. Numeral 611 denotes a file memory for updating and storing in real time the conditions of the facilities, the names of products, the number of finished printed boards, and loaders, and 612 is a dump file memory.

Each of cell controller 2-1 to 2-N refers to the file memory 611 of the line control system 3 to control the facilities 1 to 1-N in mounting parts. The progress conditions of each product in each set of facilities are written in the file memory 611 of the line control stem 3 through a corresponding one of the cell controllers.

When a power source is cut, the progress conditions of products stored in the file memory 611 are dumped into the dump file memory 612.

When the power source is turned ON, the contents of the dump file memory 612 are restored in the file memory 611.

Since the product progress conditions are dumped, production can be restarted from the terminated conditions even after the termination of production.

(9) Function of monitoring production conditions of lines as a whole with line control system and cell controllers (refer to FIG. 61)

As shown in FIG. 61, the conditions of each set of facilities are centrally controlled by the line control system through the cell controllers. With this arrangement, not only the line control system but also the respective cell controllers can monitor the production conditions, errors, and the necessity of rearrangement of lines as a whole. As a result, one person can totally grasp the conditions of the lines and decide countermeasures, thereby promoting unmanned operation of the lines. For example, if products are not smoothly fed to one set of facilities according to a schedule, one can grasp the production conditions, etc., of the other facilities through the cell controller connected to the facilities in question to identify the cause of the delay and take countermeasures against the delay.

(10) Function of immediately knowing the locations and progress conditions of products in a line (refer to FIG. 62)

The prior art provides only process completion information. The line control system of the embodiment collectively controls the present location and progress conditions of each lot which is a unit of production and transportation. It is possible, therefore, to immediately know the location of a specific product and its production progress.

FIG. 62 schematically shows a system for realizing this function. A line control system 3 has a real time table 623. Based on result data from cell controllers 2-1 to 2-N, the contents of the table 623 are updated in real time. The contents of the table 623 are displayed on a graphic screen 624 in real time. By specifying the name of a product in the line control system 3, it is possible to know in real time in which facilities the product exists, which lot is under production, and the location of the product among all the products.

Still another embodiment of the invention extracts, from the contents of the real time table 623 of FIG. 62, event changing points such as rack starting points, printed board starting points, and error occurring points, and the names of products corresponding to the event changing points. Thereafter, as shown in FIG. 63, the extracted data are stored on the logging file 413 (refer to FIG. 4C) for, for example, one day or one week. The contents of the logging file are reproduced on a monitor 631 in real time or 1/10 of real time, so that the production conditions in the past may be grasped by the line control system 3. As a result, it is possible to visually grasp problems occurring in the production line and their causes such as congestion of products in a rack. The contents of the logging file 413 may be collected, analyzed, and displayed on a monitor 632.

[3] Function of analyzing production results

To support finding a cause of trouble that is preventing an improvement in rate of operation, as well as supporting the finding of know-how for improving production efficiency, the invention provides the following functions (refer to FIG. 63).

(1) Function of sorting and reproducing production results

As explained before with reference to FIG. 63, the line control system records the occurrence of operation (for example, movements of racks and printed boards) and the occurrence and restoration of errors in order of timing for all the facilities. The recorded data are reproduced later by a simulation program to show the production results. With this, it is possible to objectively observe problems on the production line.

(2) Function of saving an analyzing production results

Results are collected to find an operation rate, a preparation ratio, a time from occurrence of an error to restoration, and frequency of each error, and are compared with a schedule, thereby finding the cause of waiting time and indicating the same on a graph.

EXPLOITATION IN INDUSTRY

As explained above, the present invention provides the following effects, and can effectively be utilized in assembling lines of printed board units, etc.:

taking countermeasures according to a weekly schedule before feeding products to a line, and providing an execution schedule with half-finished products, urgent products, and failed facilities being taken into consideration to deal with sudden factors, thereby efficiently fabricating the products without confusing the line;

always monitoring a difference between the schedule and a result, and issuing proper work instructions for workers or line managers according to the difference, thereby operating the line according to the schedule;

collectively monitoring the operation conditions of the line at one location, thereby promoting an unmanned operation of the line; and precisely analyzing factors which obstruct production, thereby improving the line.

We claim:

1. A production control system, comprising:
   a plurality of facilities including parts mounters for processing a plurality of products using a plurality of processes;
   a plurality of cell controllers controlling said facilities;
   transporting means for transporting the products between said facilities; and
   a line control system including means for preparing a first schedule of a relatively short period extracted from a second schedule of a relatively long period, and an execution schedule by considering, in real time, finishing conditions of the products in a line, and actual events, said line control system controlling said cell controllers, said parts mounters, and said transporting means according to the execution schedule.

2. A production control system as set forth in claim 1, wherein said line control system further comprises:
   means for analyzing an alarm from said facilities detected by one of said cell controllers as one of the actual events; and
   means for automatically rearranging the execution schedule excluding said facilities issuing the alarm when analysis of said alarm indicates that said facilities cannot be restored in a predetermined time and for indicating that the execution schedule must be rearranged when analysis of the alarm indicates that a cause of the alarm is unknown.

3. A production control system as set forth in claim 1, wherein preparation work for changing process conditions between the processes requires a certain amount of time, and wherein said line control system further comprises:
   a priority ranking table ranking the processes in order of a total processing time of each of the processes and storing the ranking of the processes;
   a sorting table grouping the products in a grouped result according to the process conditions in each of the processes and storing the grouped result; and
   means for arranging the grouped result and products so that adjacent ones of groups in the grouped result and the products have a maximum number of identical process conditions, the grouping organized in descending order of the total processing time to minimize a number of preparations, thereby determining a product feeding sequence and the execution schedule.

4. A production control system as set forth in claim 3, wherein when an urgent article handling request is one of the actual events, the urgent article is fed first in a corresponding one of the processes.

5. A production control system as set forth in claim 3, wherein, when an urgent article handling request is one of the actual events, the execution schedule is prepared giving a delivery period of the urgent article a shorter margin than that given to a delivery period of an article not having an urgent article handling request.

6. A production control system as set forth in claim 5, further comprising means for generating an alarm in real time for workers in an assembling line of said production control system.

7. A production control system as set forth in claim 1, wherein said line control system comprises
   schedule/result comparing means for comparing an executing schedule with results from said parts mounters, and
   means for generating an alarm after detecting a deviation in the comparison results of said schedule/result comparing means.

8. A production control system as set forth in claim 1, further comprising:
   a free time managing table managing a free time of each process;
   a process history table providing a history of jobs to be processed through each process; and
   a table of shift time storing a shift time between the processes, each job having a process route and man-hours for each process, the execution schedule being prepared by recursively simulating a start time, end time, and delivery time to the next process of each of the jobs for each process according to the process route.

9. A production control system as set forth in claim 1, wherein said facilities are grouped in sets, each having a product detecting portion for detecting whether a product is present at a product feeding port of a corresponding set of said facilities, and wherein said line control system comprises:
   a schedule managing table storing a work schedule of each set of said facilities, and
   a process route managing table storing a process route and a present location of each product, and when said product detecting portion detects that the feeding port of the corresponding set of said facilities is empty, said line control system refers to said process route managing table to determine a facility having a next product to be transported to one of said facilities, and issues a products transporting instruction to said transporting means.

10. A product control system as set forth in claim 1, wherein said facilities are grouped in sets, and wherein each of the sets of said facilities comprises:
a product detecting portion detecting whether a product is present at a product feeding port of a corresponding set of said facilities, and
transport request generating means for generating a request for transporting one of the products to be received next when said product detecting portion detects no product at the feeding port associated therewith, the product detecting portion confirming whether any of the products are present at the feeding port of said plurality of facilities, and if no product is present, said transport request generating means generating a request for transporting a product to be received next,
wherein said line control system collates contents of the transport request generated by said transport request generating means with processed products to produce a result of collation, and if one of the products coincides with the result of the collation, issues a transportation instruction for the one of the products to said transporting means.

11. A production control system as set forth in claim 1,
wherein said parts mounter comprises a parts unloaded state detecting means for detecting that parts are not loaded and issuing, when a shortage of the parts occurs during processing of the products, shortage information to a corresponding cell controller for controlling said parts mounter having a shortage of parts,
wherein each cell controller comprises means for informing said line control system of the shortage information, and
wherein said line control system comprises a shortage managing memory for storing names of the parts of which there is a shortage according to the shortage information.

12. A production control system as set forth in claim 11, wherein each cell controller comprises:
means for receiving input numerical control data from said line control system indicating a relationship between parts and a position of a channel to which the parts are mounted in said parts mounter,
means for automatically generating new numerical control data by updating the input numerical control data upon receiving the shortage information, and
means for sending the new numerical control data to said parts mounter.

13. A production control system as set forth in claim 11, wherein each cell controller comprises:
means for receiving input numerical control data from said line control system indicating a relation between parts and a position of a channel to which said parts are mounted in said parts mounter,
means for automatically generating new numerical control data by updating the input numerical control data upon receiving the shortage information to relate the parts of which there is a shortage with another channel containing the same parts, and
means for the new numerical control data to said parts mounter.

14. A production control system as set forth in claim 1, wherein each of said facilities comprises: a parts shelf for storing parts, said parts shelf including means for indicating a stored position of each part as and when requested, and a parts setting portion for taking parts out of said parts shelf, said parts setting portion including
means for indicating a relation of the parts, and
channels for storing the products as and when requested, and
wherein said line control system includes means for indicating positions of parts in said parts shelf and positions of the channels in said parts setting portion when a relationship between the parts to be fed and the channels is to be changed in any of said facilities.

15. A production control system as set forth in claim 1, wherein said facilities are grouped in sets, and wherein said line control system comprises a numerical control data memory for each set of said facilities for storing numerical control data related to the parts to be mounted, at least two of the sets of said facilities having identical specifications and being controlled by identical numerical control data, and
means for reflecting a correction made on the numerical control data of one set of said facilities having identical specifications in another set of said facilities having the identical specifications.

16. A production control system as set forth in claim 1, wherein said facilities are grouped in sets, and wherein said line control system comprises a dump file for dumping a work terminated state when work is terminated partway through a product lot to end a system operation, thereby enabling work to be restarted from the work terminated state held in said dump file after said production control system is started again.

17. A production control system as set forth in claim 1, wherein said facilities are grouped in sets, and wherein said line control system comprises means for collecting conditions of each set of the facilities through said cell controllers and informing said cell controllers of conditions of all the facilities.

18. A production control system as set forth in claim 1, wherein said line control system comprises:
a logging file for storing work results collected in real time, and
means for reproducing contents of the logging file on a monitor screen.

19. A production control system as set forth in claim 1, wherein said line control system comprises:
means for managing progress of production of products, and
means for displaying a location of a product on a graphic screen after a name of the product is input.

* * * * *

UNITED STATES PATENT AND TRADEMARK OFFICE
CERTIFICATE OF CORRECTION

PATENT NO. : 5,237,508
DATED : Aug. 17, 1993
INVENTOR(S) : FURUKAWA et al.

It is certified that error appears in the above-indentified patent and that said Letters Patent is hereby corrected as shown below:

Title page item : [21] Appln. No.: Change "401,033" to --674,323--.

Col. 1, lines 13-14, change "multifunction" to --multifunctional--;
line 27, change "prevents" to --prevent--.

Col. 5, line 15, change ":" to --;--.

Col. 6, line 10, before "production" insert --of--;
line 35, after "for" insert --a--.

Col. 9, line 27, change "referred" to --referenced--;
line 45, change "is" to --are--.

Col. 17, lines 54-55, change "thorough" to --through--.

Col. 18, line 8, before "The" insert a paragraph indention.

Col. 19, lines 2-3, change "porion" to --portion--.

Col. 20, line 55, change "the all" to --all the--.

Col. 21, line 15, change "infiniteyat" to --infinity at--;
line 52, change "timimg" to --timing--.

Col. 24, line 41, change "form" to --from--;
line 65, change "caries" to --carries--.

Col. 25, line 27, change "t the" to --to the--.

UNITED STATES PATENT AND TRADEMARK OFFICE
CERTIFICATE OF CORRECTION

PATENT NO. : 5,237,508
DATED : Aug. 17, 1993
INVENTOR(S) : FURUKAWA et al.

It is certified that error appears in the above-indentified patent and that said Letters Patent is hereby corrected as shown below:

Col. 26, line 35, change "t the" to --to the--.

Col. 27, line 4, change "8.00" to --8:00--;
line 11, after "product" change "a" to --is--.

Col. 28, line 6, change "8.00 to 8.40" to --8:00 to 8:40--; and change "8.40 to 8.50" to --8:40 to 8:50--;
line 7, change "8.50 to 9.00" to --8:50 to 9:00--;
line 65, change "is" (first occurrence) to --are--.

Col. 29, line 49, after "run" delete "a".

Col. 31, line 18, change "runing" to --running--;
line 21, change "pars" to --parts--;
line 42, change "and" to --an--.

Signed and Sealed this

Thirtieth Day of August, 1994

Attest:

BRUCE LEHMAN

Attesting Officer   Commissioner of Patents and Trademarks